US008983651B2

(12) United States Patent  
Combs et al.

(10) Patent No.: US 8,983,651 B2
(45) Date of Patent: Mar. 17, 2015

(54) ZONE CONTROLLER FOR MODULAR CONVEYOR SYSTEM

(71) Applicant: Insight Automation, Inc., Erlanger, KY (US)

(72) Inventors: Charles R. Combs, Burlington, KY (US); James P. Knapke, Ft. Thomas, KY (US); Dimitar Petrov, Sofia (BG); Kazuya Ichieda, Miki (JP)

(73) Assignee: Insight Automation, Inc., Erlanger, KY (US)

( * ) Notice: Subject to any disclaimer, the term of this patent is extended or adjusted under 35 U.S.C. 154(b) by 6 days.

(21) Appl. No.: 13/803,233

(22) Filed: Mar. 14, 2013

(65) Prior Publication Data

US 2014/0277698 A1 Sep. 18, 2014

(51) Int. Cl.
G06F 7/00 (2006.01)
B65G 43/10 (2006.01)

(52) U.S. Cl.
CPC ..................................... B65G 43/10 (2013.01)
USPC ........................................................ 700/230

(58) Field of Classification Search
USPC .......................................................... 700/230
See application file for complete search history.

(56) References Cited

U.S. PATENT DOCUMENTS

| | | |
|---|---|---|
| 2,612,982 A | 10/1952 | Michaux, Jr. |
| 3,104,318 A | 9/1963 | Hill et al. |
| 5,150,781 A * | 9/1992 | Deisenroth et al. ........ 198/349.8 |
| 5,228,558 A | 7/1993 | Hall |
| 5,285,887 A | 2/1994 | Hall |
| 5,456,347 A * | 10/1995 | Best et al. ................ 198/781.06 |
| 5,582,286 A * | 12/1996 | Kalm et al. .............. 198/781.06 |
| 5,862,907 A | 1/1999 | Taylor |
| 6,021,888 A | 2/2000 | Itoh et al. |
| 6,047,812 A | 4/2000 | Horn et al. |
| 6,253,906 B1 | 7/2001 | Hall |

(Continued)

FOREIGN PATENT DOCUMENTS

| | | |
|---|---|---|
| EP | 1749765 | 7/2007 |
| WO | 0071445 | 11/2000 |
| WO | 2010108097 | 9/2010 |

OTHER PUBLICATIONS

International Search Report and Written Opinion of Application No. PCT/US14/15309, dated Aug. 22, 2014, 31 pages.

*Primary Examiner* — Gene Crawford
*Assistant Examiner* — Kyle Logan
(74) *Attorney, Agent, or Firm* — Wood, Herron & Evans, LLP

(57) ABSTRACT

Method and apparatus for controlling a conveyor system including a conveyor zone having a plurality of conveyor regions. A zone controller is configured to track the position of one or more articles within a controlled zone. The zone controller may be operatively coupled to controllers of adjacent zones, and may receive and transmit data relating to the position of articles in the controlled zone and whether the zone is accepting articles from the other controllers. Articles are moved within the controlled zone by selectively activating the zone based on determined positions of articles within the controlled zone, the positions of articles within adjacent zones, and/or the operating mode of the zone. The zone controller may thereby operate cooperatively with adjacent zones to manage spacing between articles by selectively positioning multiple articles within the zone, and may accumulate or discharge articles from the conveyor system in a desired arrangement.

24 Claims, 52 Drawing Sheets

(56) References Cited

U.S. PATENT DOCUMENTS

| | | | |
|---|---|---|---|
| 6,253,909 B1 * | 7/2001 | Kalm et al. | 198/781.06 |
| 6,623,411 B2 | 9/2003 | Terranova | |
| 6,705,454 B2 | 3/2004 | Fishaw et al. | |
| 6,820,736 B2 | 11/2004 | Itoh et al. | |
| 6,827,202 B2 | 12/2004 | Topmiller et al. | |
| 6,843,362 B2 | 1/2005 | Tachibana et al. | |
| 6,873,882 B2 | 3/2005 | Tachibana et al. | |
| 6,898,483 B2 | 5/2005 | Wielebski et al. | |
| 6,899,219 B2 | 5/2005 | Cotter et al. | |
| 7,035,714 B2 | 4/2006 | Anderson et al. | |
| 7,062,355 B2 | 6/2006 | Wielebski et al. | |
| 7,275,637 B2 | 10/2007 | Brown | |
| 7,280,889 B2 | 10/2007 | Knepple et al. | |
| 7,360,638 B2 | 4/2008 | Ko et al. | |
| 7,542,823 B2 | 6/2009 | Nagai | |
| 7,657,343 B2 | 2/2010 | Saito et al. | |
| 7,665,598 B2 | 2/2010 | Begin et al. | |
| 7,705,742 B1 | 4/2010 | Delaney, III et al. | |
| 7,800,068 B2 | 9/2010 | Vugts et al. | |
| 7,806,254 B2 | 10/2010 | Brayman et al. | |
| 7,905,345 B2 | 3/2011 | Taylor | |
| 7,954,621 B2 | 6/2011 | Brandt et al. | |
| 8,006,829 B2 | 8/2011 | Itoh et al. | |
| 8,019,469 B2 | 9/2011 | Knepple et al. | |
| 8,028,817 B2 | 10/2011 | Itoh et al. | |
| 8,037,997 B2 | 10/2011 | Swinderman et al. | |
| 8,061,506 B2 | 11/2011 | Schafer | |
| 8,100,254 B2 | 1/2012 | Balk | |
| 8,284,993 B2 | 10/2012 | Taylor et al. | |
| 8,322,515 B2 | 12/2012 | Rausch et al. | |
| 8,342,313 B2 | 1/2013 | Wargo et al. | |
| 8,371,435 B2 | 2/2013 | Agnoff | |
| 2001/0020566 A1 * | 9/2001 | Kalm et al. | 198/351 |
| 2001/0027909 A1 * | 10/2001 | Itoh et al. | 198/788 |
| 2002/0084173 A1 * | 7/2002 | Paquette | 198/781.06 |
| 2003/0089580 A1 * | 5/2003 | Pfeiffer | 198/571 |
| 2003/0116408 A1 * | 6/2003 | Topmiller et al. | 198/781.05 |
| 2004/0144623 A1 * | 7/2004 | Newsom et al. | 198/788 |
| 2006/0127202 A1 | 6/2006 | Tryggvason | |
| 2007/0246071 A1 | 10/2007 | Streb | |
| 2007/0261941 A1 | 11/2007 | Pelak et al. | |
| 2009/0301839 A1 * | 12/2009 | Taylor | 198/349 |
| 2010/0012464 A1 * | 1/2010 | Schiesser et al. | 198/460.1 |
| 2010/0076604 A1 | 3/2010 | Johnson et al. | |
| 2010/0080672 A1 | 4/2010 | Bonora et al. | |
| 2010/0100235 A1 | 4/2010 | Fatula, III | |
| 2010/0101919 A1 * | 4/2010 | Itoh et al. | 198/459.8 |
| 2011/0067977 A1 | 3/2011 | Neiser | |
| 2011/0297509 A1 | 12/2011 | Taylor | |
| 2012/0024669 A1 | 2/2012 | Danelski et al. | |
| 2012/0048682 A1 | 3/2012 | Itoh et al. | |
| 2012/0175225 A1 * | 7/2012 | Breen et al. | 198/571 |
| 2012/0290126 A1 | 11/2012 | Combs et al. | |

* cited by examiner

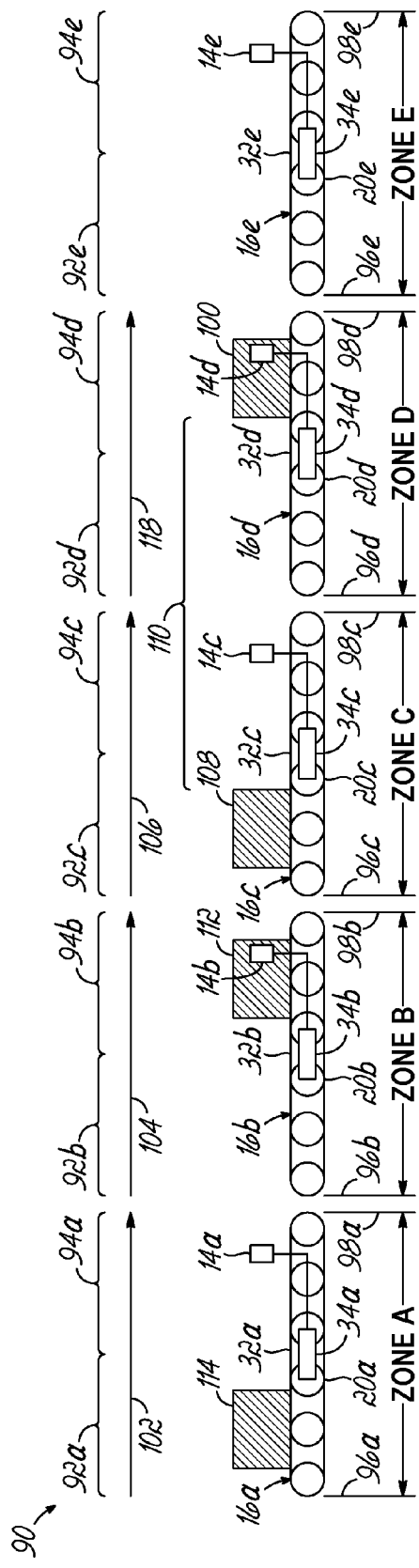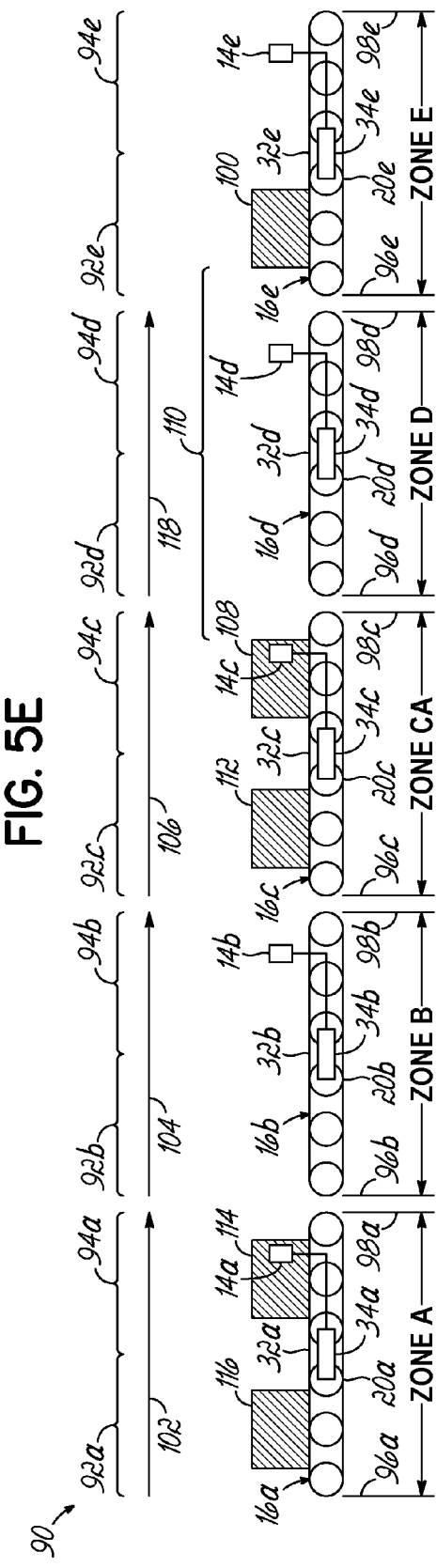

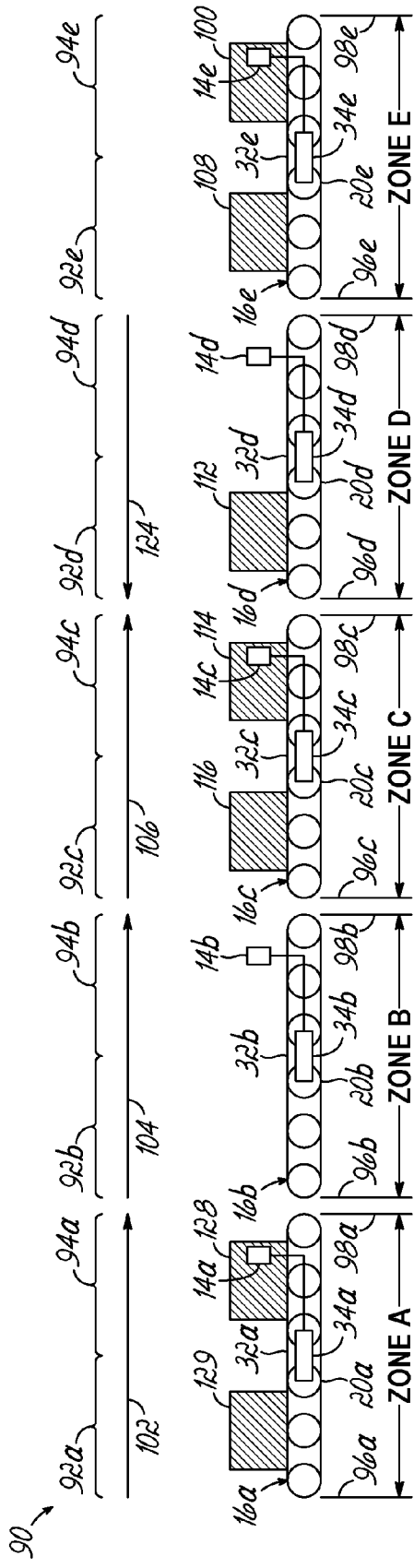
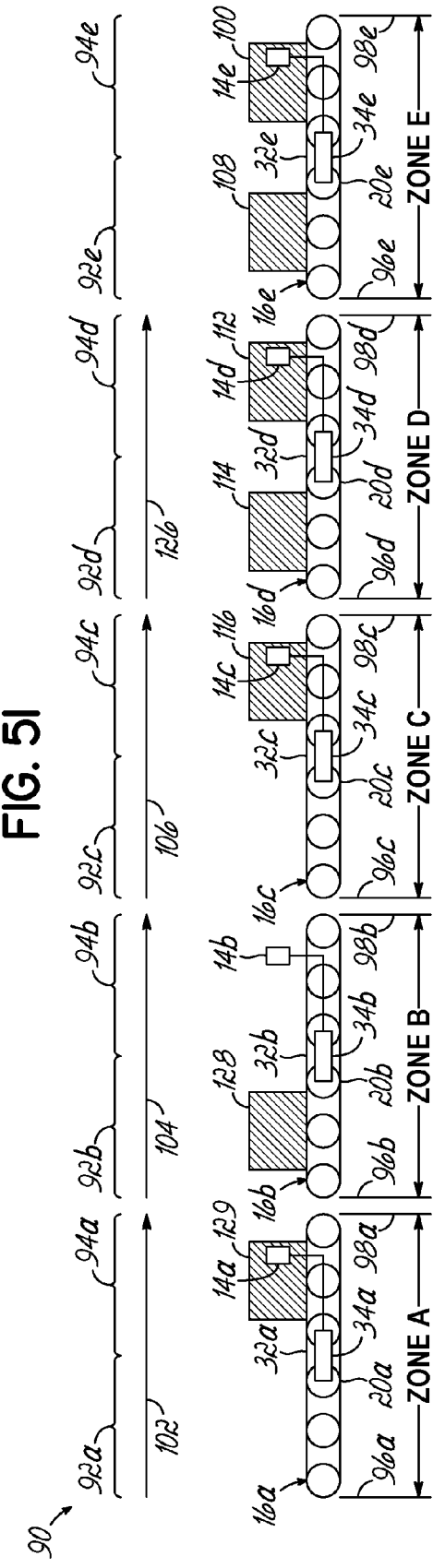
FIG. 5I
FIG. 5J

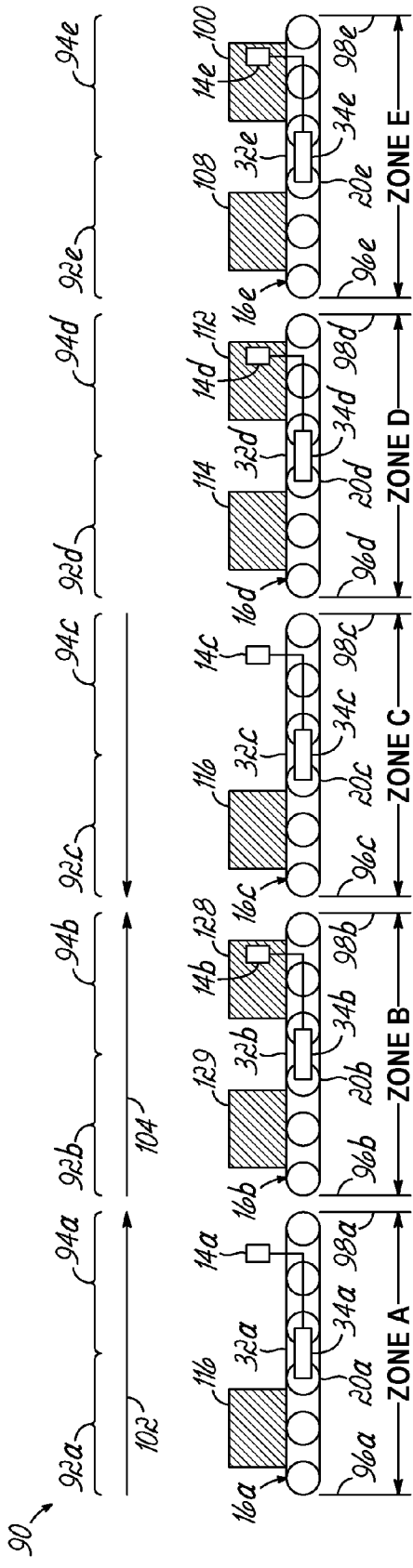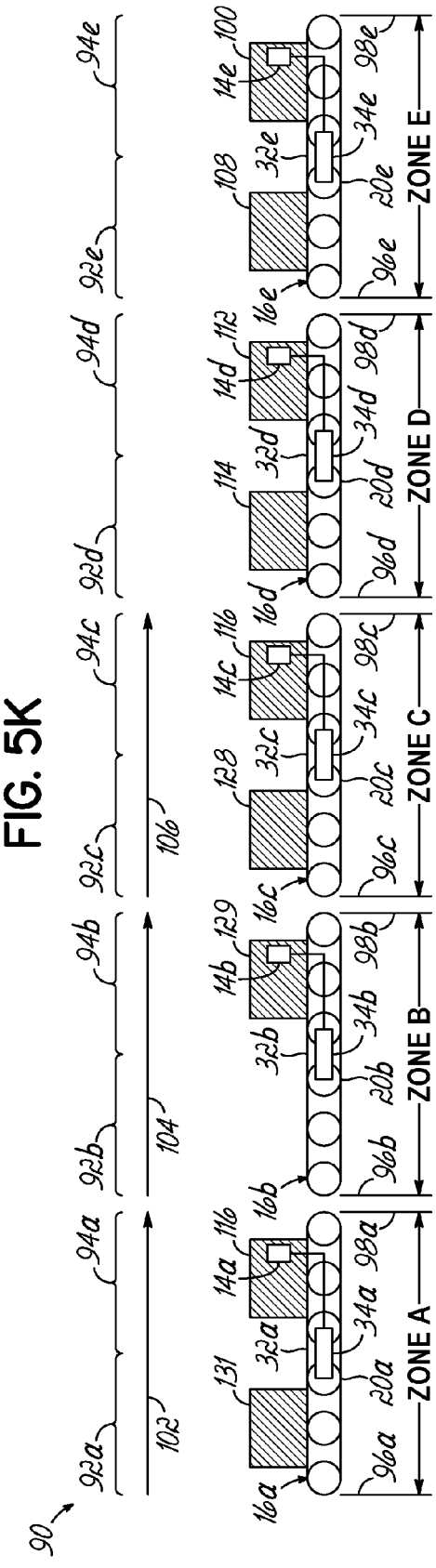

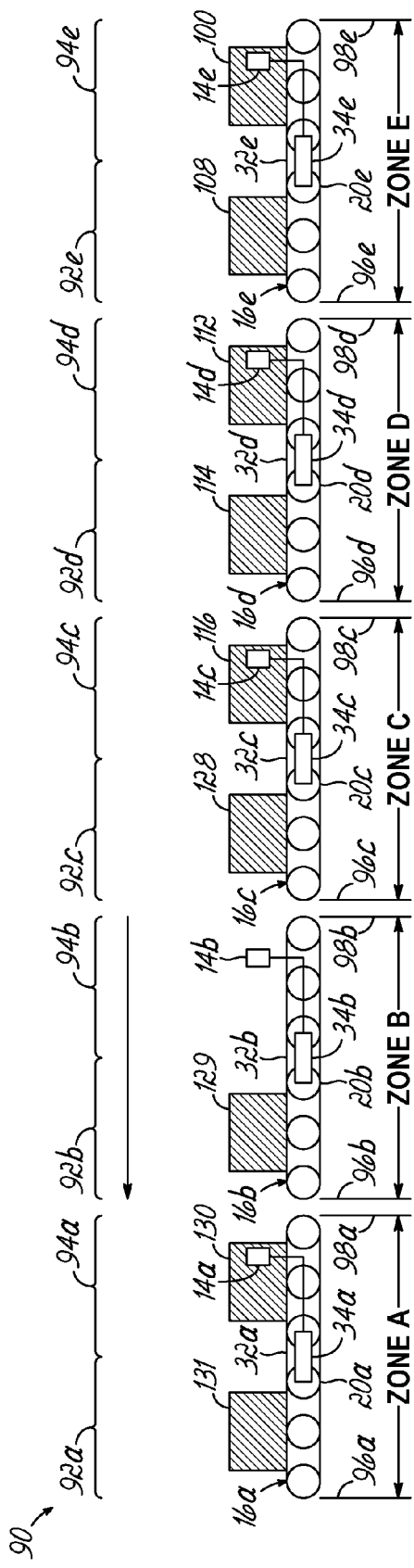
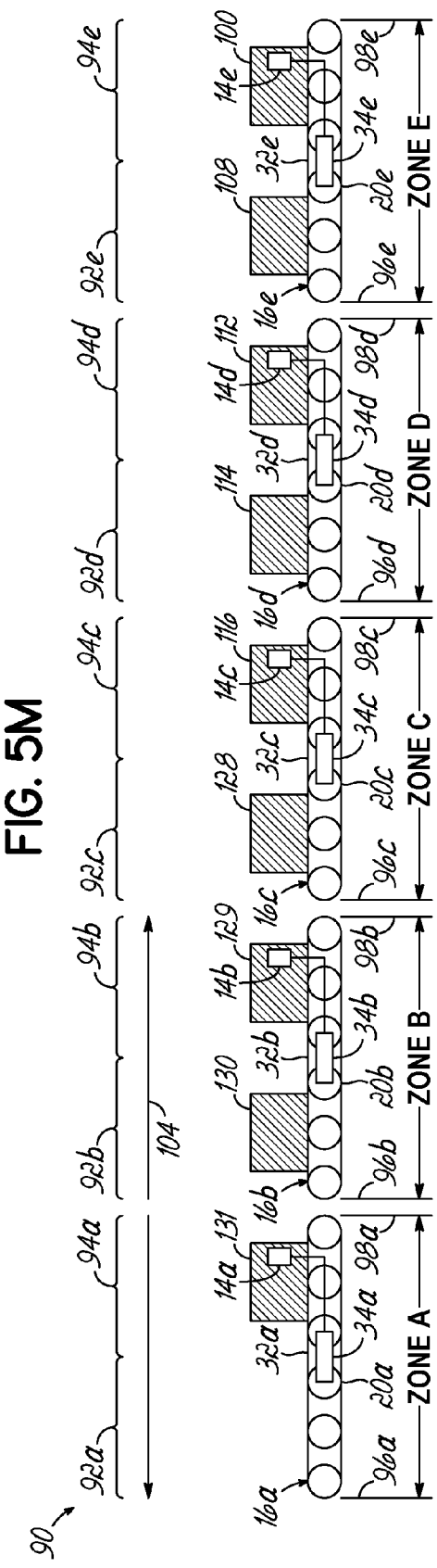
FIG. 5M
FIG. 5N

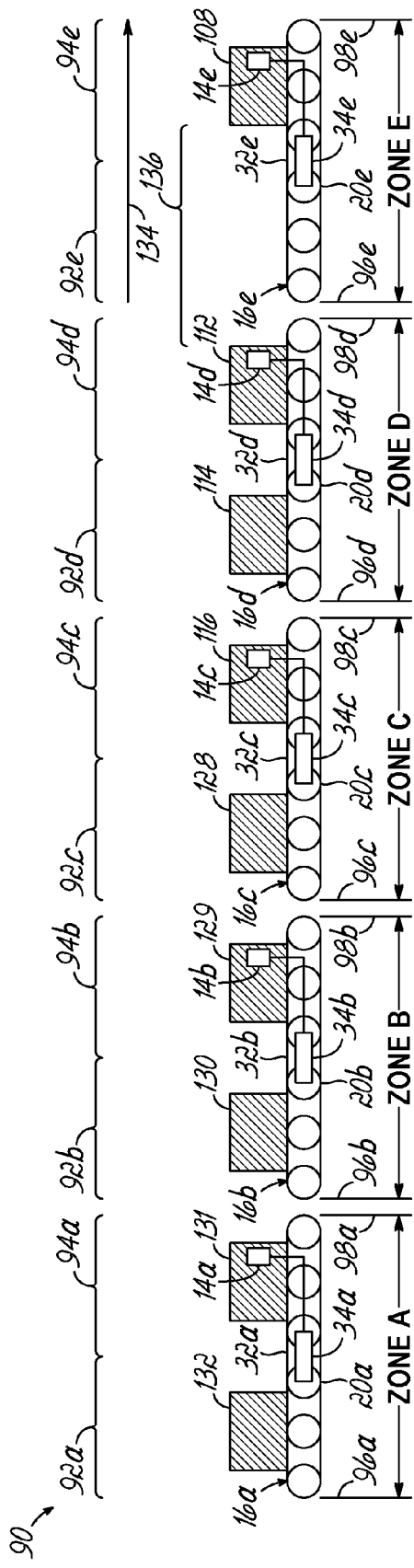
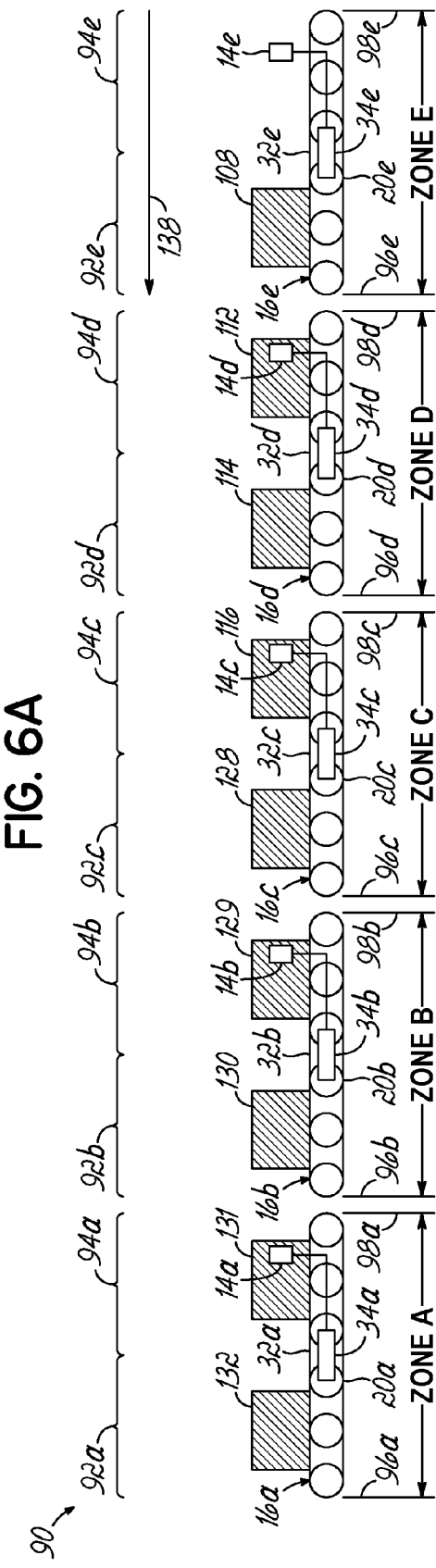
FIG. 6A
FIG. 6B

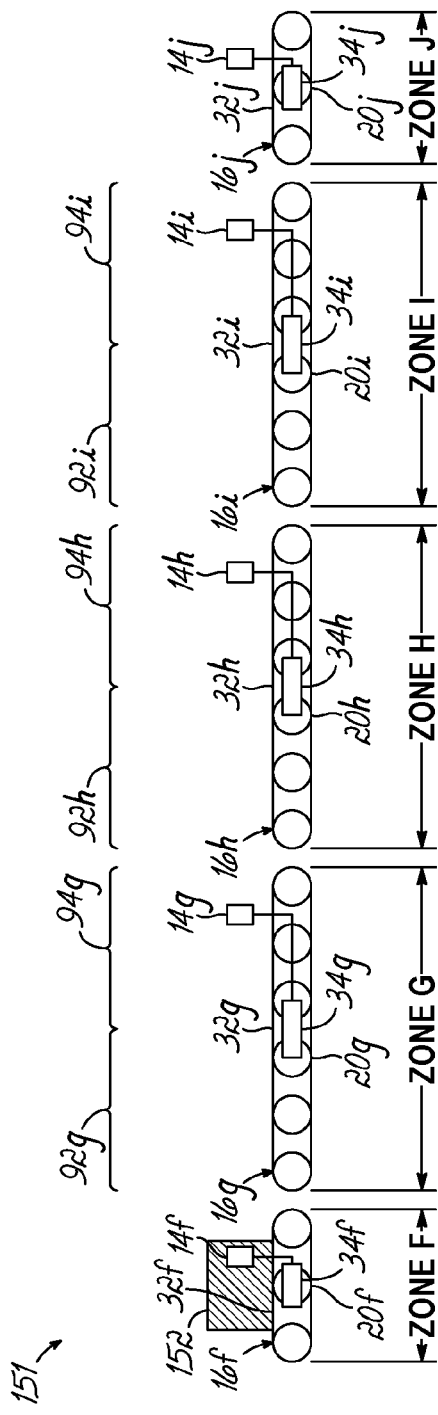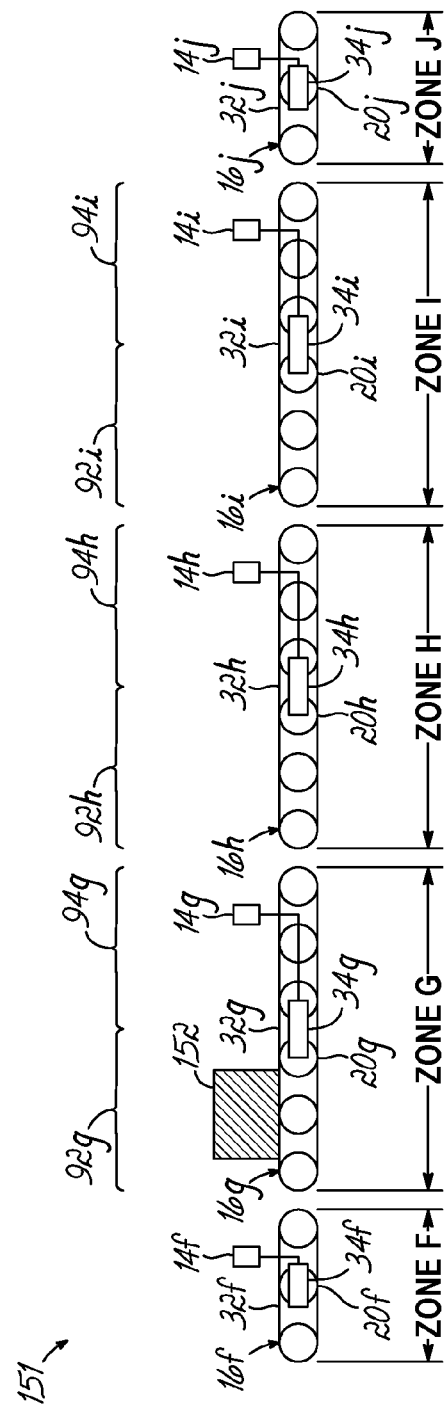
FIG. 8A
FIG. 8B

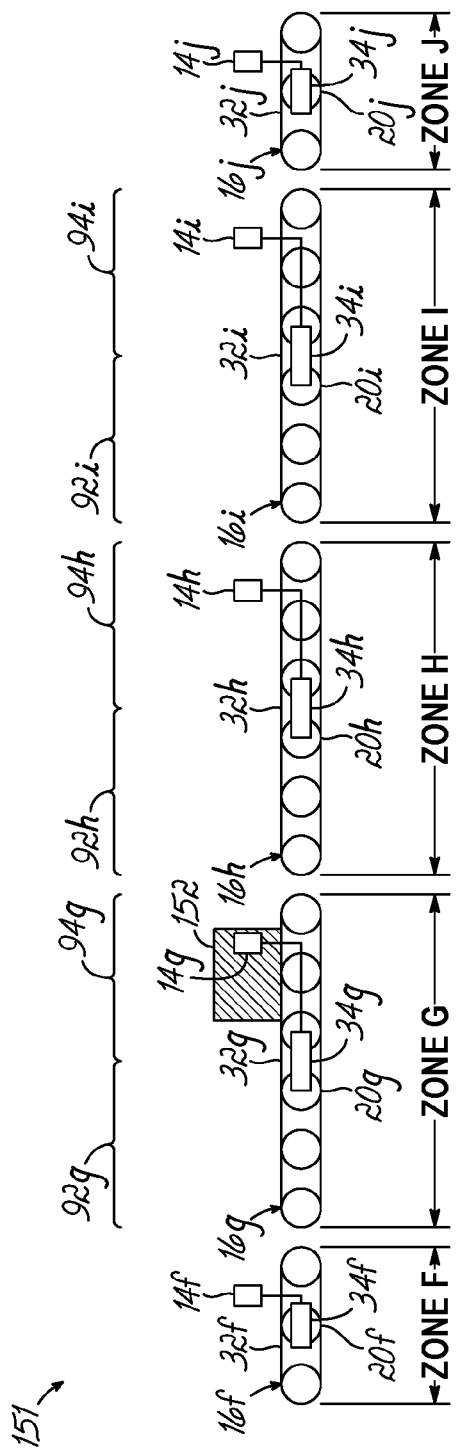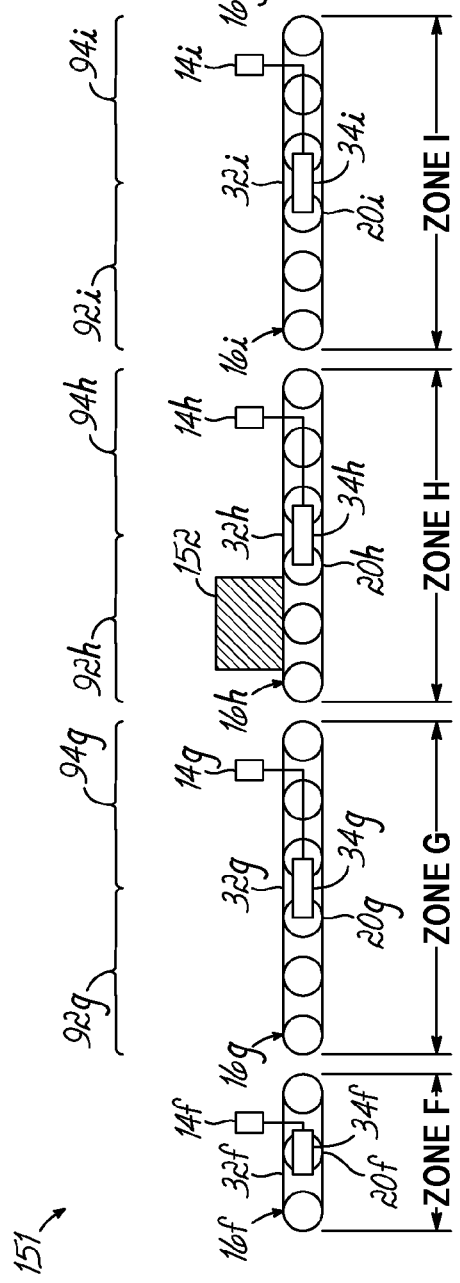

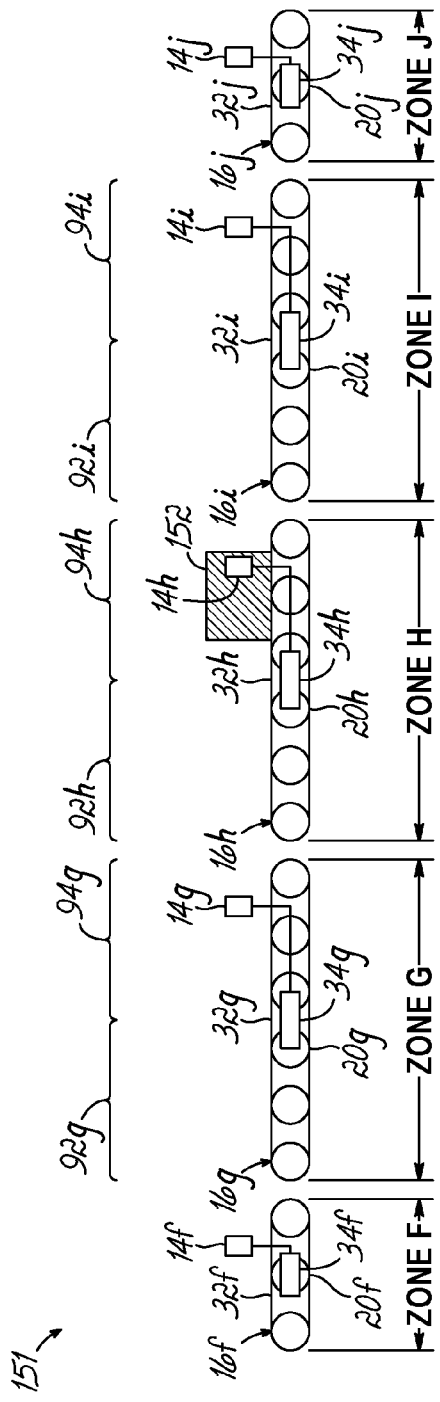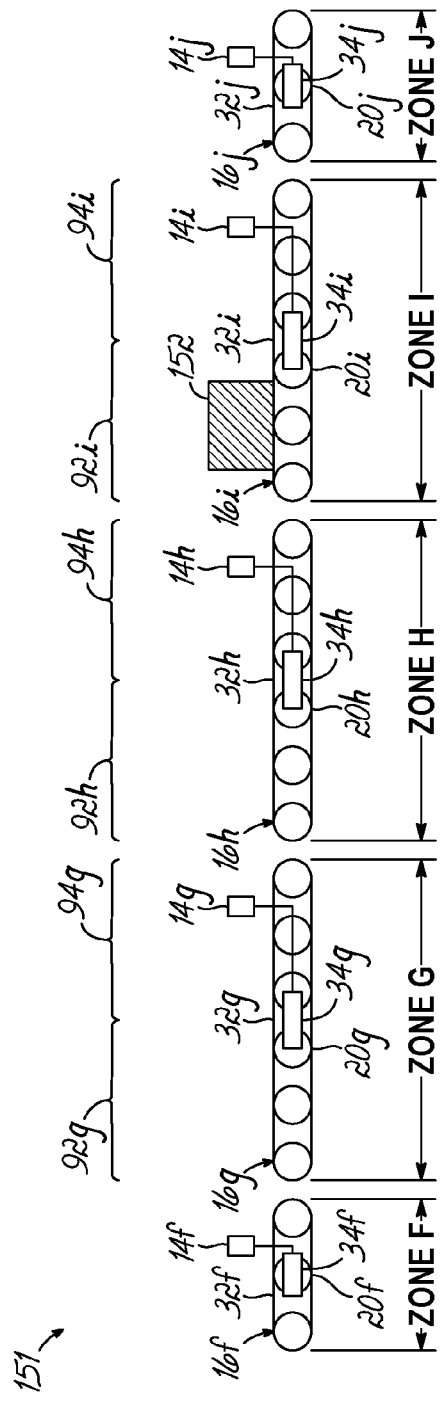

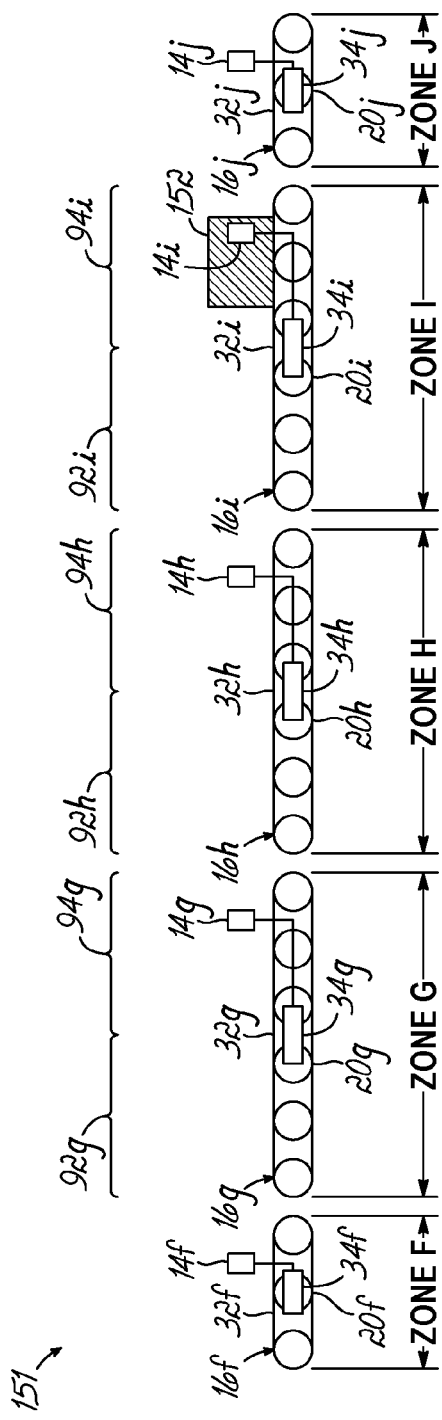
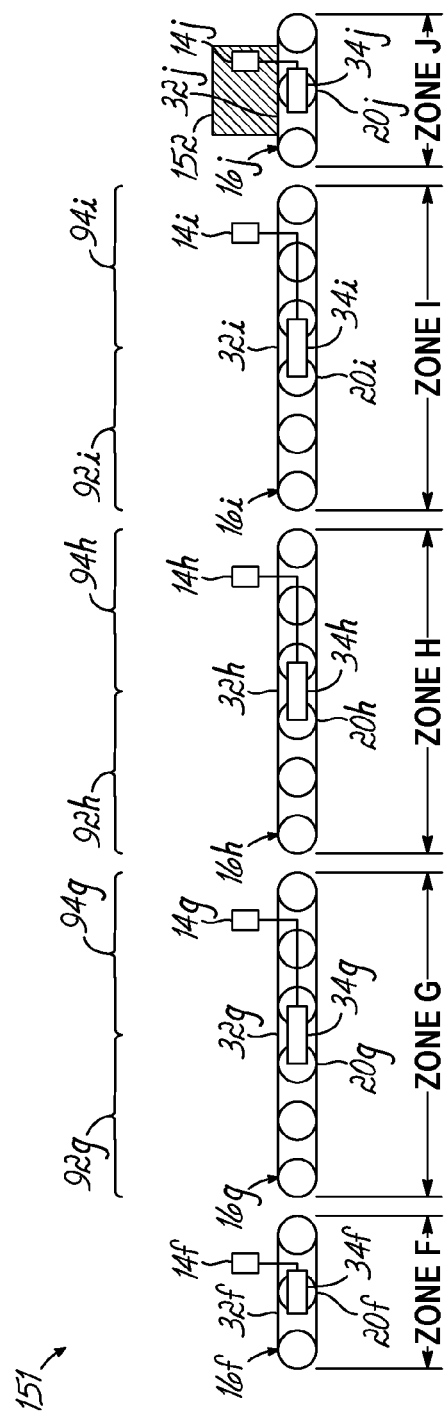
FIG. 8G
FIG. 8H

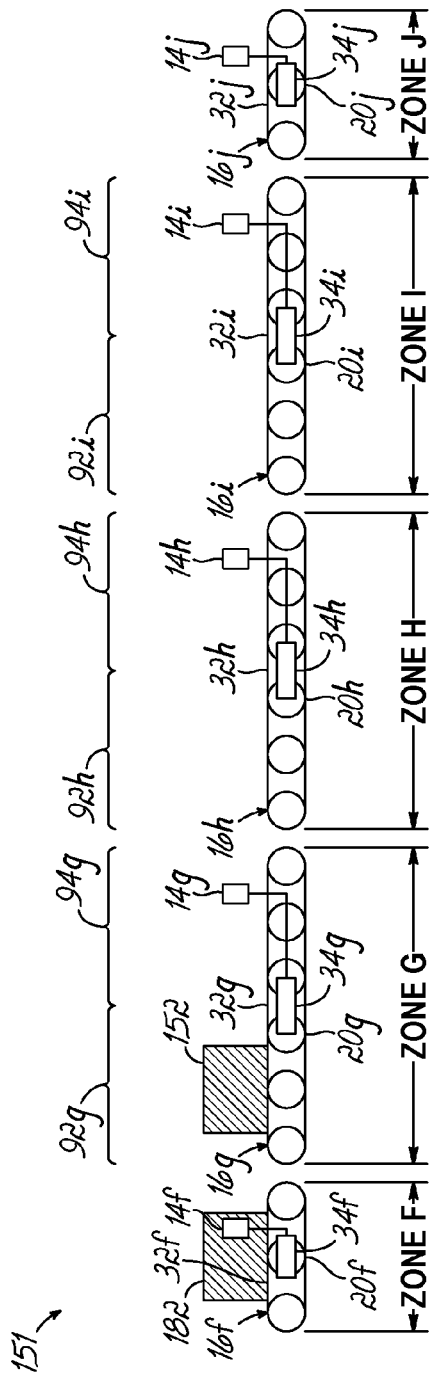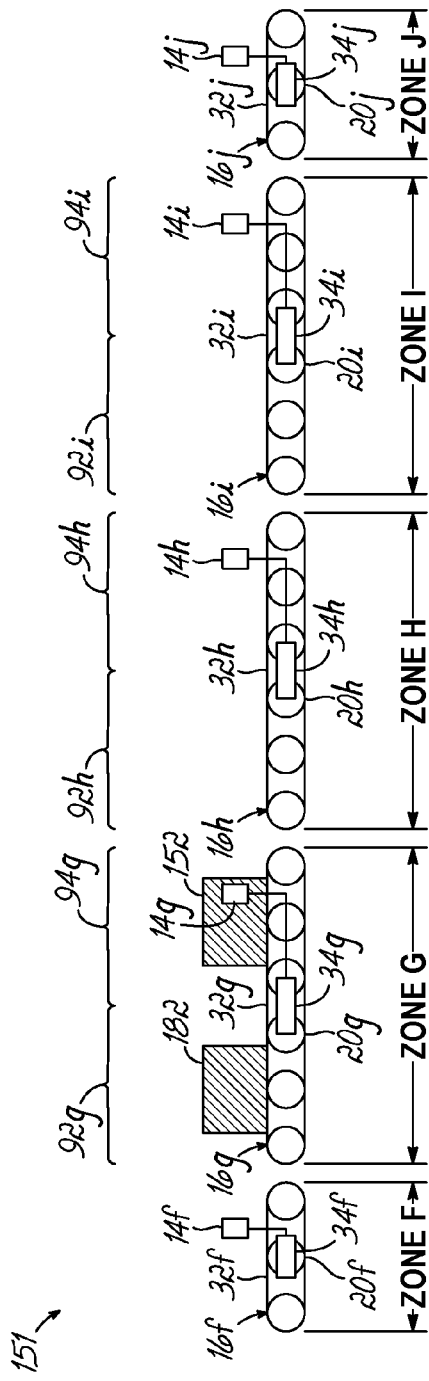

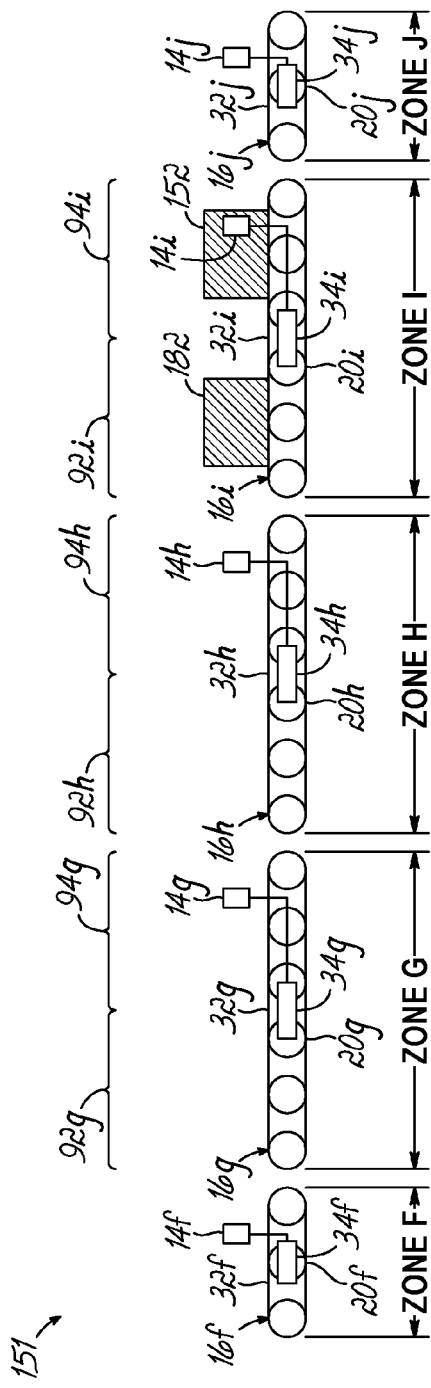
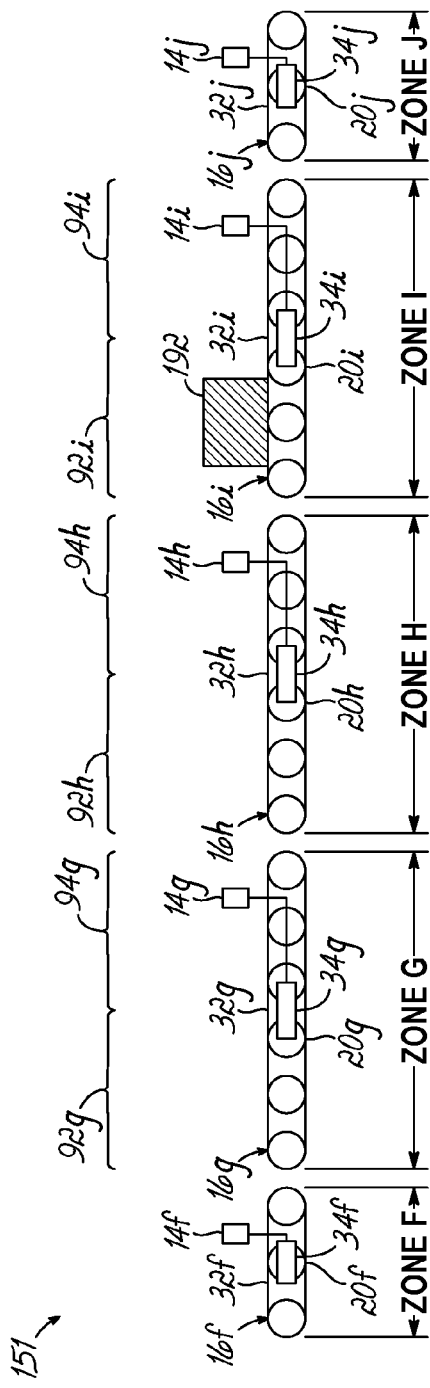

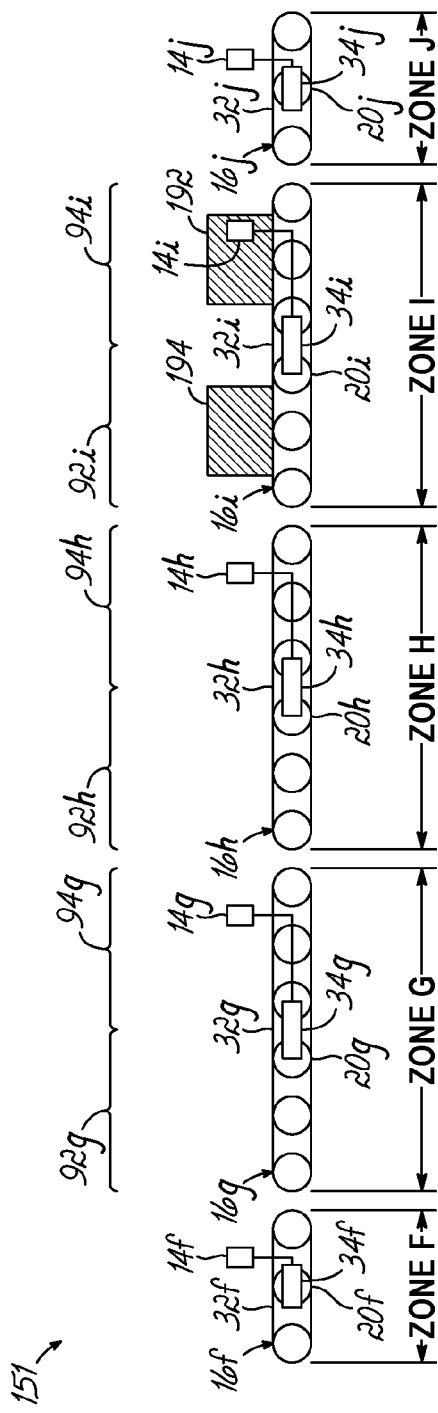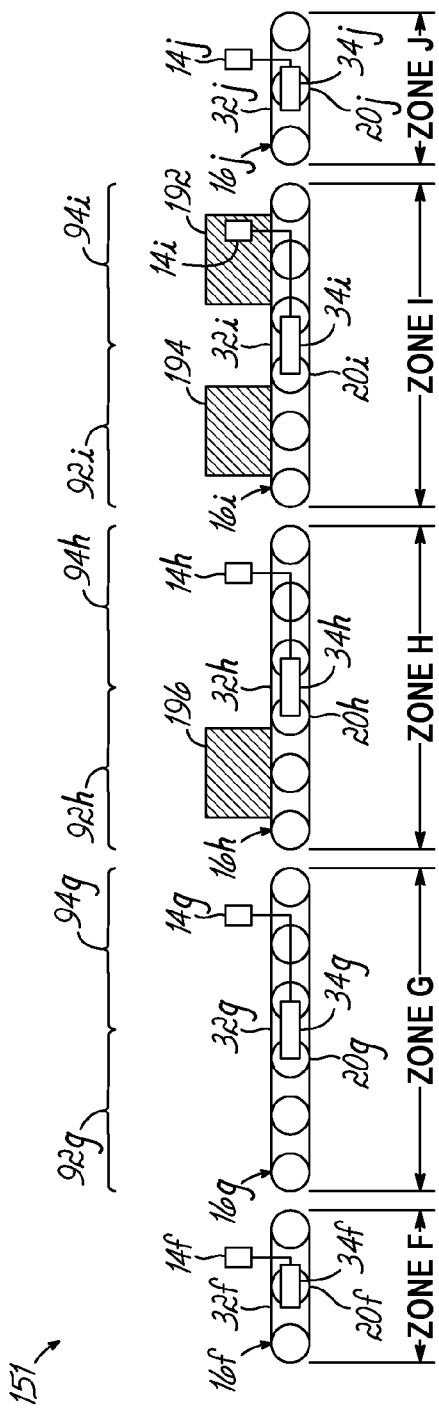
FIG. 9B
FIG. 9C

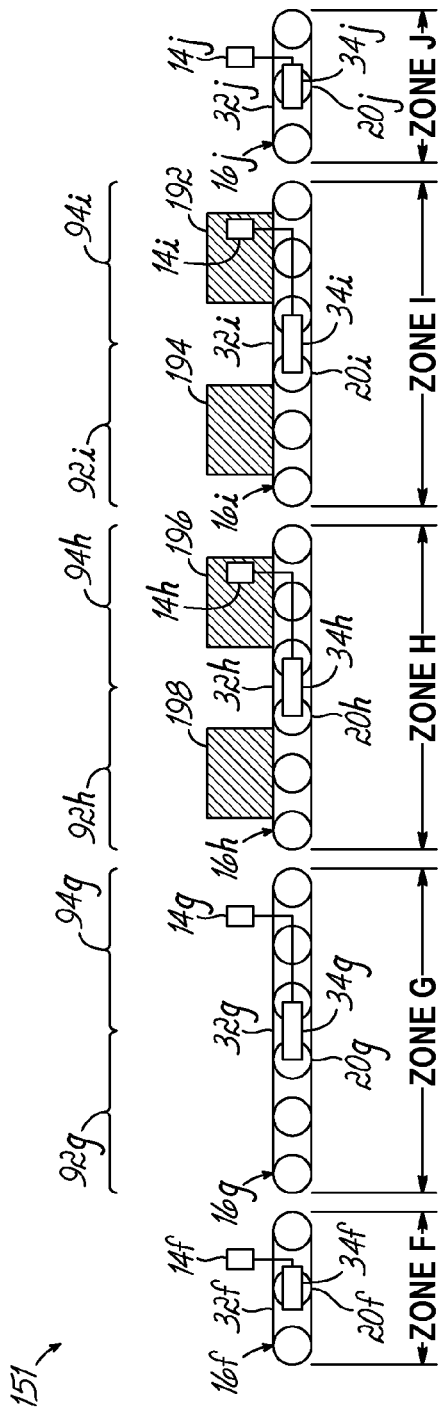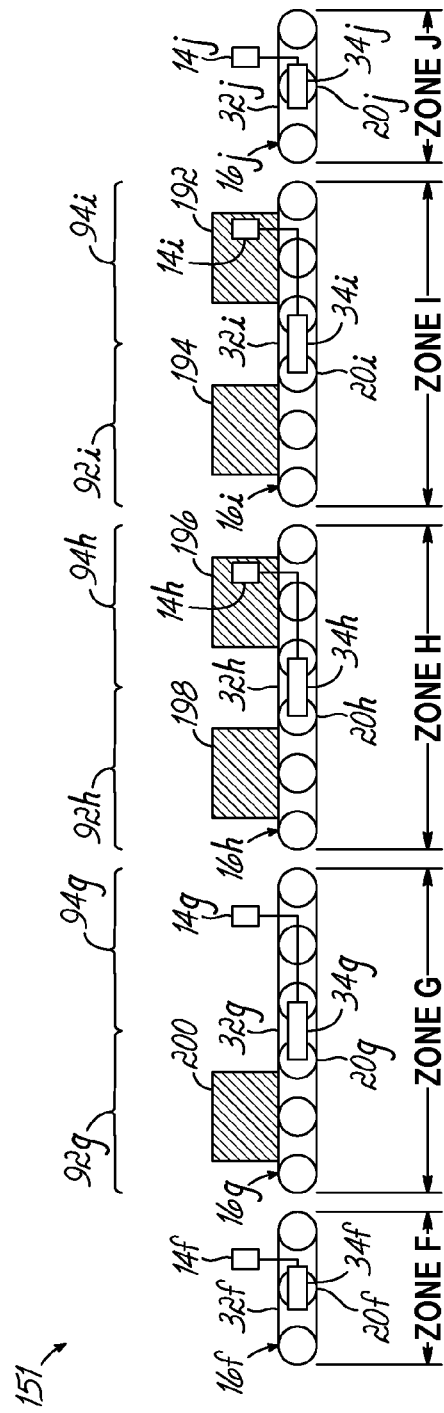

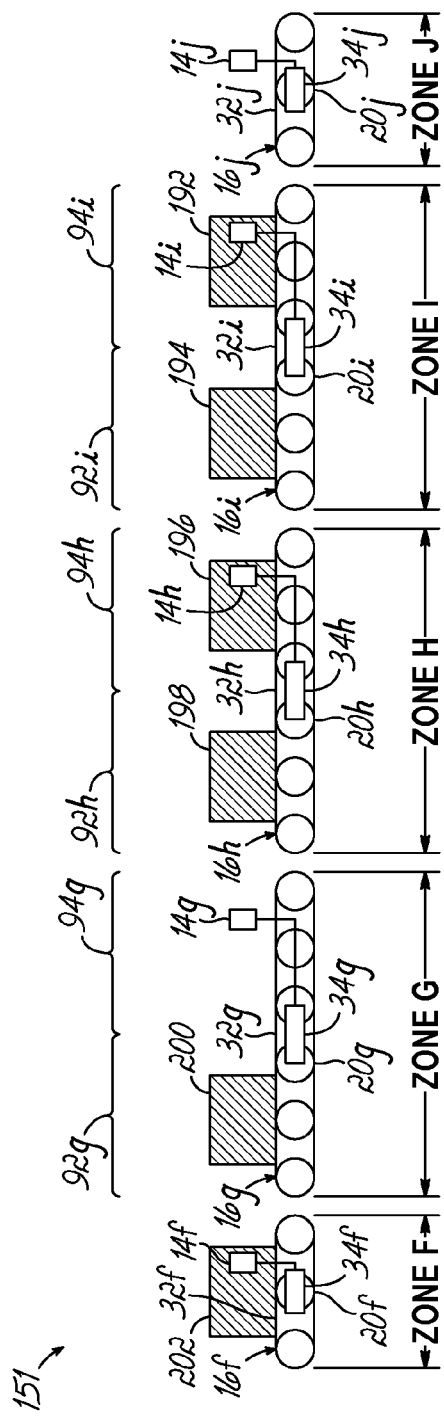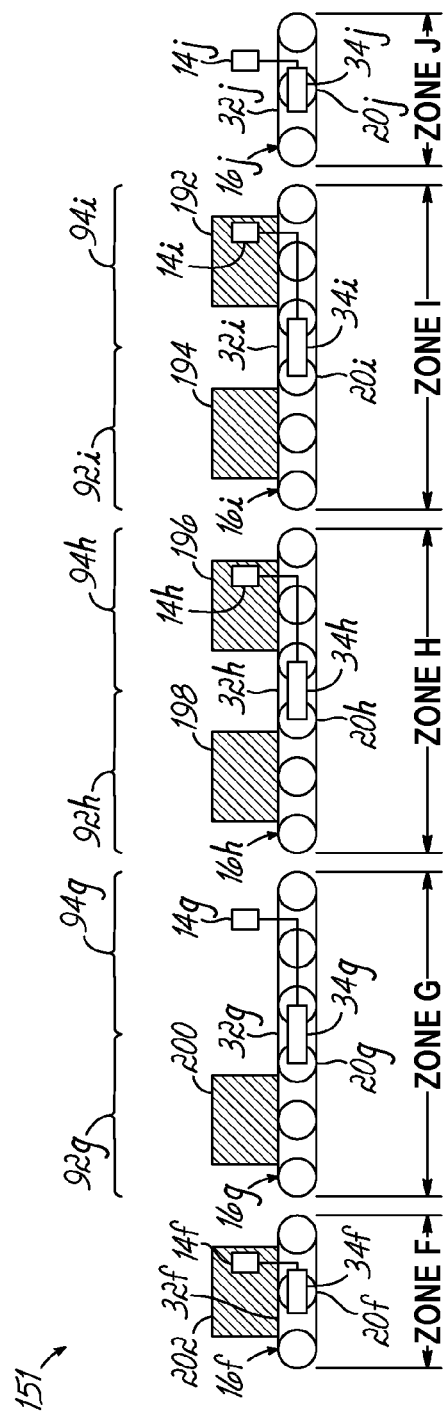

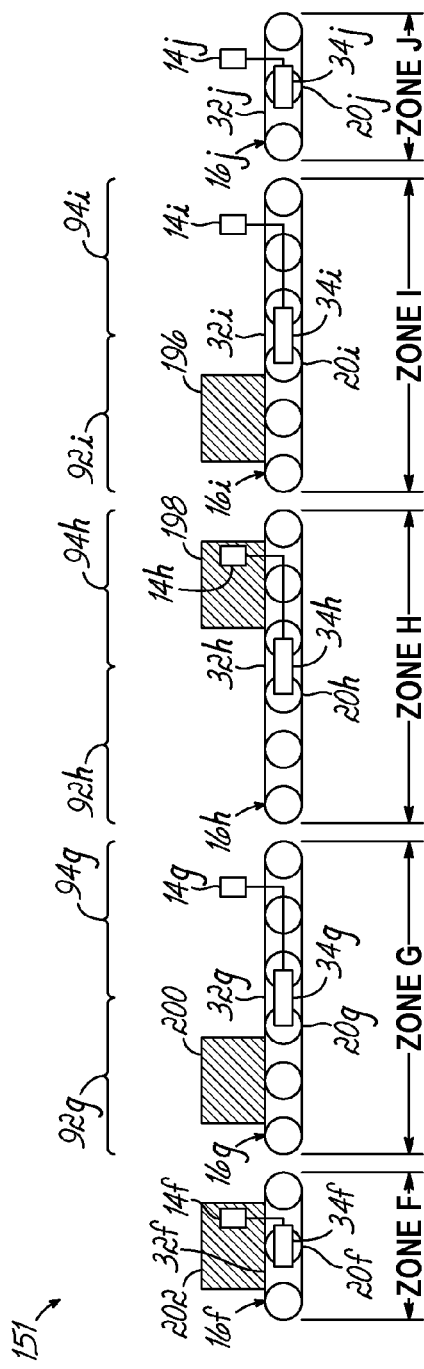
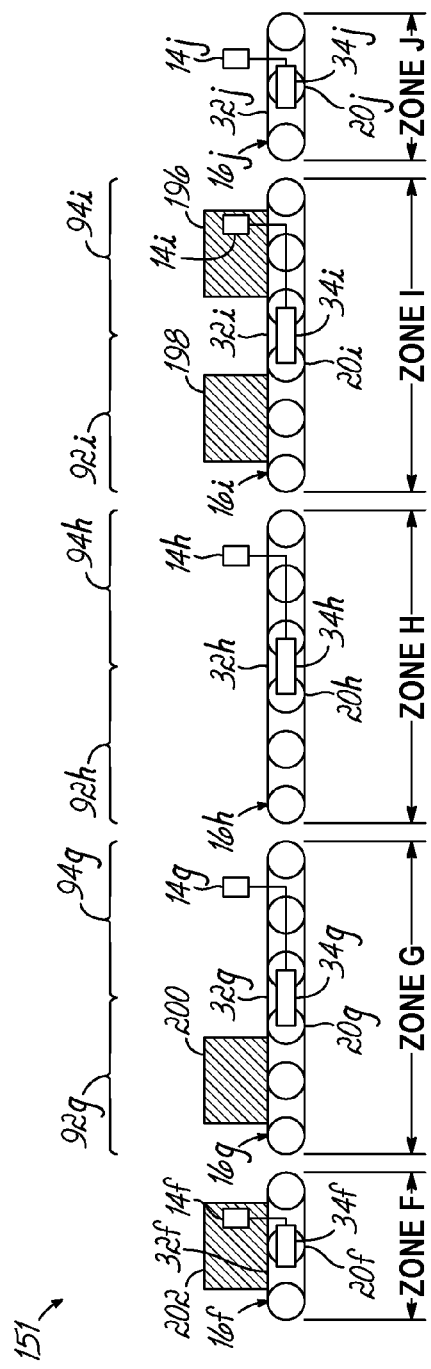
FIG. 10D
FIG. 10E

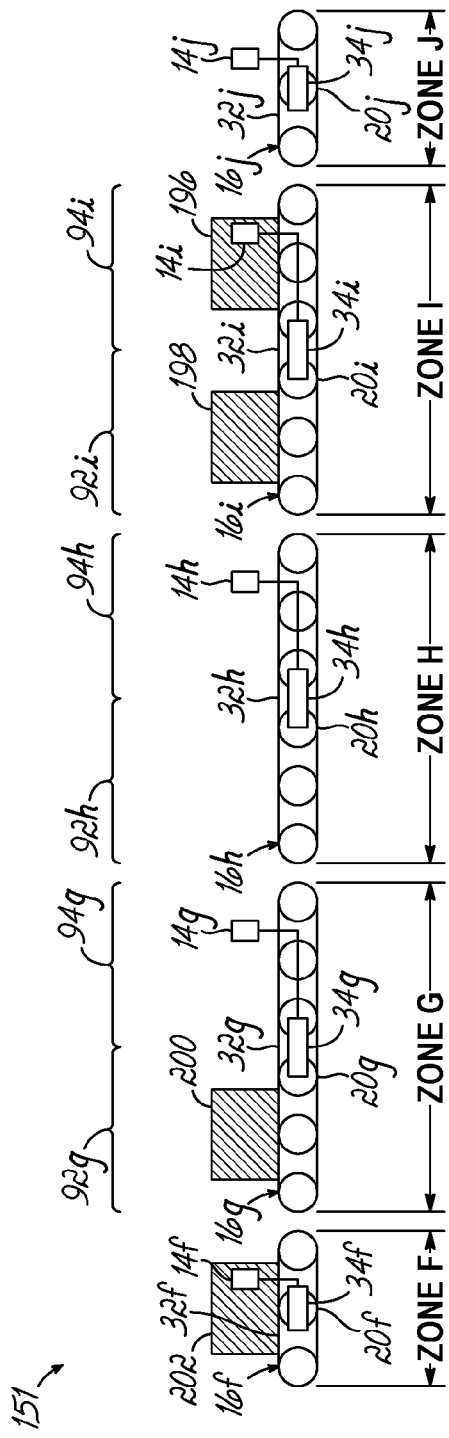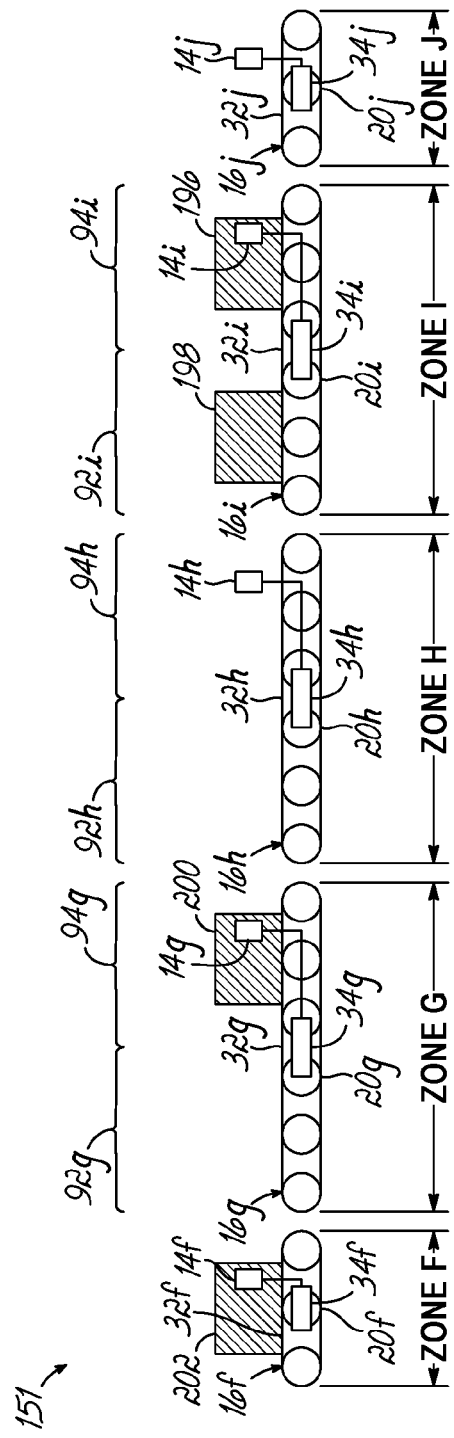

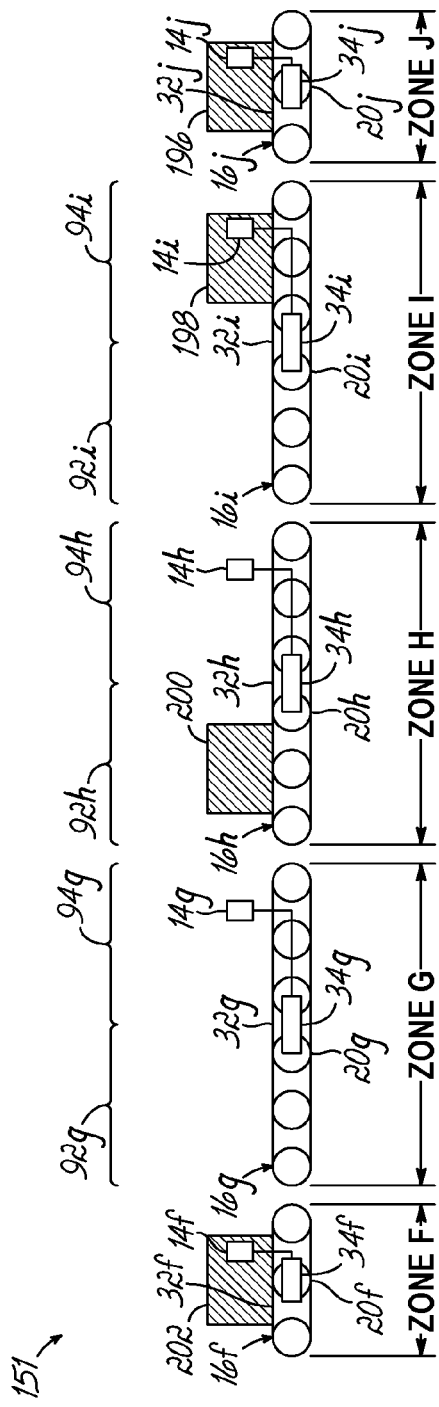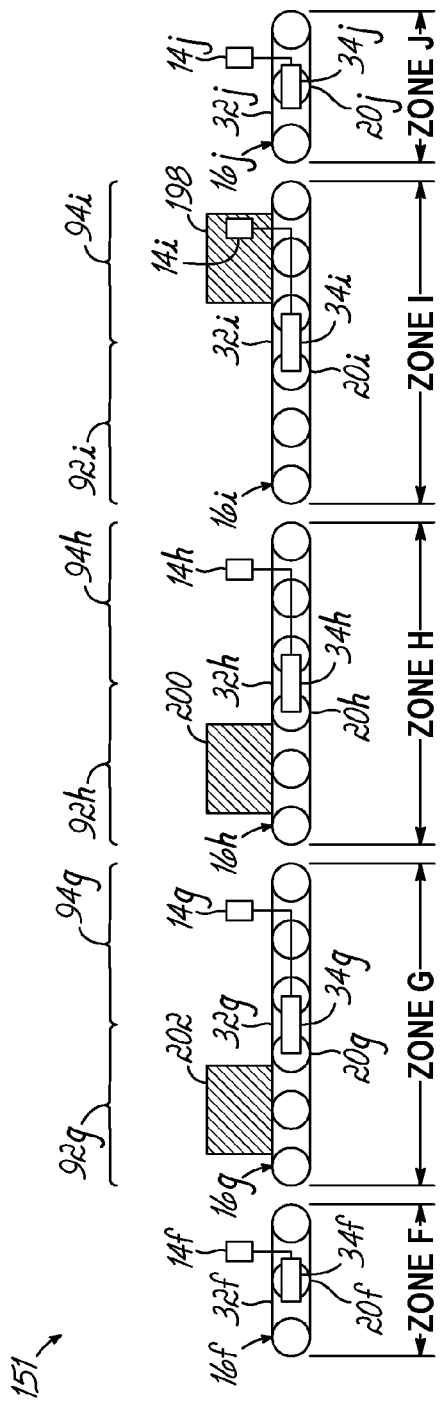
FIG. 10H
FIG. 10I

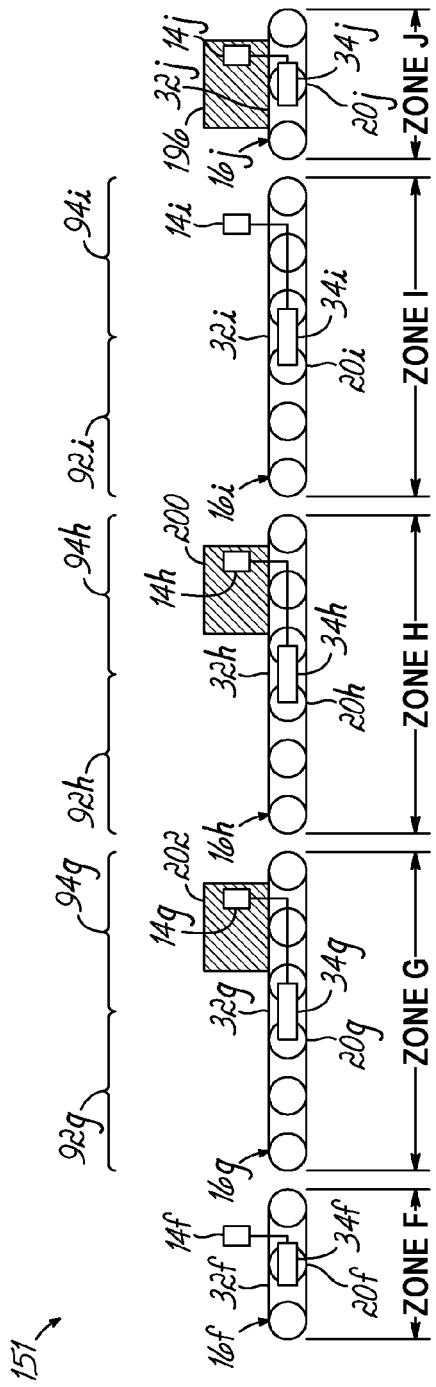
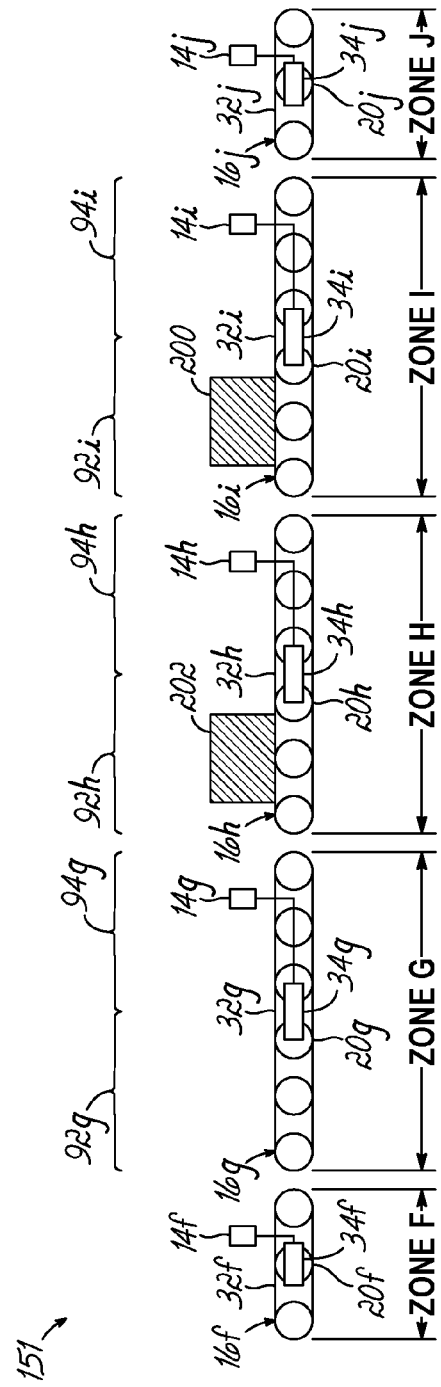
FIG. 10J
FIG. 10K

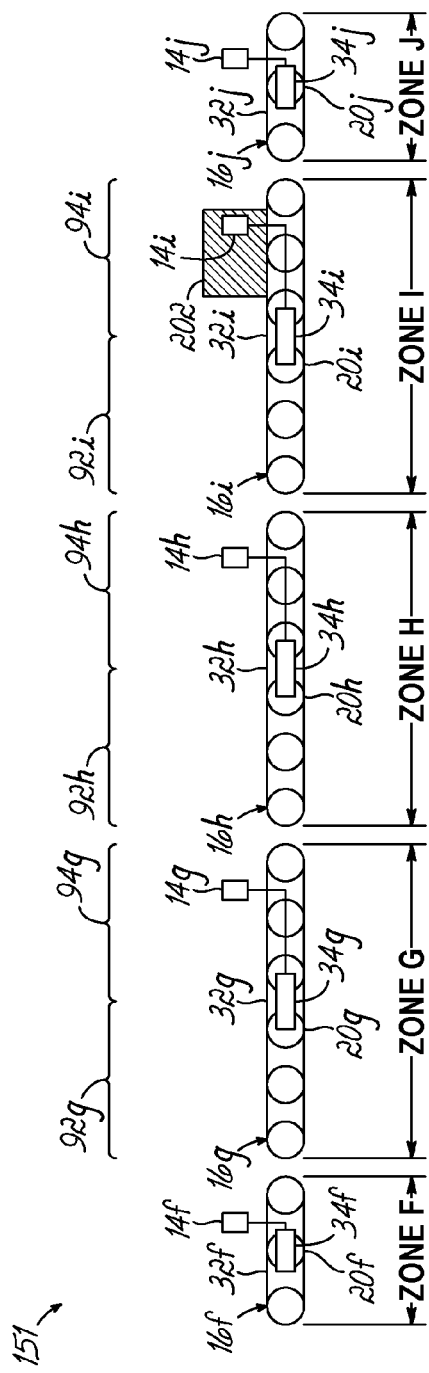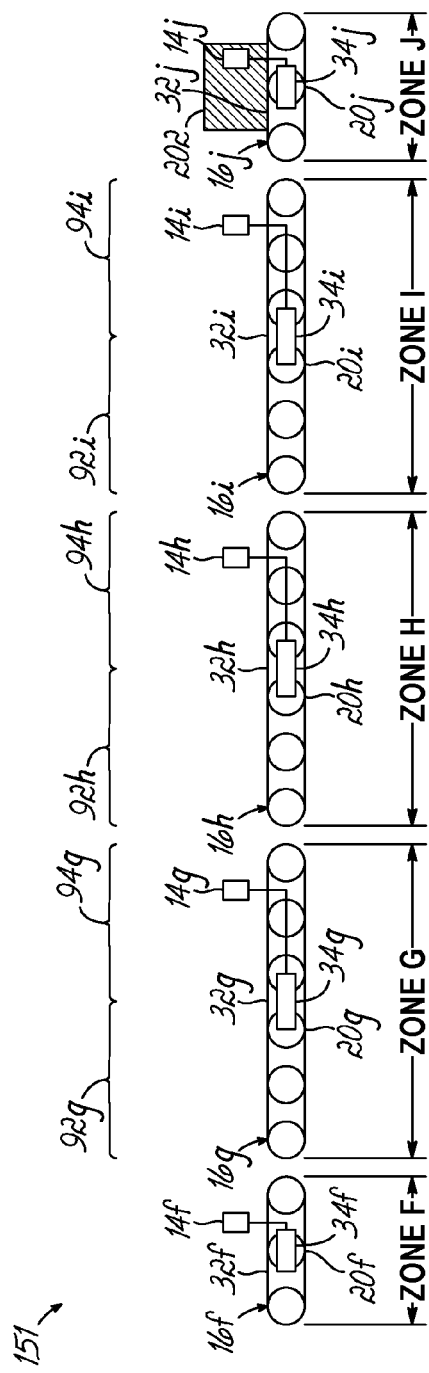

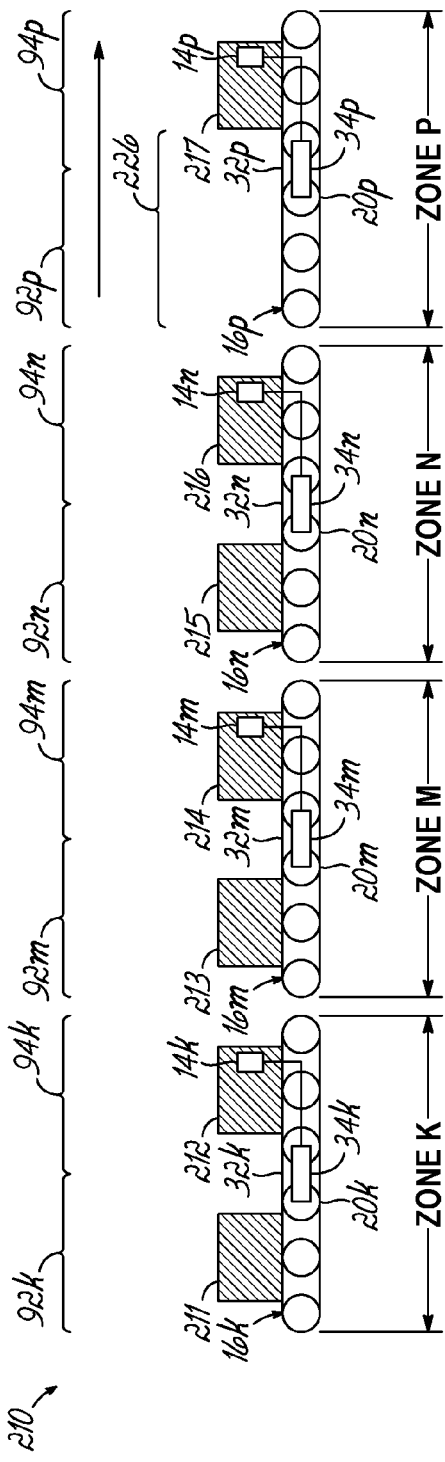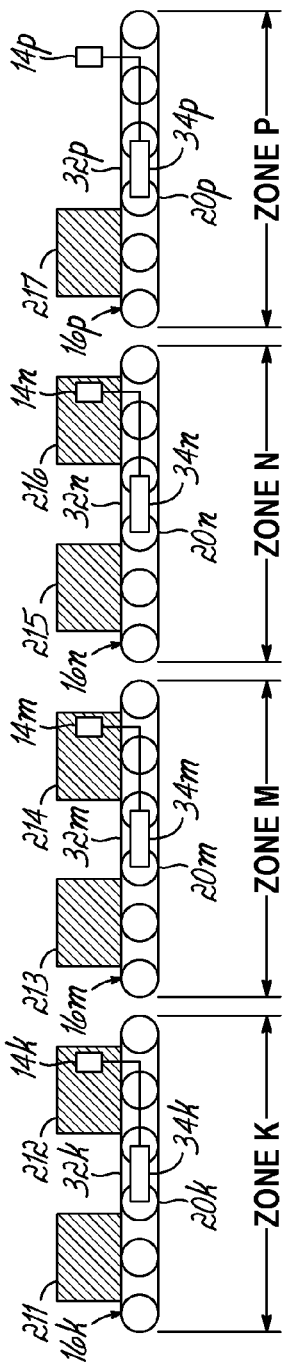

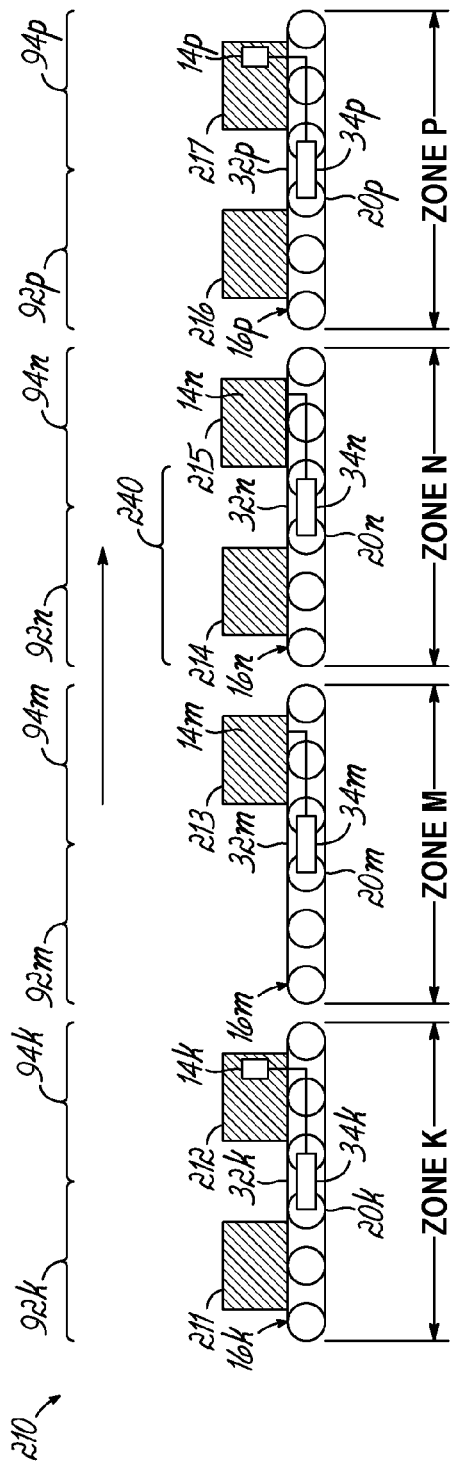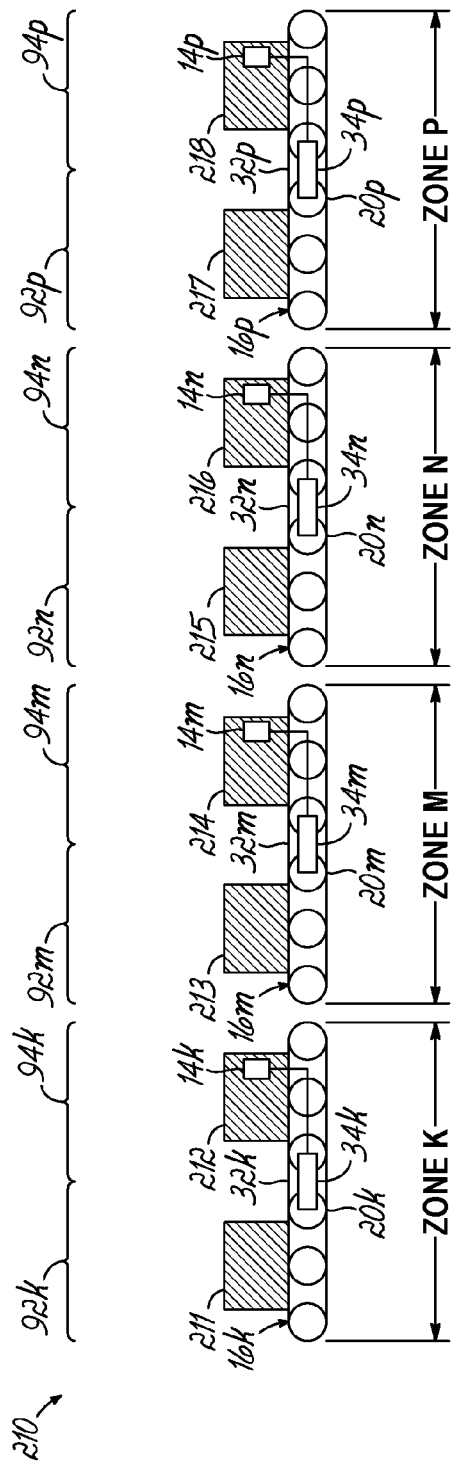

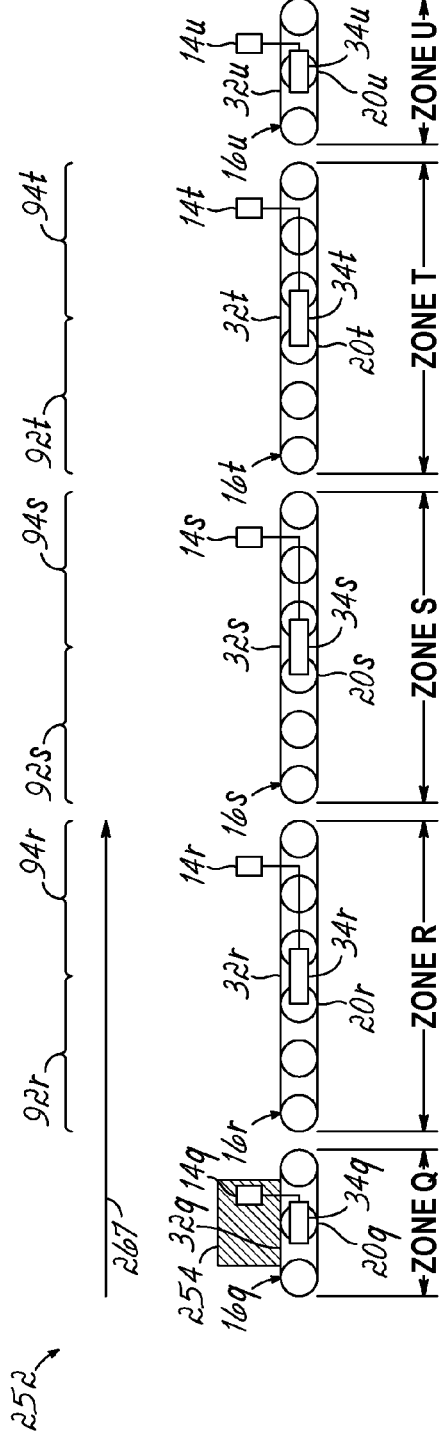
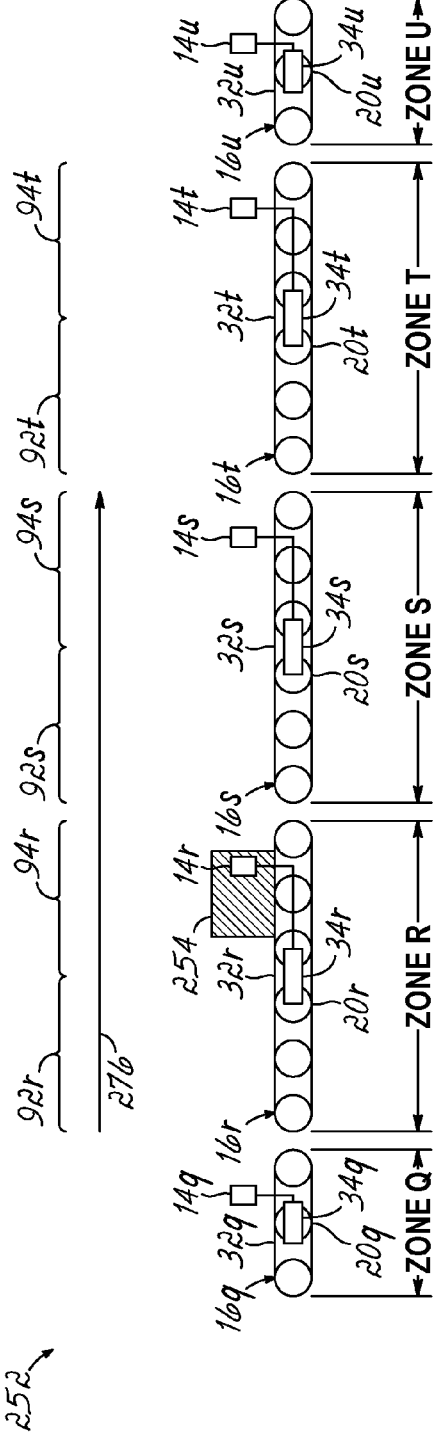

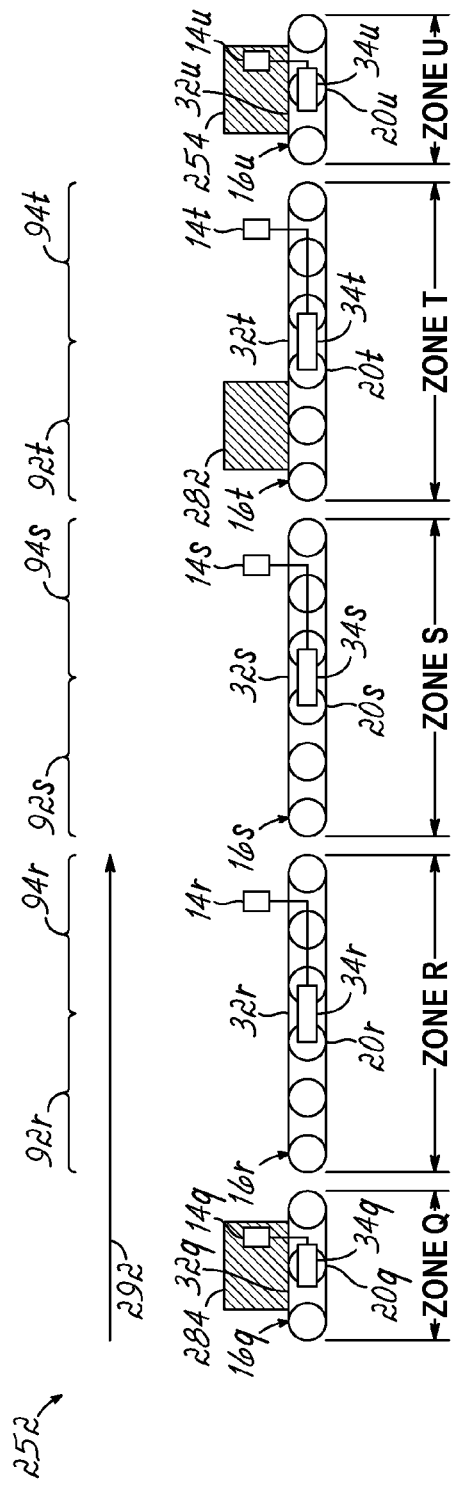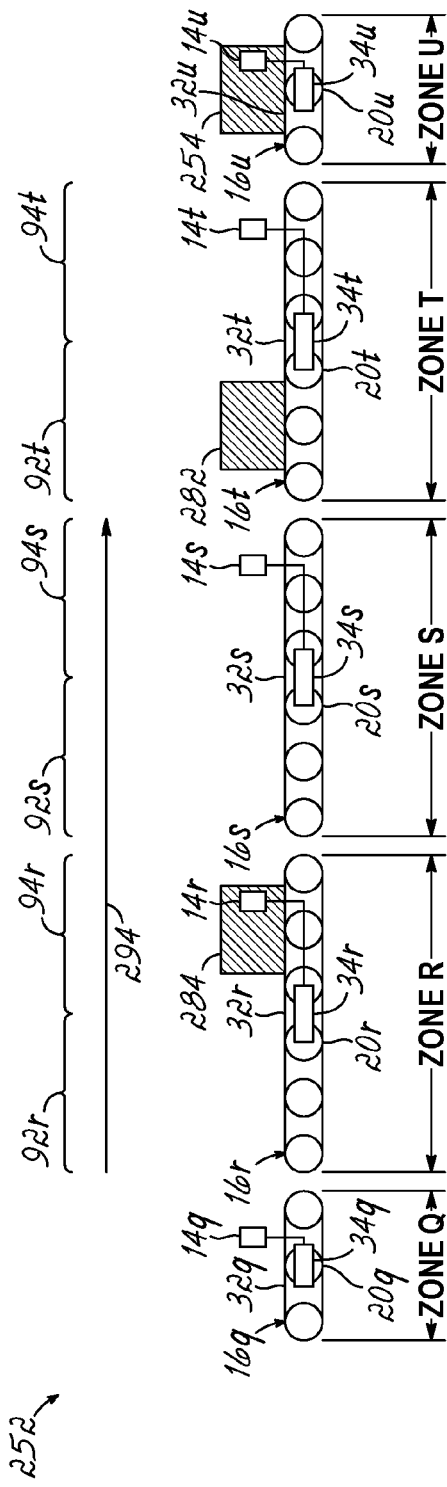

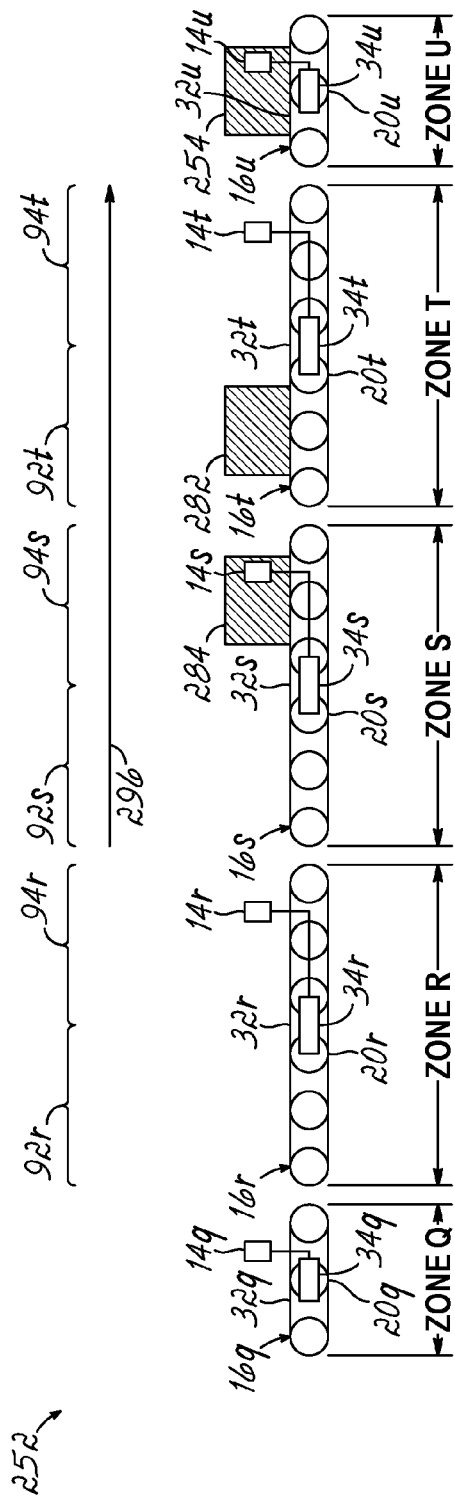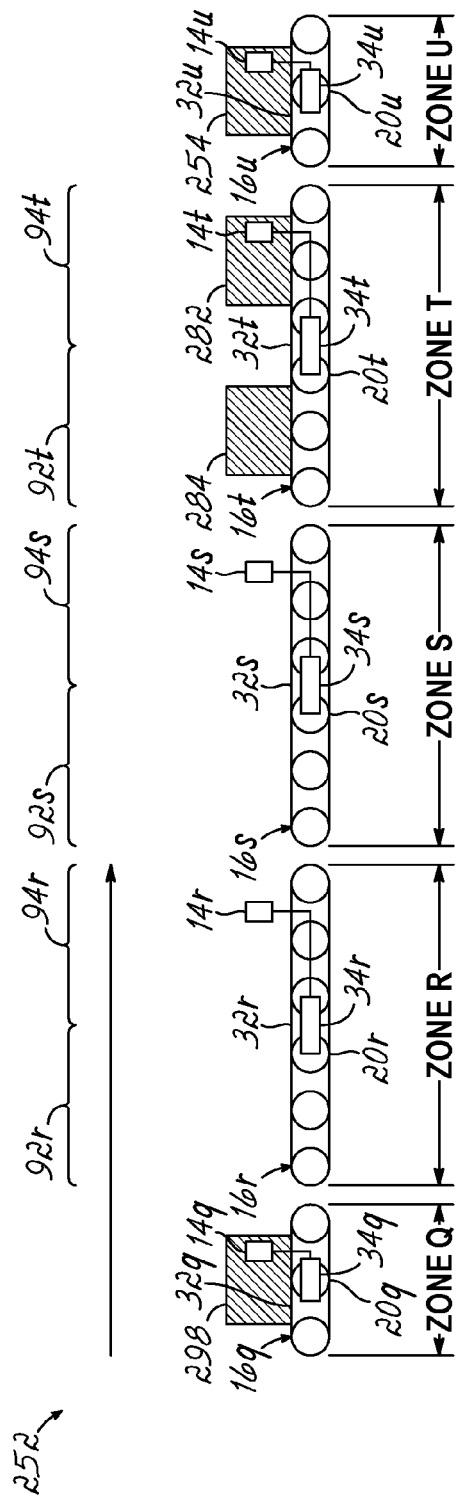

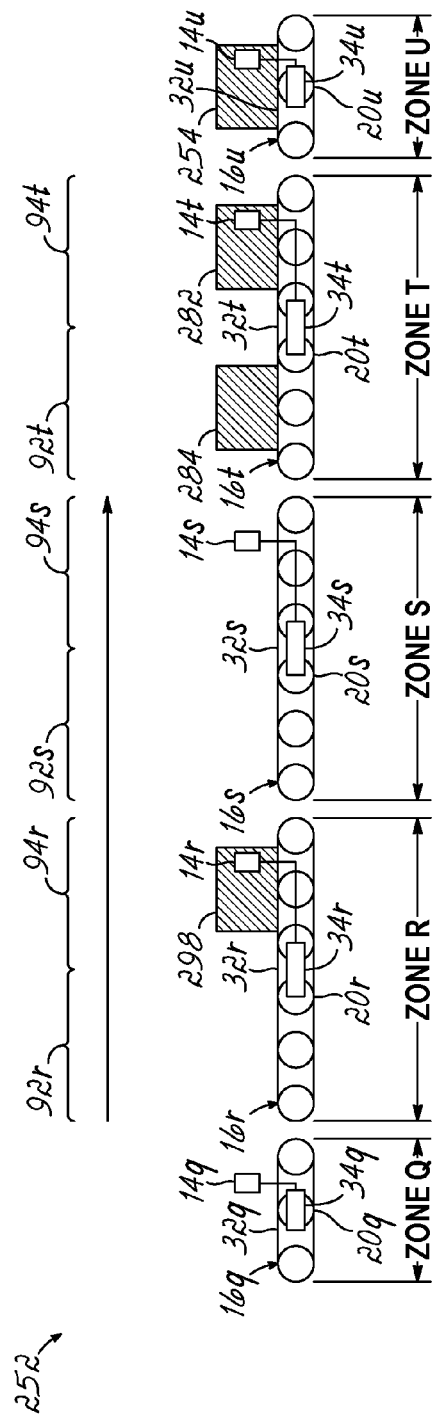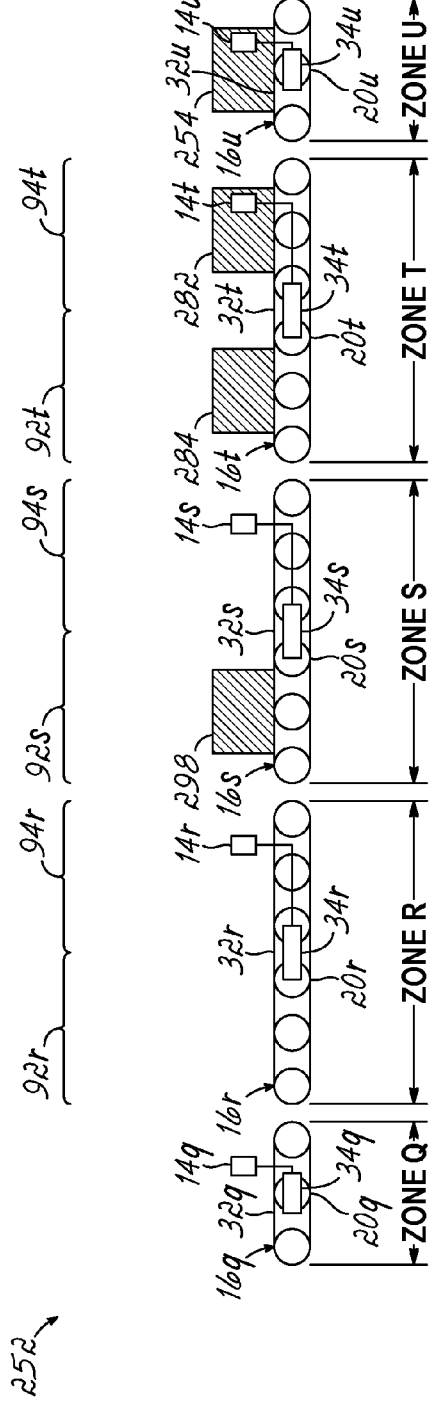

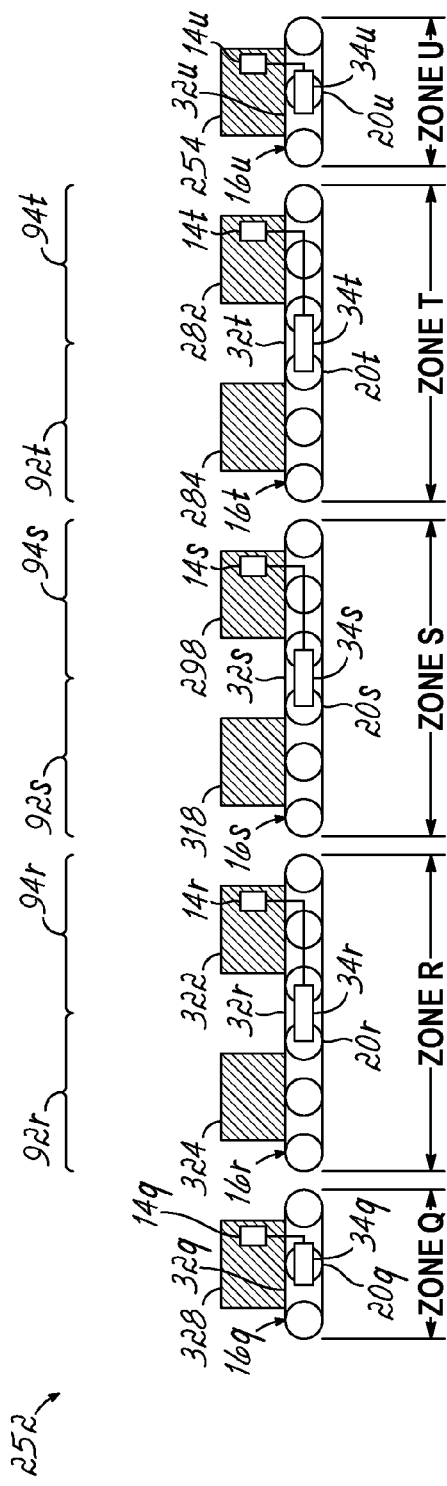
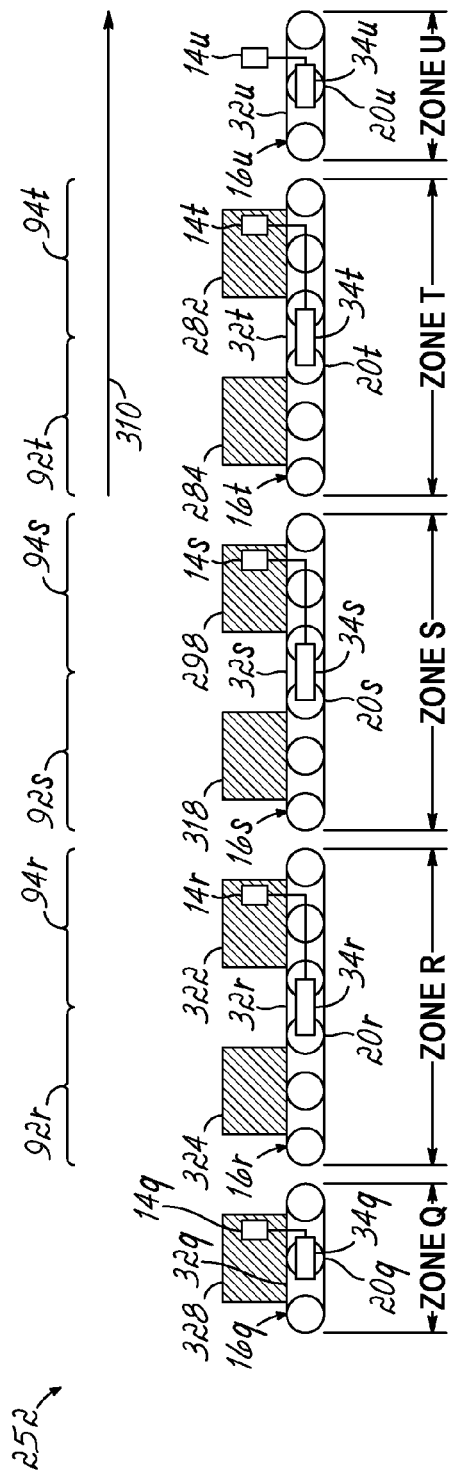
FIG. 17A
FIG. 17B

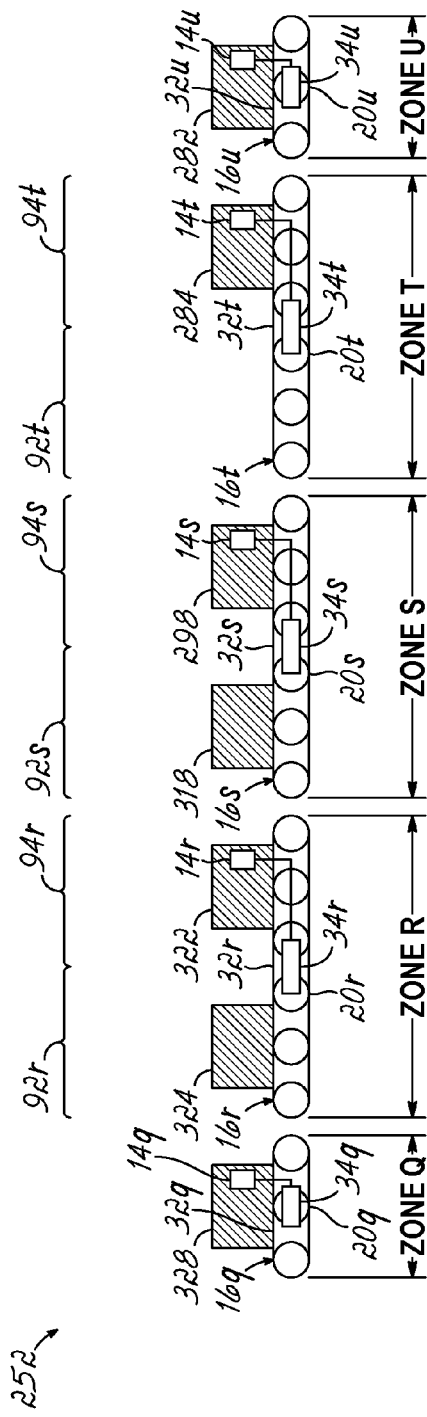
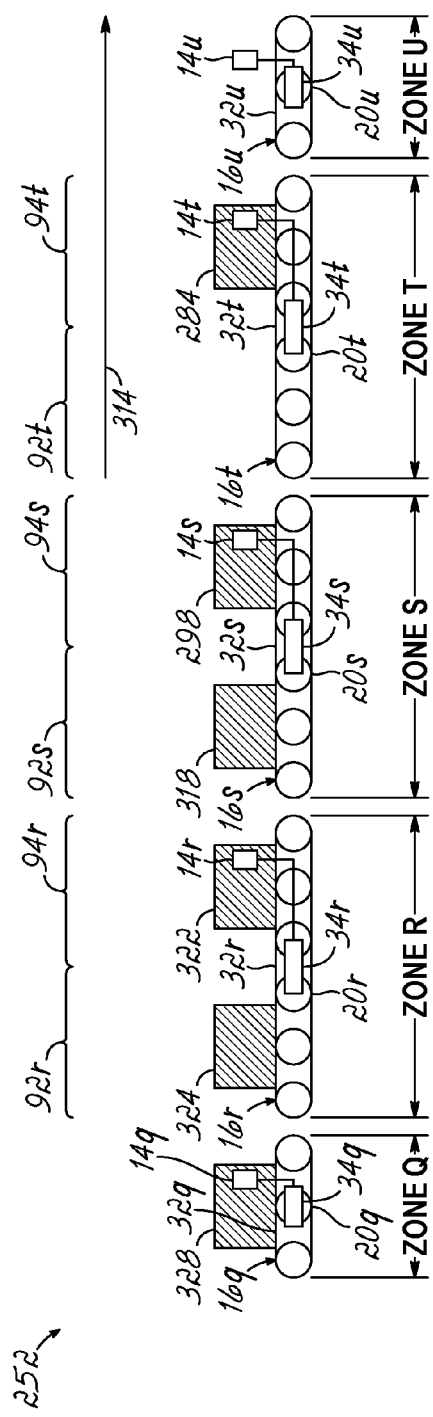
FIG. 17C
FIG. 17D

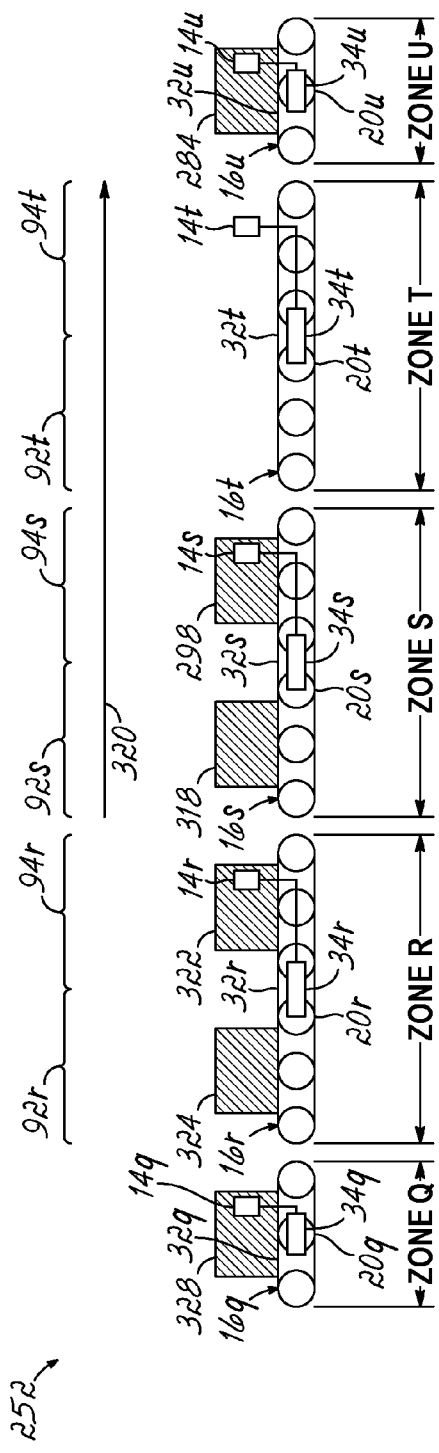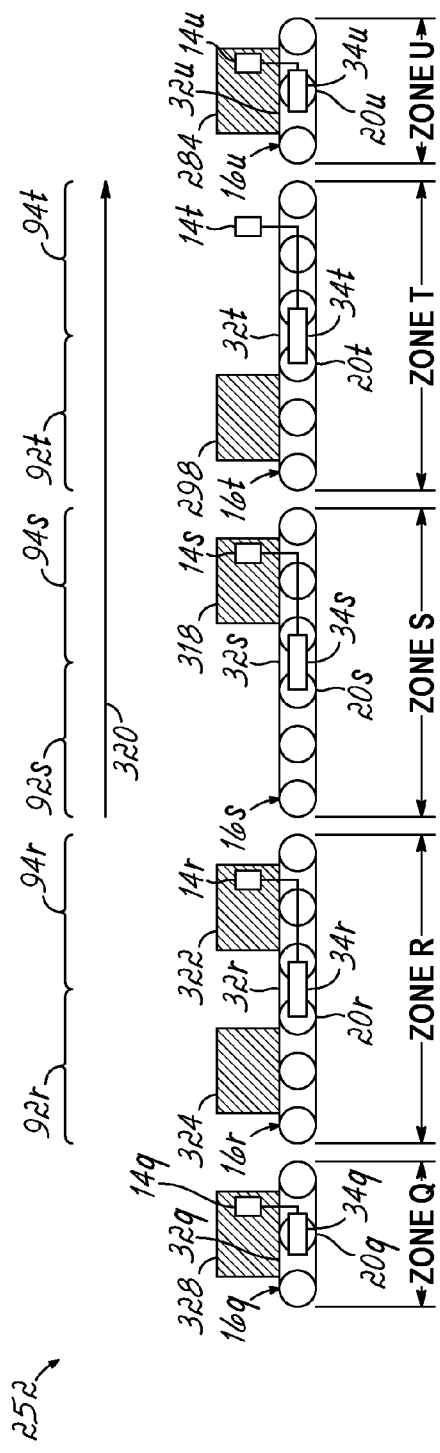

ZONE CONTROLLER FOR MODULAR CONVEYOR SYSTEM

TECHNICAL FIELD

The present invention relates controlling modular conveyor systems with networked conveyor zone controllers, and in particular, to zone controllers configured to manage multiple articles within a zone.

BACKGROUND

Conveyors are used in a number of applications to convey articles from a first point to a second point. Some common conveyor types include roller conveyors, which are typically comprised of a plurality of motorized and non-motorized rollers, and belt conveyors, which include belts that are driven by one or more motorized rollers. The conveyor may be controlled by a single centralized controller, or may be divided into multiple sections, or zones that are each controlled by a separate controller. In either case, the one or more controllers generally control the conveyor system by selectively activating motorized rollers or motors that operate the belt of the conveyor to move an article along the conveyor. In conventional conveyor controllers, the controller may also determine whether an article is being conveyed based on signals from presence sensors configured to detect the presence of an article on the conveyor, such as photo-eye sensors.

Motorized Drive Roller (MDR) conveyor systems use conveyor rollers that are driven by electric motors to move articles along the conveyor route. These types of conveyor systems typically include multiple independently controlled zones, with each zone having a single motor and an article presence sensor operatively coupled to a zone controller. The rollers of a zone are typically coupled to the driven roller so that the rollers operate in concert to selectively move an article through the zone in response to activation signals from the zone controller. The zone controller may be operatively coupled to adjacent zone controllers so that activation of the zone can be coordinated with the movement of articles upstream and downstream of the zone. A conveyor system may be implemented by arranging a plurality of these zones sequentially so that articles are transported in the conveying direction. These zones may include straight sections, curved sections, diverting sections, and merging sections so that articles may be received from and discharge to multiple locations. The modular characteristics of MDR conveyor zones facilitate reconfiguring conveyor systems by adding, removing, and reconfiguring zones within an existing conveyor system. An existing MDR conveyor system can thereby be changed and expanded as the needs of the conveyor operator evolve.

To achieve efficient conveyance of articles, a conveyor system should convey articles with short intervals, or gaps, between articles. Short spacing intervals increase article traffic density, and thus conveyor system throughput for a given conveyor operating speed. Short spacing intervals also reduce the overall length required in accumulation conveyor systems for a given article accumulation capacity. However, in order to prevent articles from colliding and/or being delivered to the wrong destination, conventional modular conveyor systems limit the number of articles to one per zone. Achieving short spacing intervals in a modular conveyor system using conventional zone controllers therefore requires short zones. This short zone requirement can significantly drive up costs of conveyor systems that have long spans or that accumulate large numbers of articles due to the large number of zones required to span the length of the conveyor system.

Consequently, there is a continuing need for improved methods and systems for modular conveyor control that reduce the cost of implementing modular conveyor systems, and that maintain or increase efficiency and throughput of modular conveyor systems.

SUMMARY OF THE INVENTION

In an embodiment of the invention, a method is provided for controlling a conveyor system including a plurality of zones. The method includes receiving an article in a zone of the plurality of zones and determining a position of the article in the zone with a controller that controls a drive roller of the zone. The method further includes activating the drive roller of the zone to position the article in a first region of the zone in response to the zone being in an accumulation mode, and activating the drive roller to position the article in a second region of the zone different from the first region in response to the zone not being in the accumulation mode.

In another embodiment of the invention, a method is provided for controlling a conveyor system including a first zone and a second zone. The method includes determining if a gap between a first article in the first zone and a second article in the second zone exceeds a predetermined length with a controller that controls the first zone. The method further includes positioning the first article in an upstream region of the first zone in response to determining the gap exceeds the predetermined length.

In another embodiment of the invention, a controller is presented for a conveyor system having a zone that includes a drive roller, a first region, and a second region different from the first region. The controller includes a processor and a memory including program code that when executed by the processor causes the controller to receive a first article in the zone and determine a position of the first article in the zone. The program code is further configured to cause the controller to activate the drive roller of the zone to position the article in the first region of the zone in response to the zone being in an accumulation mode, and activate the drive roller to position the article in the second region of the zone in response to the zone not being in the accumulation mode.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIGS. 6A-6I are sequential diagrammatic side views illustrating articles being conveyed by the conveyor system in FIGS. 5A-5P as articles are discharged from the system.

FIGS. 8A-8K are sequential diagrammatic side views illustrating articles being conveyed from a infeed zone and accumulated in a downstream zone.

FIGS. 9A-9F are sequential diagrammatic side views illustrating articles being accumulated within the conveyor system of FIG. 8A-8K until the conveyor system is filled.

FIGS. 11A-11F are sequential diagrammatic side views illustrating a process for closing a gap between articles of a conveyor system.

FIGS. 13A-13E are sequential diagrammatic side views illustrating another process for closing a gap between articles of the section of conveyor system of FIGS. 11A-11F.

FIGS. 15A-15L are sequential diagrammatic side views illustrating movement of articles in a conveyor system having controllers executing the sequence of operations shown in FIG. 14 during an article accumulation operation phase.

FIGS. 17A-17G are sequential diagrammatic side views illustrating movement of articles in a conveyor system having controllers executing the sequence of operations shown in FIGS. 14 and 16 during an article discharge operation phase.

It should be understood that the appended drawings are not necessarily to scale, presenting a somewhat simplified representation of various features that illustrate basic principles of embodiments of the invention. The specific design features of embodiments of the invention as disclosed herein, such as specific dimensions, orientations, locations, and shapes of various illustrated components, as well as specific sequences of operations (e.g., including concurrent and/or sequential operations), may be determined in part by the particular intended application and use environment. Certain features of the illustrated embodiments may have been enlarged or distorted relative to others to facilitate visualization and provide a clear understanding.

DETAILED DESCRIPTION

Figure 1:
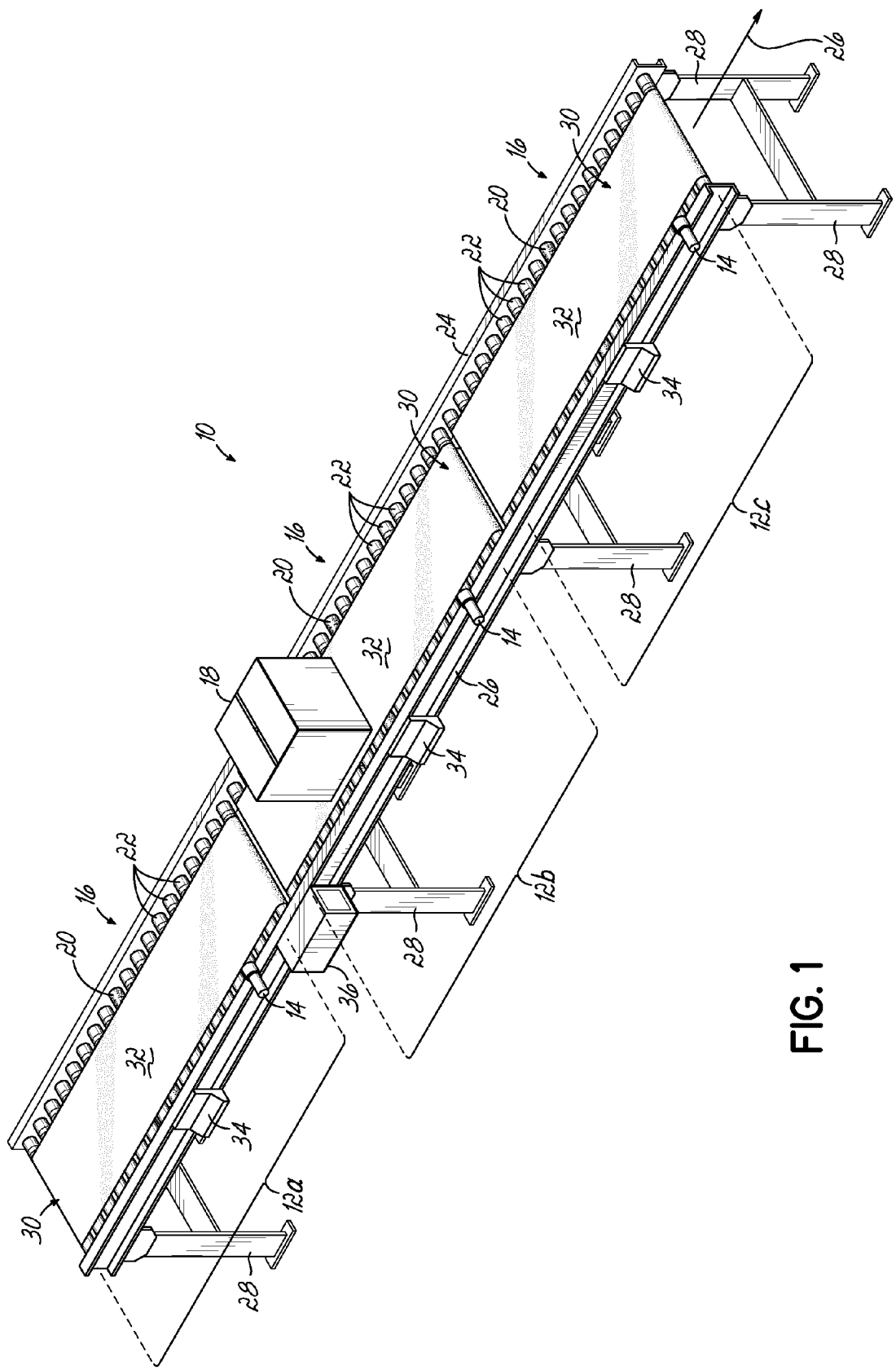
FIG. 1 is a perspective view of a section of a conveyor system that includes three zones each controlled by a zone controller.

FIG. 1 is a perspective illustration of a section of a modular conveyor system 10. The section includes three conveyor zones 12a-12c, with each conveyor zone including an article sensor 14 and a conveyor assembly 16. The article sensors 14 are configured to detect the presence or absence of an article 18 being conveyed on the conveyor assembly 16. The conveyor assembly 16 includes a drive roller 20 and a plurality of idler rollers 22 rotatably supported between a first side rail 24 and a second side rail 26. The first and second side rails 24, 26 are in turn supported by legs 28 so that the article 18 is conveyed at a desired height. In the illustrated embodiment, each conveyor assembly 16 also includes a conveyor belt 30 that provides a conveying surface 32 which supports the article 18. However, persons having ordinary skill in the art will understand that conveyor assemblies 16 having other conveying surfaces, such as rollers 20, 22 without conveyor belt 30, may be used.

Each zone 12a-12c includes a controller 34 that is operatively coupled to the article sensor 14 and drive roller 20. In the illustrated embodiment, the plurality of idler rollers 22 within each zone 12a-12c are rotatably coupled to the respective drive roller 20 by the conveyor belt 30. The rollers 20, 22 and conveyor belt 30 thereby operate in concert to move the article 18 through the conveyor zone 12a-12c in response to activation of the drive roller 20 by the controller 34. The conveyor system 10 may also include one or more power supply units 36 that provide power to one or more of the article sensors 14, drive rollers 20, and/or zone controllers 34. Although shown as having individual controllers 34 for each zone 12a-12c, the conveyor system 10 may also be implemented with multiple zones sharing a single controller. For example, in some embodiments, adjacent zones may share a single controller 34. One such conveyor system is described in U.S. Patent Application Pub. No. 2012/0290126, entitled "Conveyor Controllers", the disclosure of which is incorporated herein by reference in its entirety.

Figure 2:
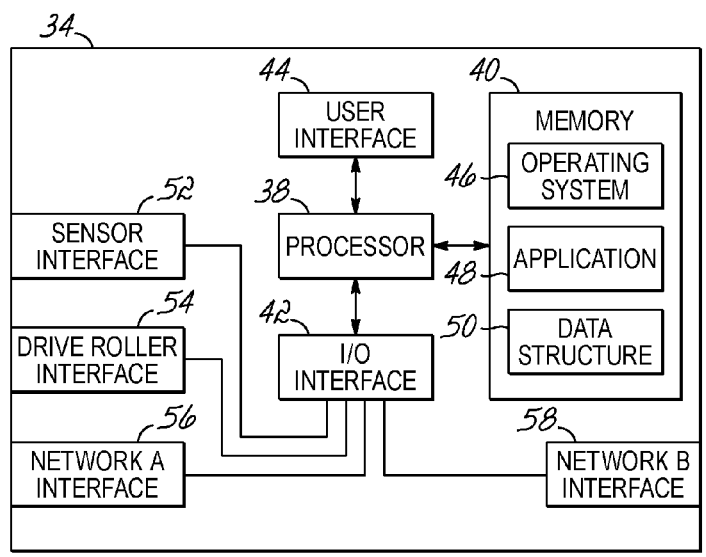
FIG. 2 is a schematic view illustrating details of the zone controllers of FIG. 1 including a controller application.

FIG. 2 is a block diagram schematic showing details of the controller 34. The controller 34 includes a processor 38, a memory 40, an input/output (I/O) interface 42, and a user interface 44. The processor 38 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 40. Memory 40 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing digital information. Memory 40 may also include a mass storage device (not shown) such as a hard drive, optical drive, tape drive, non-volatile solid state device or any other device capable of storing digital information.

Figure 3:
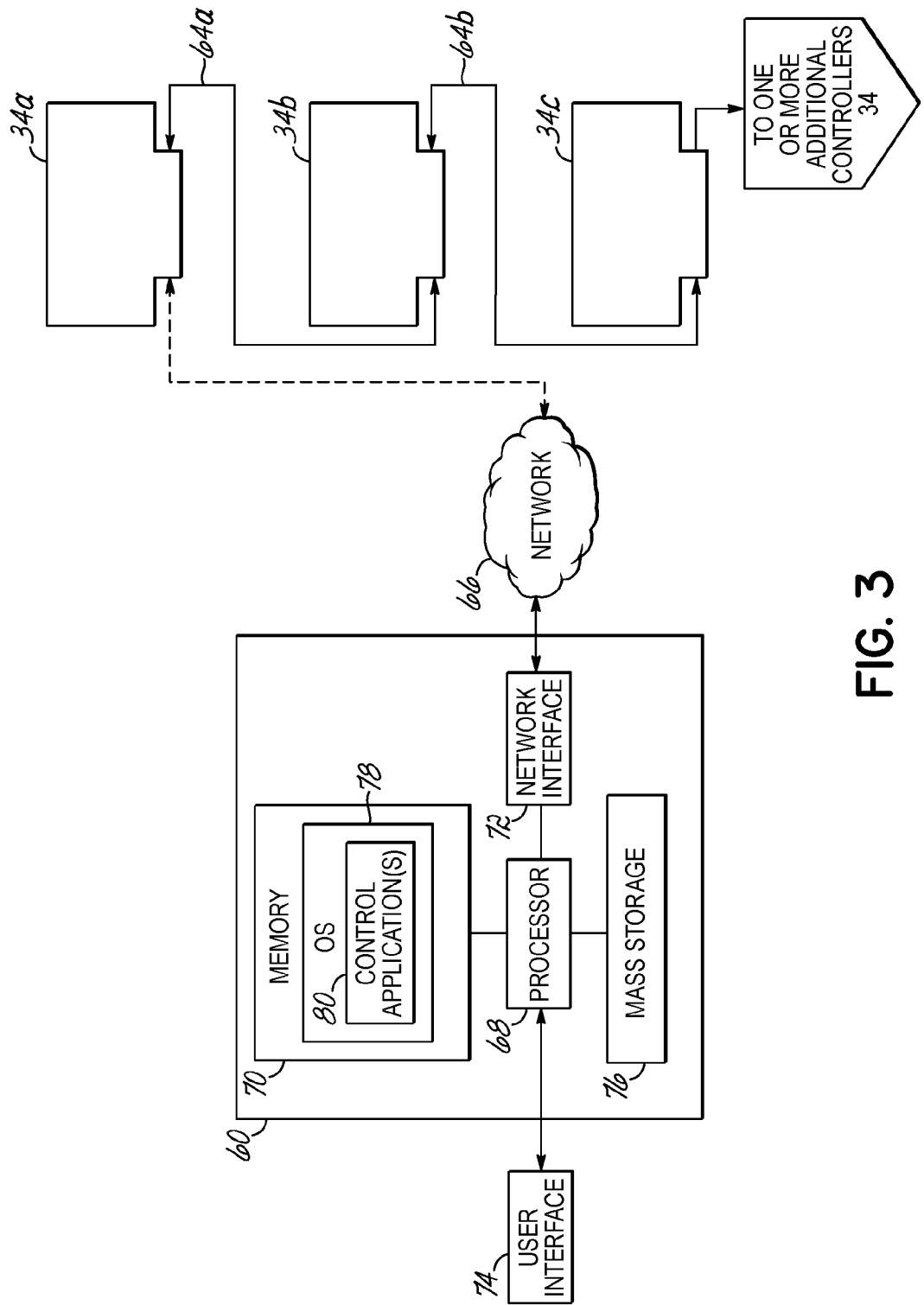
FIG. 3 is schematic view illustrating details of the interconnections between the three zone controllers of FIG. 1 and an optional supervisory control system.

Processor 38 may operate under the control of an operating system 46 that resides in memory 40. The operating system 46 may manage controller resources so that computer program code embodied as one or more computer software applications, such as a controller application 48 residing in memory 40 may have instructions executed by the processor 38. In an alternative embodiment, the processor 40 may execute the controller applications 48 directly, in which case the operating system 46 may be omitted. One or more data structures 50 may also reside in memory 40, and may be used by the processor 38, operating system 46, and/or controller application 48 to store data. The I/O interface 42 operatively couples the processor 38 to other components of the conveyor system 10 through various interfaces including a sensor interface 52 configured to be coupled with sensor 14, a drive roller interface 54 configured to be coupled to the drive roller 20, and network A and network B interfaces 56, 58, which are configured to operatively couple the controller 34 to controllers 34 of one or more adjacent zones 12a-12c, and/or a supervisory control system 60 (FIG. 3). The I/O interface 42 may include signal processing circuits that condition incoming and outgoing signals so that the signals are compatible with both the processor 38 and the components to which the processor 38 is coupled. To this end, the I/O interface 42 may include analog to digital (A/D) and/or digital to analog (D/A)

converters, voltage level and/or frequency shifting circuits, optical isolation and/or driver circuits, and/or any other analog or digital circuitry suitable for operatively coupling the processor 38 to the other components of the conveyor system 10.

The user interface 44 may be operatively coupled to the processor 38 of controller 34 in a known manner to allow a system operator to interact with the controller 34. To this end, the user interface 44 may include output devices, such as alphanumeric displays, a touch screen, a speaker, one or more light emitting diodes, and/or other audio and visual indicators. The user interface 44 may also include input devices and controls such as the aforementioned touch screen, an alphanumeric keyboard, a pointing device, keypads, pushbuttons, control knobs, microphones, Universal Serial Bus (USB) ports, and the like, capable of accepting commands or input from the operator and transmitting the entered input to the processor 38.

Figure 4:
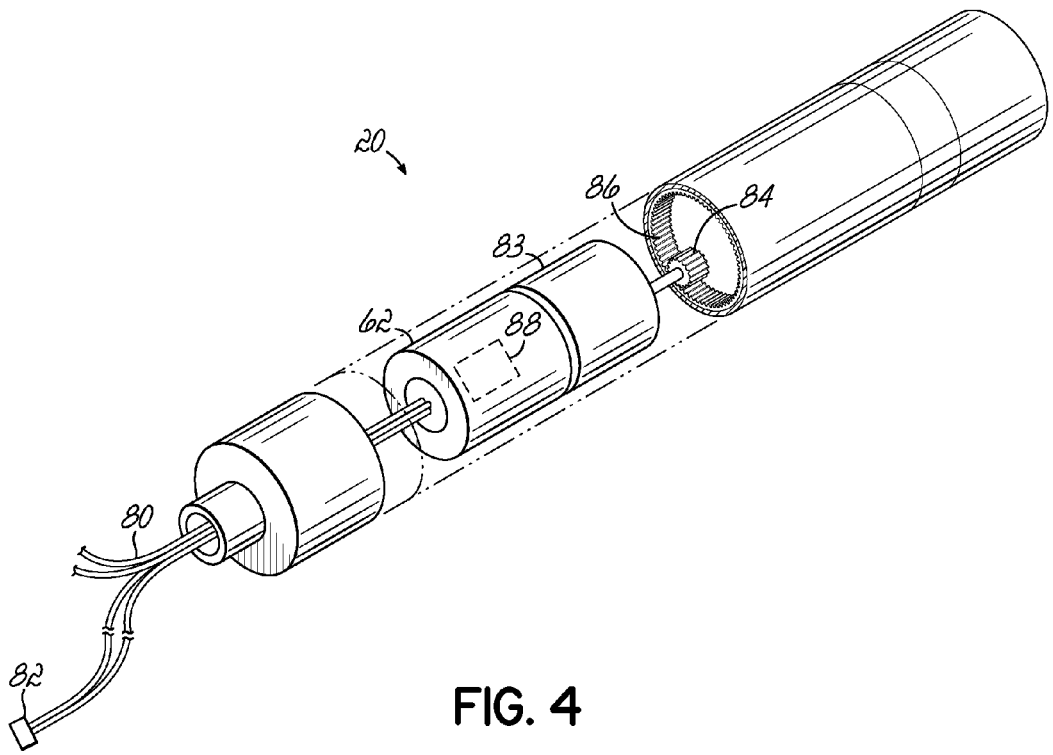
FIG. 4 is a partial cut-away perspective view of a motorized roller of the conveyor system of FIG. 1.

The controller application 48 includes program code that—when executed by the processor 38—controls the drive roller 20 by selectively providing power to a motor 62 (FIG. 4). The controller application 48 thereby controls or sets the operational state of the drive roller 20. Examples of drive roller operational states include forward rotation, reverse rotation, stopped or idle, and braking. The application 48 may also determine the rotational state of the drive roller 20 based on signals received via the drive roller interface 54. In a specific embodiment of the conveyor system 10, brushless DC ("BLDC") motor commutation control may be provided to the motor 62 by the processor 38 selectively energizing the stator windings of the motor 62 via the drive roller interface 54. The drive roller interface 54 may also include an ability to control a brake (not shown) associated with the drive roller 20. Sensor signals received via the sensor interface 52 may provide the controller application 48 with information relating to the presence or absence of the article 18 at the location of the article sensor 14. As will be described in more detail below, the controller application 48 may use these sensor signals in combination with data regarding the rotational state of the drive roller 20 and data received from adjacent controllers 12a-12c to determine a location of one or more articles 18 in the conveyor system 10.

Referring now to FIG. 3, the controllers 34a-34c are each typically configured to operate in conjunction with at least one additional controller 34a-34c. The controllers 34a-34c may also be controlled externally, such as with the supervisory controller 60. To this end, the controllers 34a-34c may be interconnected in a daisy chain arrangement via communication links 64a-64b. Controllers 34a-34c may thereby communicate directly with adjacent controllers 34a-34c, or indirectly with non-adjacent controllers via an intervening controller 34a-34c. Controllers 34a-34c associated with an end zone of the conveyor system, which may be an infeed zone or a discharge zone, may be coupled to the supervisory control system 60, either directly or through a network 66.

The optional supervisory control system 60 may be configured to control and obtain data from the controllers 34a-34c to provide centralized control and monitoring of the conveyor system 10. The supervisory control system 60 includes a processor 68 coupled to a memory 70, a mass storage device 72, a network interface 74, and a user interface 76. Similarly as described above with respect to the controllers 34a-34c, the processor 68 may include one or more devices that manipulate signals (analog or digital) based on operational instructions that are stored in the memory 70. Memory 70 may be a single memory device or a plurality of memory devices and may also include memory storage physically located elsewhere, such as cache memory in the processor 68. Memory 70 may also include storage capacity used as a virtual memory, such as storage capacity in mass storage device 76. The network interface 72 allows the processor 68 to communicate over the network 66, and may be connected to the network 66 via a wireless link (e.g., through one of the IEEE 802 Wi-Fi standards) and/or through a hard-wire link (e.g., an Ethernet link). The network 66 may include one or more private communications networks (e.g., a Local Access Network (LAN) or intranet) and/or a public communications network (e.g., the Internet).

The user interface 74 may be operatively coupled to the processor 68 to allow the system operator to interact with the supervisory controller 60. To this end, the user interface 74 may include output devices, such as video displays, alphanumeric displays, touch screens, speakers, and other audio and visual indicators. The user interface 74 may also include input devices and controls such as the aforementioned touch screens, an alphanumeric keyboard, a pointing device, keypads, pushbuttons, control knobs, microphones, Universal Serial Bus (USB) ports, and the like, capable of accepting commands or input from the operator and transmitting the entered input to the processor 68.

The supervisory control system 60 is typically under the control of an operating system 78 and executes or otherwise relies upon various computer software applications, sequences of operations, components, programs, files, objects, modules, etc., consistent with embodiments of the invention. In specific embodiments, the supervisory control system 60 executes or otherwise relies on a control application 80 to manage the operation of the controllers 34a-34c and the conveyor system 10.

FIG. 4 is a partially transparent view of a drive roller 20 configured as a Motorized Drive Roller (MDR). The drive roller 20 may be connected to its associated zone controller 34 through a multi-conductor cable 80, which may be terminated with a multi-pin connector 82 configured to engage the drive roller interface 54 of the controller 34. Cable 80 thereby provides various signals or connections to the components of the drive roller 20, such as the BLDC motor 62. When activated, the motor 62 generates torque that is conveyed to the drive roller 20 via a transmission 83. The transmission 83 may be coupled to the drive roller 20 with a pinion gear 84 that engages a ring gear 86 on an inner surface of the drive roller 20. The transmission 83 thereby translates rotation of the motor 62 into rotation of the drive roller 20 at a fixed ratio. In specific embodiments, the transmission 83 may translate sixty rotations of the motor 62 into one rotation of the drive roller 20 so that the transmission 62 has a ratio of approximately 60:1. The motor 62 may also include a rotation sensor circuit 88 comprising one or more sensors, such as Hall effect sensors, that generate signals related to the rotational position of the motor 62. The rotation sensor circuit 88 may also include data regarding operational characteristics of the drive roller 20, such as the transmission ratio between the motor 62 and drive roller 20. Based on signals and operational characteristics data received from the rotation sensor circuit 88, the controller application 48 may determine the rotational position of the drive roller 20, which in turn is related to a linear position of the conveying surface 32.

Figure 5A:
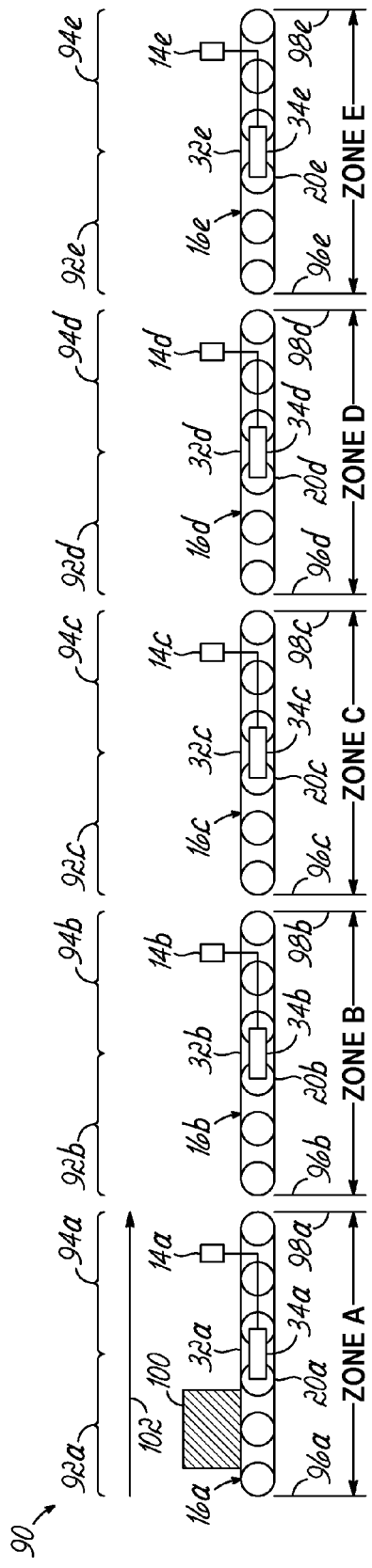
FIGS. 5A-5P are sequential diagrammatic side views illustrating articles being conveyed within a conveyor system having five zones as articles are introduced into the system.
Figure 5B:
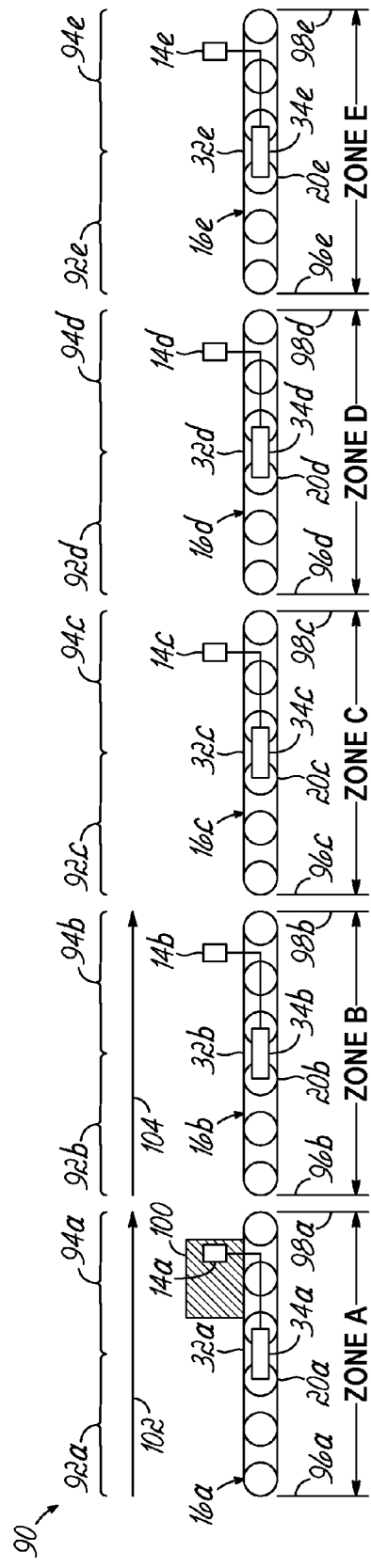
Figure 5C:
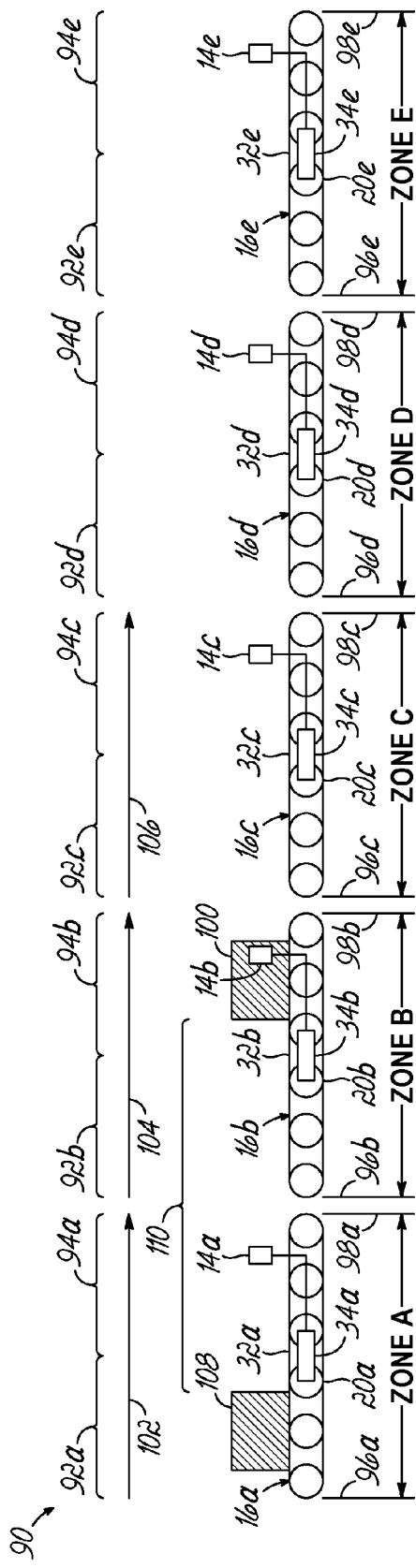
Figure 5D:
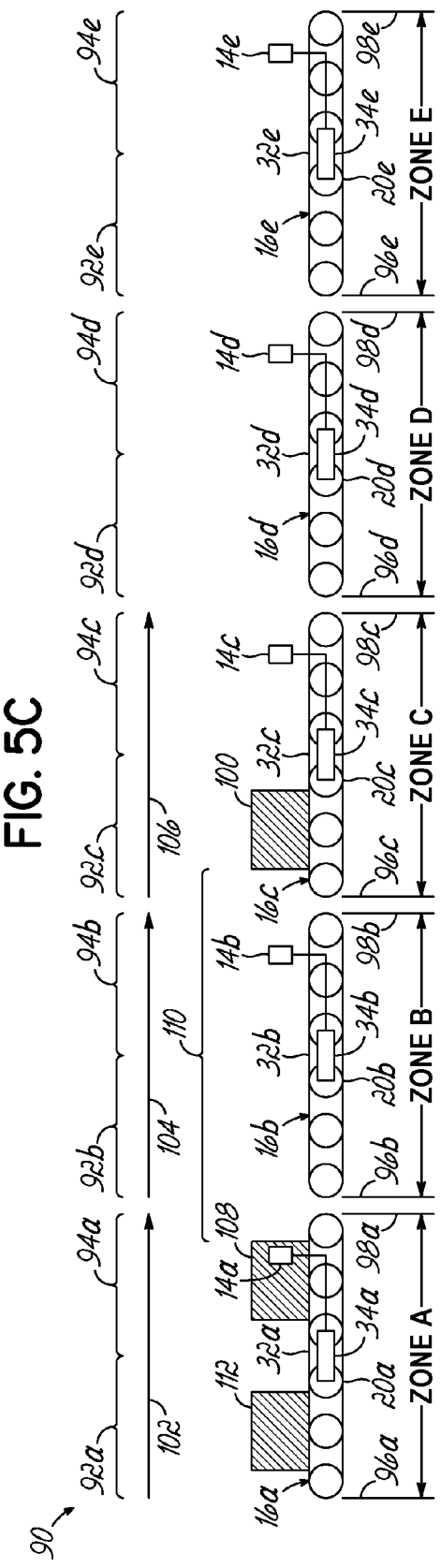
Figure 5G:
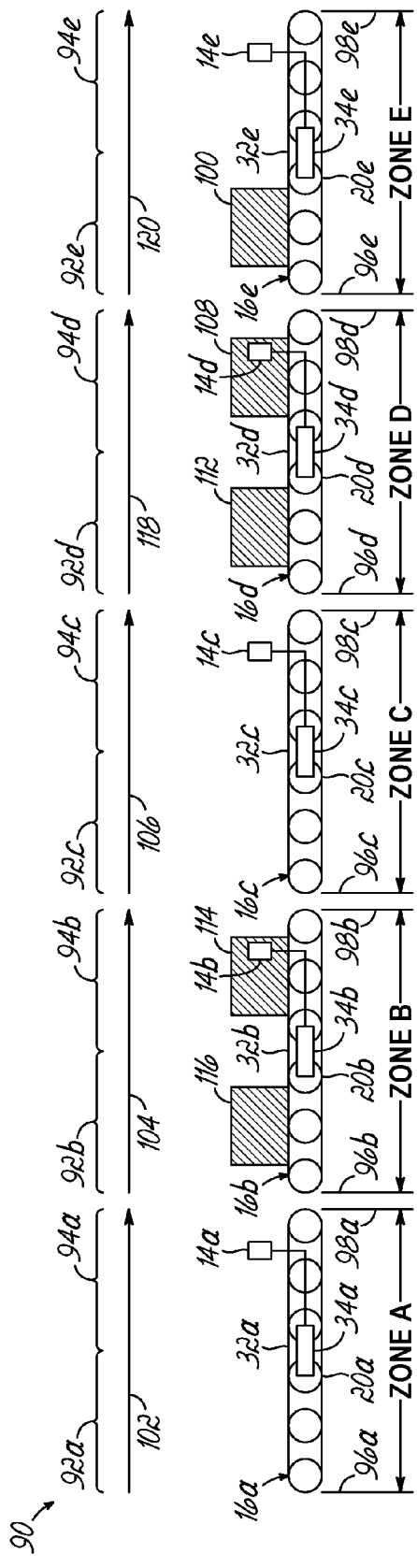
Figure 5H:
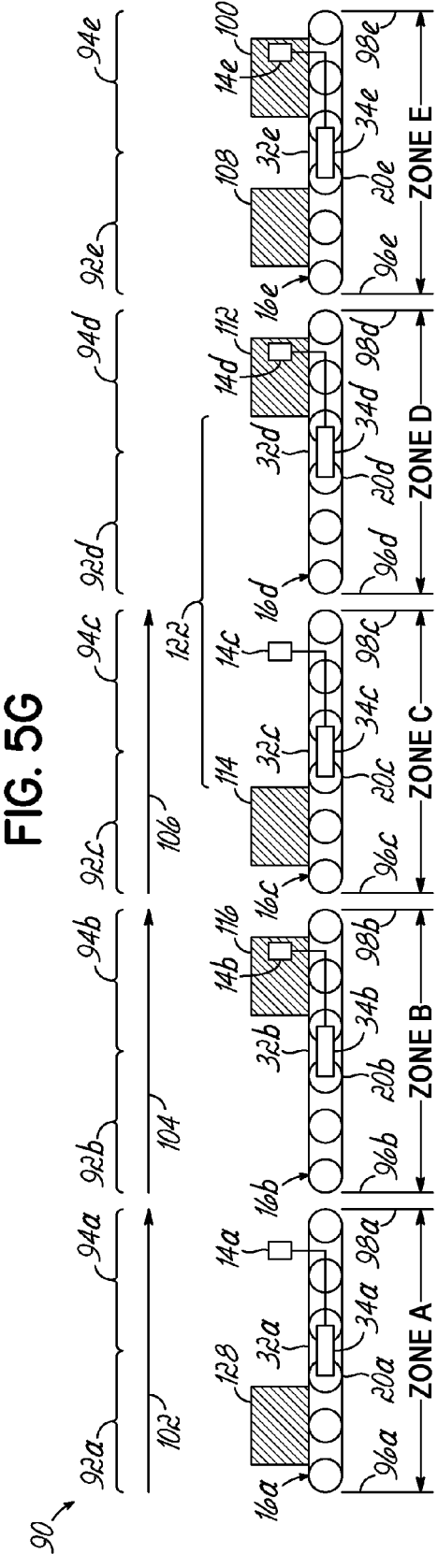
Figure 5O:
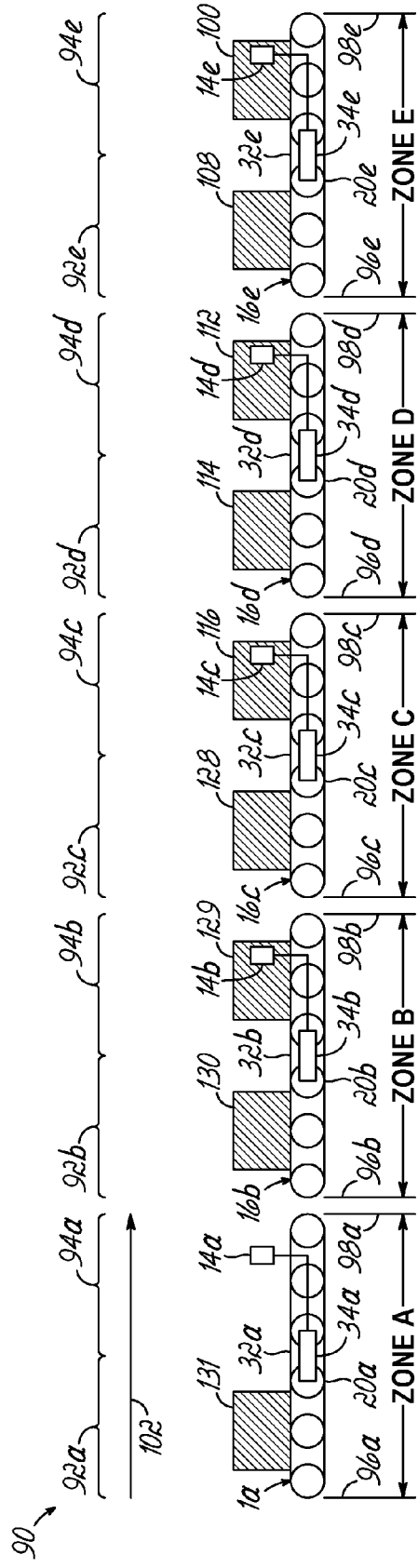
Figure 5P:
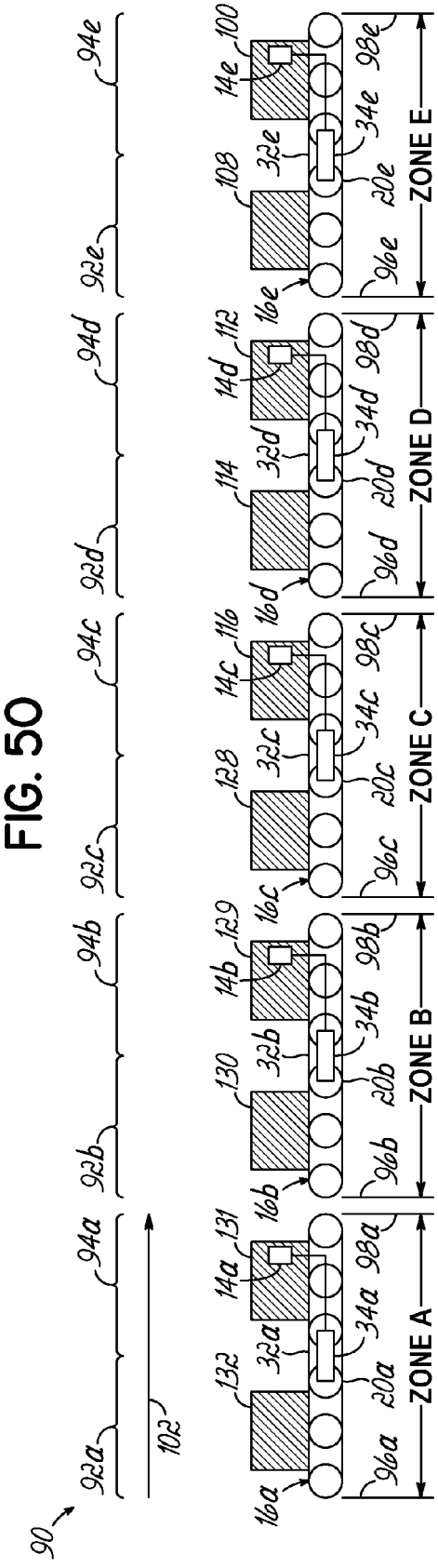
Figure 6C:
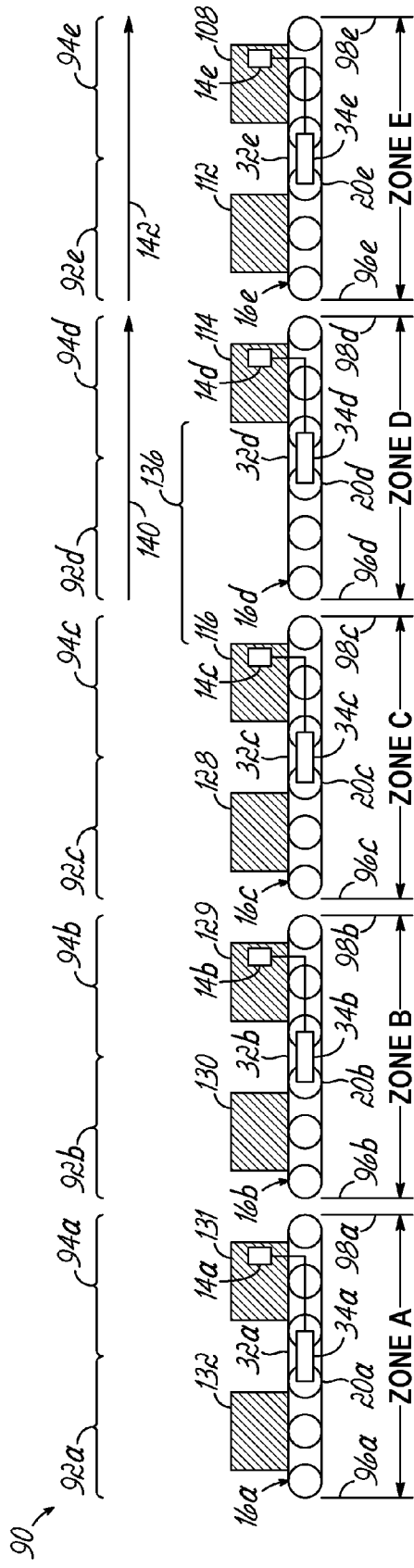
Figure 6D:
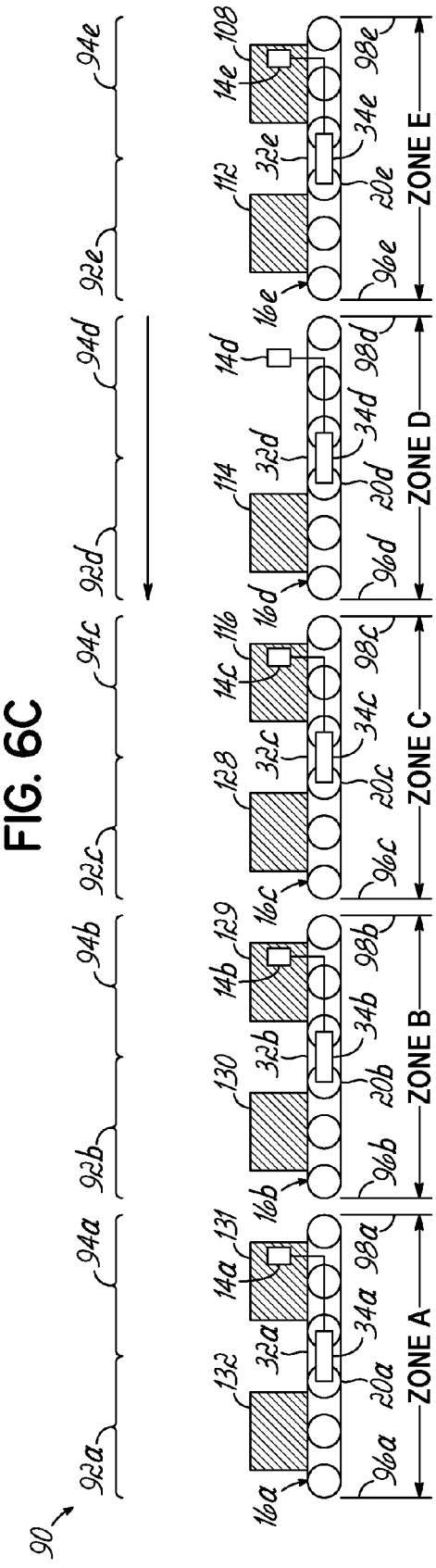
Figure 6E:
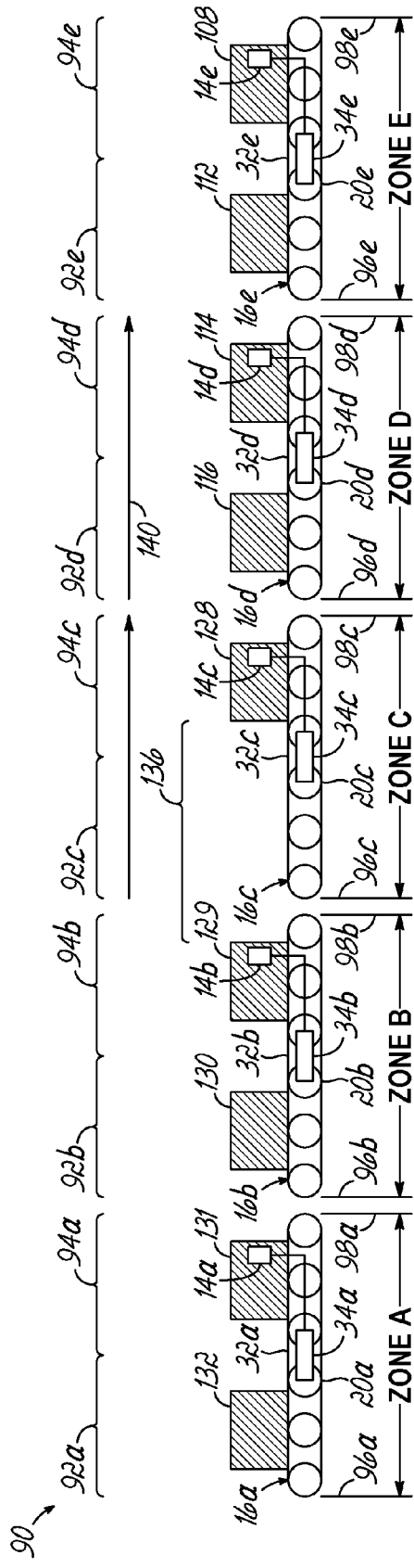
Figure 6F:
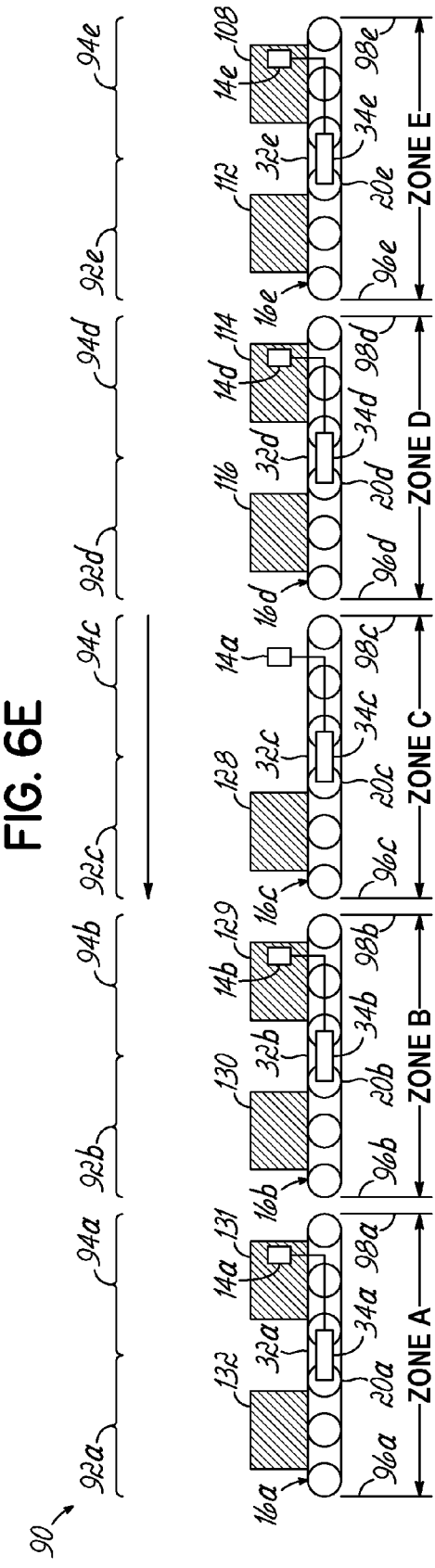
Figure 6G:
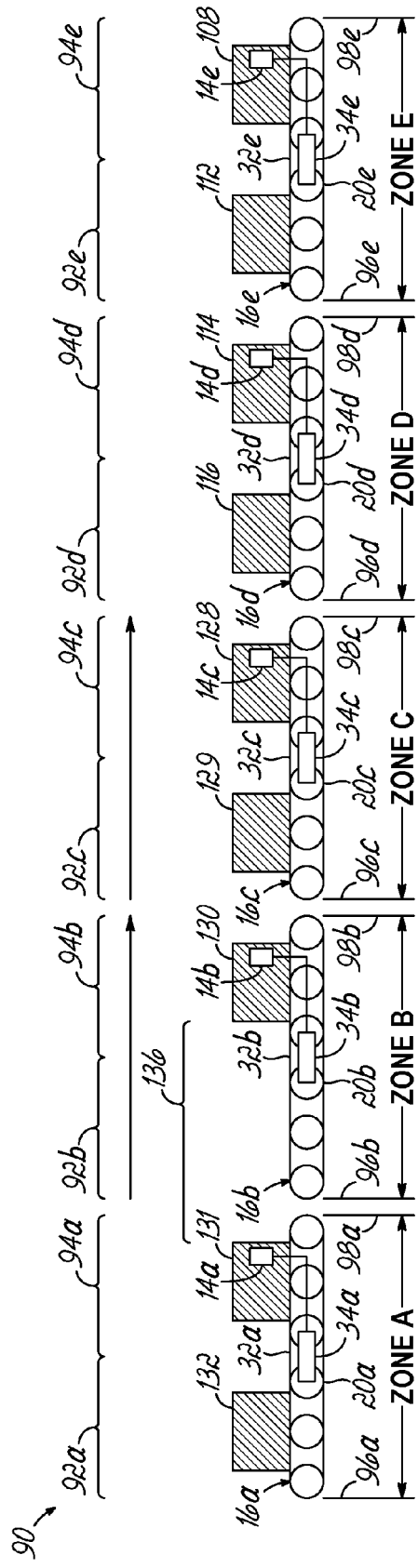
Figure 6H:
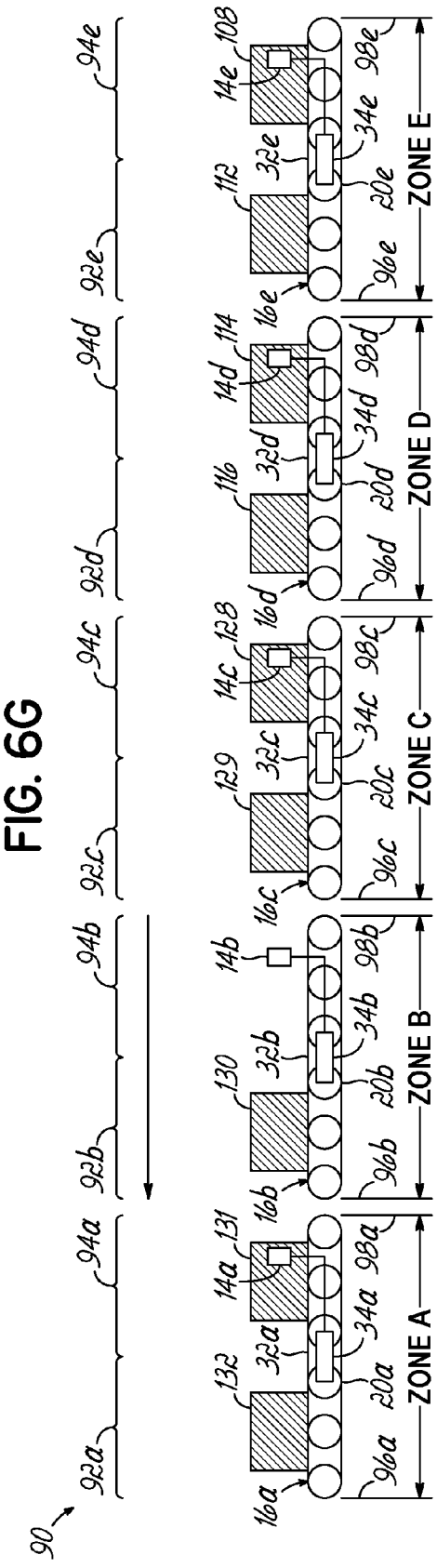
Figure 6I:
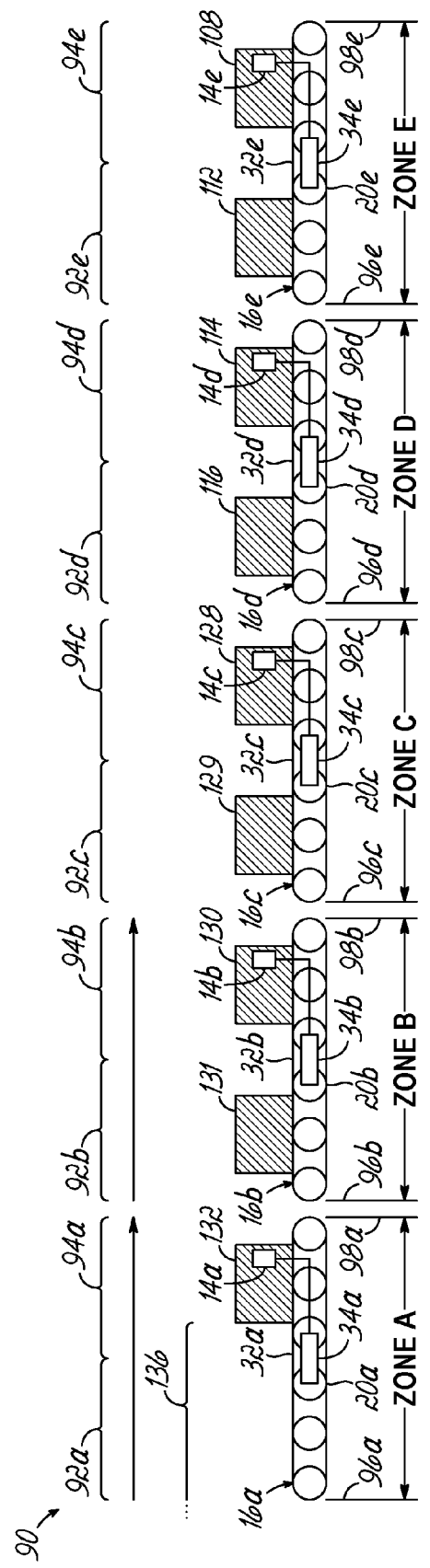

Referring now to FIGS. 5A-5P, an exemplary conveyor system 90 includes five conveyor zones A-E each having an upstream region 92a-92e and a downstream region 94a-94e. The upstream and downstream regions 92a-92e, 94a-94e are each configured to accommodate an article, so that each zone A-E is capable of accommodating two articles. In an embodiment of the invention, articles may be transported in trays that are placed on the conveyor. Therefore, the term "article" as used herein should be considered synonymous with "tray" as well as any other container or object being transported by the conveyor system 90. Although each zone is illustrated as accommodating two articles in this exemplary embodiment, persons having ordinary skill in the art will understand that zones could also be made sufficiently long to accommodate more than two articles. Embodiments of the invention are therefore not limited to zones having two article accommodating regions. Each zone A-E also includes an upstream boundary 96a-96e that defines an upstream end of the zone, and a downstream boundary 98a-98e that defines a downstream end of the zone. The zones A-E are connected in series so that the upstream boundary 96b-96e of a downstream zone is generally adjacent to the downstream boundary 98a-98d of the adjacent upstream zone except for infeed zone A and discharge zone E, which are adjacent to a single downstream zone (in the case of zone A) or a single upstream zone (in the case of zone E). The conveyor system 90 is thereby configured to receive articles in zone A and generally convey articles in a downstream direction that runs from left to right by selective activation of the drive rollers 20a-20e of zones A-E until the article reaches zone E, where the article may remain until discharged.

Each conveyor zone A-E includes an article sensor 14a-14e that detects the presence or absence of an article in the downstream region 94a-94e and that is typically located near the downstream end of the zone. When an article 100 is located in the upstream region 92a-92e, as shown in FIG. 5A, the article is considered to be in a "virtual position" within the zone because the location of the article 100 is not directly detected by the sensor 14a. When the article 100 is in one of the downstream regions 94a-94e, such as downstream region 94a as shown in FIG. 5B, the position of the article 100 is detected by the sensor 14a and is therefore in a "sensor position." Each zone A-E also includes a conveyor assembly 16a-16e that selectively conveys articles on a conveying surface 32a-32e in an upstream or a downstream direction in response to activation signals from the zone controller 34a-34e. Each zone A-E is described herein as being controlled by a separate zone controller 34a-34e that is in communication with the zone controllers 34a-34e for adjacent zones. However, in an alternative embodiment of the invention, a zone controller 34 may control a plurality of zones (e.g., a single controller 34 may control two adjacent zones). In any case, as illustrated in the exemplary embodiment, zone A is an infeed zone that receives articles into the conveyor system 90. Zone B, zone C, and zone D are transfer zones that receive articles from an adjacent upstream zone and convey the articles to an adjacent downstream zone. Zone E is a discharge zone that receives articles from zone D and discharges articles in a controlled manner at an article destination point, such as a vehicle loading area in a warehouse.

In operation, the conveyor zones may initially be in an inactive or "sleep mode" due to a period of inactivity or based on a determination that the conveyor system 90 does not have any articles to convey. In response to a first article 100 being received by the infeed zone A, the controller 34a may activate the drive roller 20a, causing the conveying surface 32a to begin moving in a downstream direction as indicated by arrow 102. The controller 34a may be configured to detect the presence of the first article 100 based on movement of the drive roller 20a caused by the system operator gently urging article 100 in a downstream direction. This movement may be determined based on signals received from the rotation sensor circuit 88 (FIG. 4) of drive roller 20a indicating that the drive roller 20a is being turned while the motor 62 (FIG. 4) of drive roller 20a is in an inactive state. Based on this sensed movement, the controller 34a may activate the drive roller 20a to move the first article 100 in a downstream direction in what is referred to as a "touch and go" start. In an alternative embodiment of the invention, rather than relying on a touch and go start, zone A may run continuously in response to the controller 34b indicating that zone B is able to receive articles. In another alternative embodiment of the invention, the controller 34a of may begin operating in response to the system operator pressing a button or otherwise activating the zone controller 34a to convey the first article 100 downstream. In yet another alternative embodiment of the invention, zone A may only include a single region, so that an article placed on the conveyor surface 32a will be in the sensor position. The controller 34a in this embodiment may thereby receive a signal from the sensor 14a whenever an article is placed on the conveyor surface 32a, and the controller 34a may activate the conveyor in response to receiving the signal from the sensor 14a. An example of a conveyor system that has single region infeed and discharge zones is illustrated in FIG. 8A.

Referring now to FIG. 5B, as the first article 100 moves downstream in zone A, the presence of the first article 100 is detected as the first article 100 passes the sensor 14a. As the first article 100 passes the sensor 14a, the controller 34a may determine the length and position of the first article 100 based on signals from the sensor 14a and the rotation sensor circuit 88 of drive roller 20a. The zone controller 34a may then generate a data structure 50 associated with the first article 100 that includes data relating to the length and position of the first article 100. This data structure may be updated with new data as the position of the first article 100 changes, and may be transmitted to the adjacent controller 34b. As the first article 100 approaches the downstream boundary 98a, the controller 34a may transmit an article accept request to the adjacent downstream controller 34b, thereby requesting permission to discharge the first article 100 into the downstream zone B. This request may include the first article data structure so that information relating to the length and position of the first article 100 is provided to the controller 34b of zone B. In response to the request, the downstream controller 34b may: (1) provide a signal or message indicating whether the downstream zone is able to receive the first article 100; and if so (2) activate the drive roller 20b of the zone B to move the conveying surface 32b in a downstream direction as indicated by arrow 104.

Referring now to FIG. 5C, as the first article 100 moves through zone B, the position data in the data structure 50 associated with the first article 100 may be updated by the controller 34b based on signals received from the rotation sensor circuit 88 of drive roller 20b. Similarly as described above with regard to the article being received by zone B, the updated data structure 50 may be transmitted from the controller 34b of zone B to the controller 34c of zone C as the first article 100 is discharged by zone B. The length and position of the first article 100 may also be updated by the controller 34b based on signals from sensor 14b to correct for slippage between the first article 100 and the conveying surface 32b. In response to the first article 100 approaching the downstream boundary 98b, the controller 34b of zone B may transmit an accept article request to the controller 34c of zone C. In response, the downstream controller 34c may activate the drive roller 20c to move the conveying surface 32c in a downstream direction as indicated by arrow 106. This process may be repeated at each zone boundary so that the article 100 continues to move down the conveyor system 90.

As the first article 100 moves downstream, a second article 108 may be received by zone A. The second article 108 may be received after a random interval of time has passed so that a gap 110 exists between the first and second articles 100, 108. In FIG. 5D, a third article 112 is received in the upstream region 92a by zone A after the second article 108 has moved to the downstream region 94a, so that zone A contains one article 108 in the sensor position and one article 112 in the virtual position. The controller 34a of zone A may generate a data structure for each of the second and third articles 108, 112 that includes data relating to the length and position of the second and third articles 108, 112. These data structures may be exchanged between the zone controllers 34a-34e in a similar manner as described with respect to the data structure associated with the first article 100. In this way, the controllers 34a-34e may collectively track the positions and lengths of articles in their respective zones and pass this information to adjacent controllers as the articles move across zone boundaries. The controllers 34a-34e may also use this data to determine the length of the gap 110, and make decisions regarding the positioning of articles within their respective zones based on this gap length. For example, if the length of the gap 110 exceeds a predetermined length (e.g., a length sufficient to accommodate an article), a downstream controller may hold the first article 100 in the upstream region of the controlled zone until the gap 110 is reduced below the predetermined length.

Referring now to FIGS. 5E-5F, as the first article 100 continues to move downstream, additional articles (e.g., a forth article 114, and a fifth article 116) may be received by zone A at random intervals so that articles having a random spacing are being transported by the conveyor system 90. Thus, at any given moment, a particular zone may have no articles, one article, or two articles. As discussed above, alternative embodiments of the invention may have zones with sufficient length to accommodate more than two articles (e.g., three articles). The conveyor system may also be comprised of greater or fewer numbers of zones than illustrated. Embodiments of the invention are therefore not limited any particular number of zones, or zones dimensioned to accommodate any particular number or size of articles.

As best shown in FIG. 5F, in response to receiving the first article 100, the controller 34e of zone E may determine that the gap 110 between the first article 100 and the next upstream article (e.g., the second article 108) has sufficient length to hold one or more articles. This determination may be based at least in part on data included in data structures associated with the first and second articles 100, 108, which may have been received from the controller 34d of zone D. In response to determining the presence of the gap 110, the controller 34e may deactivate the drive roller 20e so that the first article 100 remains in the virtual position adjacent to the upstream boundary 96e of zone E.

As the second and third articles 108, 112 continue downstream, the gap 110 is reduced until the second article 108 is adjacent to the first article 100 as shown in FIG. 5G. In response to the gap 110 being reduced or eliminated, the controller 34e may reactivate the drive roller 20e so that the first article 100 is conveyed to the downstream region 94e of zone E and the second article 108 is received by the upstream region 92e of zone E. This reactivation may be in response to a receiving an accept article request from the controller 34d requesting permission to discharge the second article 108 into zone E. The resulting forward movement of the conveying surfaces 32d, 32e of zone D and zone E (as indicated by arrows 118 and 120, respectively) conveys the first and second articles 100, 112 into zone E as illustrated in FIG. 5H. In response to determining that zone E is full, the controller 34e may deactivate the drive roller 20e and send a signal to the controller 34d indicating that zone E is not accepting articles.

In response to receiving the signal from the controller 34e of zone E indicating that zone E is not accepting articles, the controller 34d of zone D may deactivate the drive roller 20d with the third article 112 positioned in the downstream region 94d of zone D. The controller 34d may further determine that the upstream region 92d is unoccupied. The controller 34d may make this determination based in part on the absence of an accept article request from the upstream controller 34c subsequent to receiving article 112, or based on some other suitable communication with the upstream controller 34c. The controller 34d may also make this determination based on position data for the third article 112 indicating that the upstream region 92d of zone D does not contain an article.

Referring now to FIG. 5I, in an embodiment of the invention, and response to determining that the upstream region 92d is unoccupied, the controller 34d may activate the drive roller 20d in a reverse direction so that the third article 112 is moved in an upstream direction as indicated by arrow 124. The controller 34d may track the position of the third article 112 using signals received from the rotation sensor circuit 88 of drive roller 20d to place the third article 112 in the upstream region 92d. In this way, the controllers 34c, 34d of the adjacent zones C and D may work cooperatively to close a gap 122 between consecutive articles 112, 114.

In response to a determination that the third article 112 has reached the virtual position in zone D, the controller 34d may deactivate the drive roller 20d and wait for an article accept request from the controller 34c of zone C requesting that zone D receive the fourth article 114. In response to receiving the request, the controller 34d of zone D may activate the drive roller 20d to move the conveying surface 32d in a downstream direction (as indicated by arrow 126) so that the third article 112 is moved back into the downstream region 94d and the fourth article 114 is received into the upstream region 92d of zone D as shown in FIG. 5J. In this way, the zone controllers 34c-34e may interact cooperatively to arrange articles so that zones D and E are fully occupied.

Referring now to FIGS. 5K-5P and with continued reference to FIGS. 5H-5J, as additional articles 128-132 are received by zone A, the process of advancing and reversing the conveyor zones to remove or close gaps between articles as described above may be repeated. The zone controllers may thereby be configured so that a conveyor system having modular characteristics may be assembled from multiple zones to facilitate adding, removing, and reconfiguring conveyor zones within an existing conveyor system. The controllers also facilitate the use of conveyor zones with sufficient length to have multiple regions for holding articles—thereby reducing the cost of the conveyor system—while also maintaining high traffic and accumulation densities by keeping the longer zones fully occupied. Embodiments of the invention thereby enable articles to be received at the infeed end of the conveyor system and discharged from the discharge end of the conveyor system at random intervals without sacrificing conveyance efficiency. Traffic densities may be maintained by the zone controllers interacting autonomously with adjacent zone controllers to close gaps between adjacent articles. In this way, all available spaces in the conveyor system may be filled without placing constraints on when articles can be received by or discharged from the conveyor system.

Referring now to FIGS. 6A-6I, in response to a request to discharge the first article 100 from the conveyor system, the controller 34e of zone E may activate drive roller 20e to move the first and second articles 100, 108 downstream (as indicated by arrow 134). Discharging the first article 100 from zone E may open a gap 136 between the second article 108 and the third article 112. Similarly as described above with respect to FIGS. 5A-5P, the controller 34e of zone E may determine that the upstream region 92e is unoccupied. This determination may be based in part on rotational position signals received from the rotation sensor circuit 88 of drive roller 20e, as well as on communication—or the lack thereof—from the upstream controller 34d. In response to this determination, the controller 34e may activate the drive roller 20e in a reverse direction to move the second article 108 upstream (as indicated by arrow 138) until the second article 108 is adjacent to the upstream boundary 96e of zone E—i.e., in the virtual position.

In response the second article 108 reaching the upstream boundary 92e, the controller 34e may deactivate the drive roller 20e and provide an indication to the controller 34d of zone D that zone E is accepting articles. In an embodiment of the invention, this indication may be in the form of a response to an accept article request from the zone D controller 34d. In response to receiving this indication, the zone D controller 34d may activate the drive roller 20d of zone D to move the second and third articles 112, 114 in a downstream direction (as indicated by arrow 140). In response to the accept article request (or other suitable communication) from controller 34d, the controller 34e of zone E may activate the drive roller 20e, thereby moving the second article 108 in a downstream direction (as indicated by arrow 142). As illustrated by FIGS. 6C-6I, the above described process may be repeated, causing the gap 136 to propagate upstream toward zone A, at which point the conveyor system may be in a condition to receive an additional article.

Figure 7:
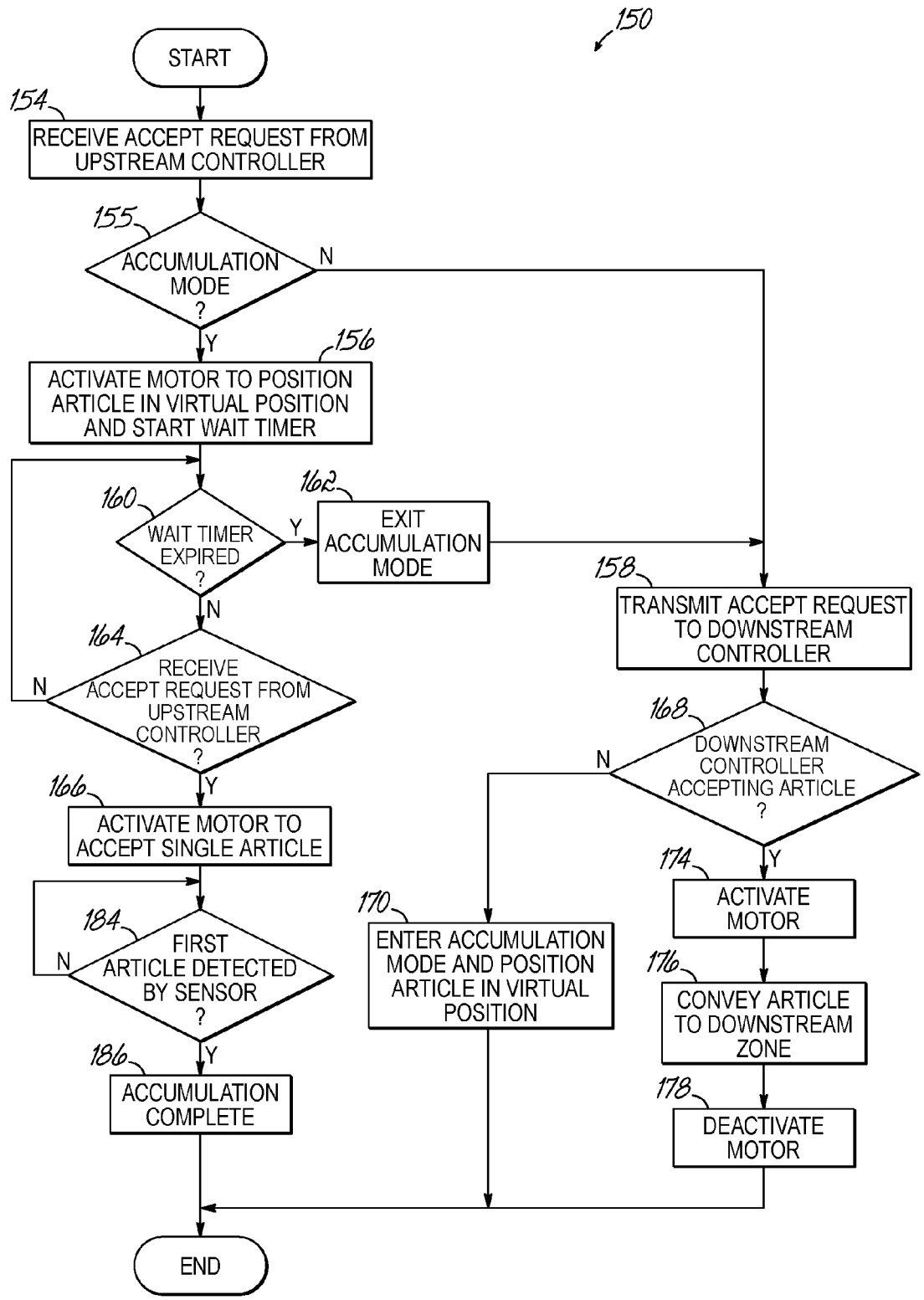
FIG. 7 is a flowchart illustrating a sequence of operations that may be performed by the controller application of FIG. 2.

Referring now to FIGS. 7 and 8A-8K and in accordance with an embodiment of the invention, a flow chart 150 shown in FIG. 7 illustrates a process that may be executed by one or more controller applications 48 as part of a method for controlling one or more conveyor zones, such as exemplary conveyor zones F-J of the conveyor system 151 shown in FIGS. 8A-8K. The illustrated embodiment includes an infeed zone F, three transfer zones G-I, and a discharge zone J. Similarly to the conveyor zones A-E described above, each of the conveyor zones F-J may include a sensor 14f-14j, a drive roller 20f-20j, a conveying surface 32f-32j, and a controller 34f-34j. In the illustrated embodiment, infeed zone F and discharge zone J are configured to accept a single article and thus have only one region (i.e., the sensor position), while transfer zones G-I include upstream and downstream regions 92g-92i, 94g-94i (i.e., virtual and sensor positions) so that they can accommodate two articles.

In operation, an operator may place an article 152 on the conveying surface 32f of infeed zone F, which may be configured to receive new articles into the conveyor system 151. The sensor 14f of zone F may output a signal to the zone F controller 34f indicating the presence of the article 152. In response, the controller 34f may send an article accept request to the controller 34g of zone G requesting permission to discharge the article 152 into zone G. In block 154 of flow chart 150, the zone G controller 34g receives this accept article request. In response to receiving the request, the controller 34g may proceed to block 155 and determine if zone G is in an accumulation mode. In other words, is zone G accumulating articles or conveying articles downstream to the next zone. If zone G is in the accumulation mode ("Yes" branch of decision block 155), the controller 34g may proceed to block 156. If zone G is not in the accumulation mode, the controller 34g may proceed to block 158.

In block 156 of flow chart 150, the controller 34g activates the motor 62 of drive roller 20g for a sufficient number of rotations to accept and position the article 152 in the upstream region 92g of zone G as shown in FIG. 8B. The controller 34g may also start a wait timer before proceeding to block 160. The controller application 48 may determine the position of article 152 based on signals received from the rotation sensor circuit 88 of drive roller 20g (FIG. 4). The controller 34g may also notify the upstream controller 34f that zone G is accepting the article 152 so that the upstream controller 34f knows to discharge the article 152.

In block 160, the zone G controller 34g determines if the wait timer has expired. If the wait timer has expired ("Yes" branch of decision block 160), the controller 34g proceeds to block 162 and exits the accumulation mode. If the wait timer has not expired, the controller 34g proceeds to block 164 and determines if a new accept article request has been received from the zone F controller 34f. If a new request has not been received ("No" branch of decision block 164), the controller 34g returns to block 160 and checks the wait timer. If a new request has been received ("Yes" branch of decision block 160), the controller 34g may proceed to block 166. Thus, in the accumulation mode, the controller 34g keeps the article 152 in the upstream region 92g until either the wait timer expires, or another article is ready to be discharged by the upstream conveyor zone (e.g., zone F). The controller 34g thereby waits for a predetermined amount of time for the next article to be placed in the upstream zone before advancing articles in the upstream region 92g while in the accumulation mode.

If the controller 34g is not in the accumulation mode, the controller 34g proceeds to block 158 of flow chart 150. In block 158, the controller 34g may transmit an article accept request to the downstream controller 34h before proceeding to block 168, where the controller 34g waits for a response from the downstream controller 34h. If the downstream controller 34h indicates that zone H is not accepting the article 152, or fails to respond within an allowable time, the zone G controller 34g may proceed to block 170. In block 170, the controller 34g enters the accumulation mode and positions the article 152 in upstream region 92g. The controller 34g is thus configured to enter the accumulation mode in response to a downstream controller indicating that the downstream zone is not accepting articles. The controller 34g may remain in the accumulation mode until the downstream zone is empty or otherwise provides an indication that articles are being accepted.

If the downstream zone H is accepting articles ("Yes" branch of decision block 168), the controller 34g may proceed to block 174 and activate the motor 62 of drive roller 20g before proceeding to block 176. In block 176, the article 152 is conveyed to the downstream zone H in a similar manner as described above for conveying the article 152 from zone F to zone G. Once the article 152 has been conveyed to the downstream zone H as shown in FIG. 8D, the zone G controller 34g may proceed to block 178 and deactivate the motor 62 of drive roller 20g. This process may be repeated in conveyor zones H and I so that the article 152 is conveyed to the discharge conveyor zone J as shown by FIGS. 8E-8H. The article may also be accumulated in any of the downstream zones H, I, depending on whether the accumulation mode is active in the respective controllers 34h, 34i of zones I and H.

Referring to block 164 of flow chart 150, if the zone G controller 34g receives an accept article request from the upstream controller 34f before the wait timer expires, the controller 34g proceeds to block 166 and activates the motor 62 of drive roller 20g to convey a second article 182 from zone F into zone G, as shown in FIG. 8I. The controller 34g may also send a signal to the upstream controller 34f indicating that zone G is accepting the second article 182. In any case, the zone G controller 34g may then proceed to block 184.

In block 184, the controller 34g determines if the article 152 has been detected by the sensor 14g, which would indicate that the article 152 has reached the sensor position, as shown in FIG. 8J. That is, the article 152 has reached a position in the downstream region 94g where the article 152 is sensed by the sensor 14g. If the article 152 has not reached the sensor position ("No" branch of decision block 184), the controller 34g continues to monitor the sensor 14g. If the article 152 has been detected ("Yes" branch of decision block 168), the controller application 48 may proceed to block 186. In block 186, the article 152 is in the downstream region 94g, or sensor position, and the second article 182 is in the upstream region 92g, or virtual position so that the accumulation of articles 152, 182 in zone G is complete as shown in FIG. 8J. The accumulated articles 152, 182 may be maintained in an accumulated state in zone G, or may be sent downstream together until they reach zone I, as shown in FIG. 8K. When articles enter an an empty conveyor system 151, the articles may normally be accumulated in the most downstream zone (e.g., zone I) rather than in an upstream zones (e.g., zones G and H). For example, in an empty conveyor system, zone I may enter the accumulation mode in response to the zone J controller 34j indicating that discharge zone J is not accepting articles. As articles are accumulated by downstream zones, upstream zones will then enter the accumulation mode sequentially in response to the downstream zones indicating that they are not accepting new articles until the conveyor system is fully loaded.

Referring Now to FIGS. 9A-9F, the conveyor system 151 may be filled by placing articles on infeed conveyor zone F one at a time and setting the discharge conveyor zone J to a state that indicates articles are not being accepted. Articles may then proceed downstream in the conveyor system 151 until they are accumulated by last zone having space to receive an article. As shown in FIG. 9A, a first article 192 may be conveyed by each of the zones F-H until being accumulated in zone I, which may be in the accumulation mode if zone J is not accepting articles. A second article 194 placed on the receive conveyor zone F may be conveyed downstream until reaching zone H, which may then work cooperatively with zone I so that articles 192 and 194 are accumulated in zone I in the manner described above and as shown in FIG. 9B.

Once zone I has articles 192, 194 in the downstream and upstream regions 94i, 92i, zone I cannot accept any additional articles. In response to this condition in zone I, the zone I controller 34i may indicate to the zone H controller 34h that zone I is not accepting articles. The zone H controller 34h may then enter the accumulation mode. In response to entering the accumulation mode, the zone H controller 34h may accept a third article 196 and position the article 196 in the upstream region 92h, as shown in FIG. 9C. Upon arrival of a fourth article 198, conveyor zone H may accumulate the third and forth articles 196, 198 as shown in FIG. 9D. This process may continue until the conveyor system 151 is filled with additional articles 200, 202, as shown by FIGS. 9E and 9F. In the embodiment illustrated in FIG. 9F, the controller 34g of zone G (i.e., the first conveyor zone downstream of the infeed zone F) may be configured so that article 200 is not advanced to the sensor position until the downstream zone H indicates that articles are being accepted. The zone G controller 34g may thereby be configured to prevent the formation of a gap between the last article accepted by zone G and a new article placed in the infeed zone F.

Figure 10B:
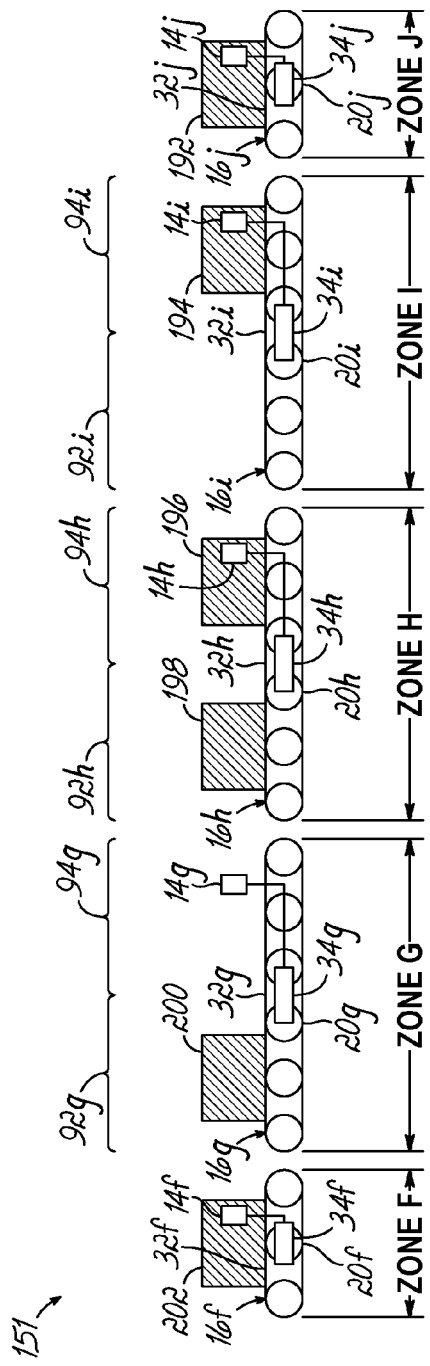
FIGS. 10A-10P are sequential diagrammatic side views illustrating articles being discharged from the conveyor system in FIG. 9F until the conveyor system is empty.
Figure 10C:
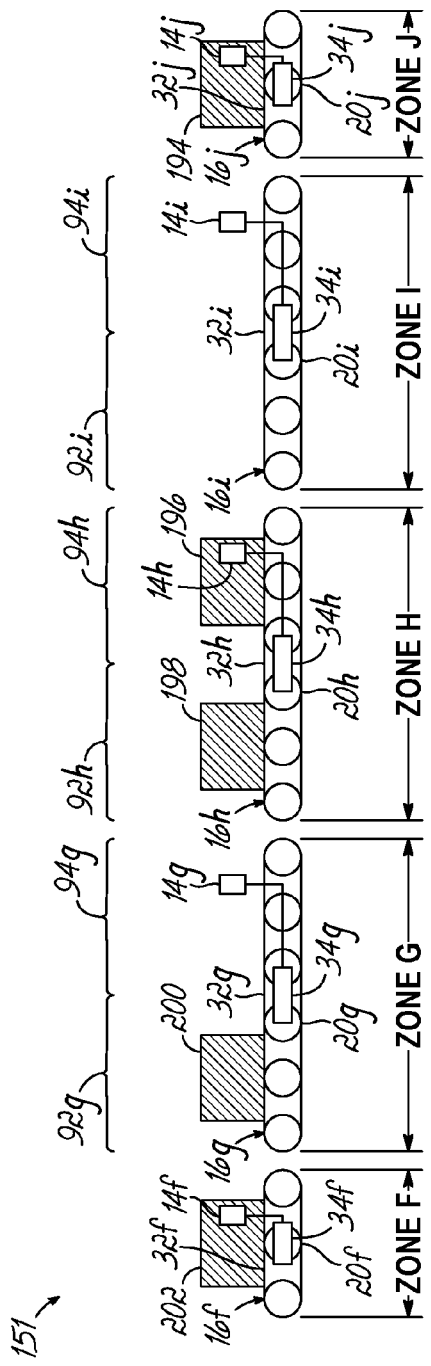
Figure 10L:
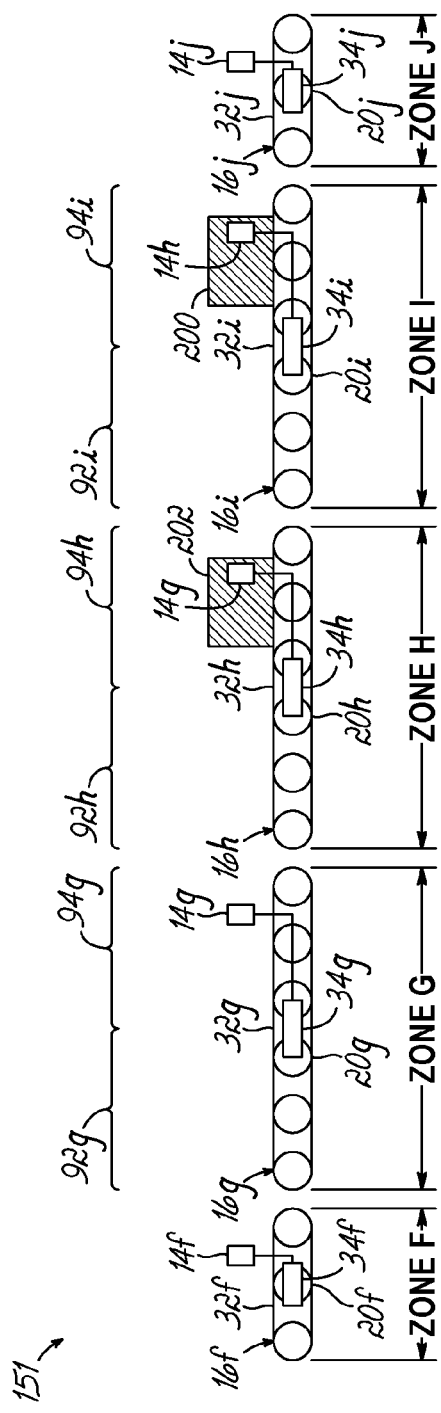
Figure 10M:
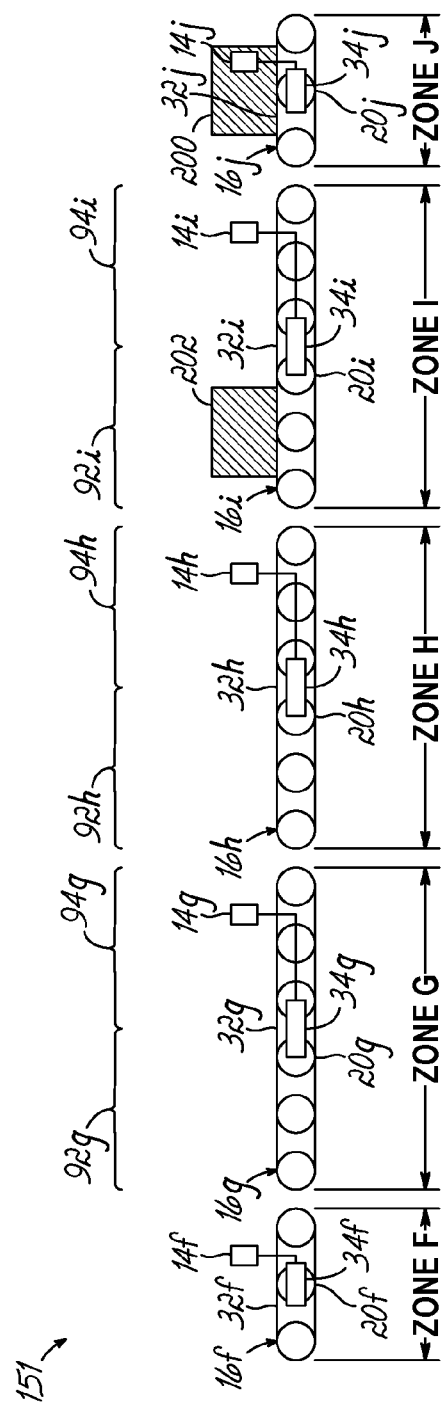
Figure 10P:
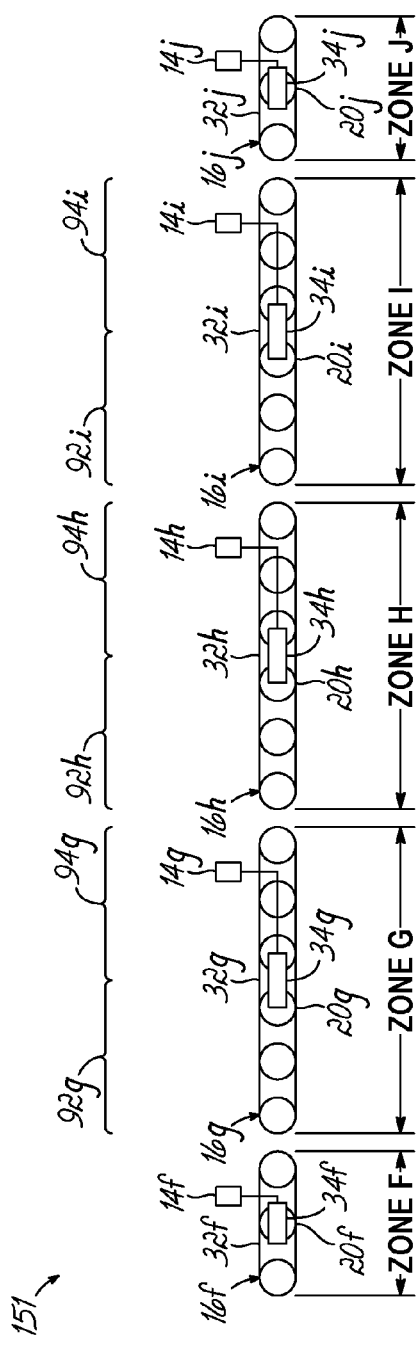

Referring now to FIGS. 10A-10P, in response to the controller 34j of discharge zone J indicating to the controller 34i that zone J is accepting articles, the zone I controller application 48 may activate the motor 62 of drive roller 20i. Articles 192 and 194 may thereby be moved downstream into zone J, where they are discharged as shown in FIGS. 10B and 10C. In response to discharging the articles 192, 194, the controller 48 of conveyor zone I may indicate to the controller application 48 of controller 34h that zone I is accepting articles. In response to zone I accepting articles, the zone H controller application 48 may, in turn, activate the motor 62 of drive roller 20h so that the articles 196, 198 accumulated in zone H are moved downstream to the discharge zone J as shown in FIGS. 10D-10E. This process may be repeated as the controllers for each downstream zone empty out and signal their associated upstream zone that articles are being accepted. The conveyor system 151 may thereby be emptied of articles, as shown in FIGS. 10E-10P.

Figure 11A:
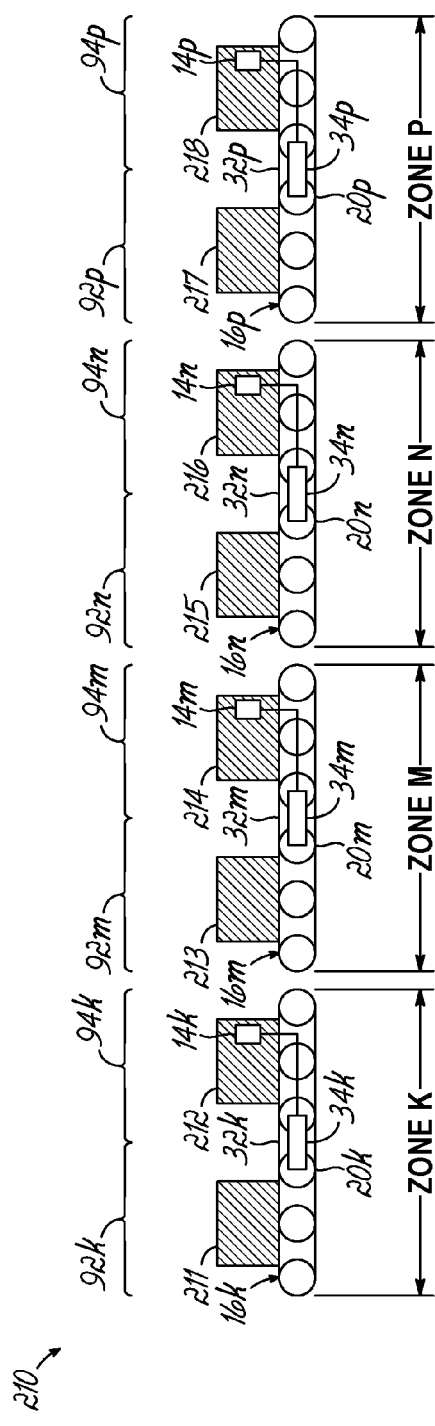
Figures 11D, 11E:
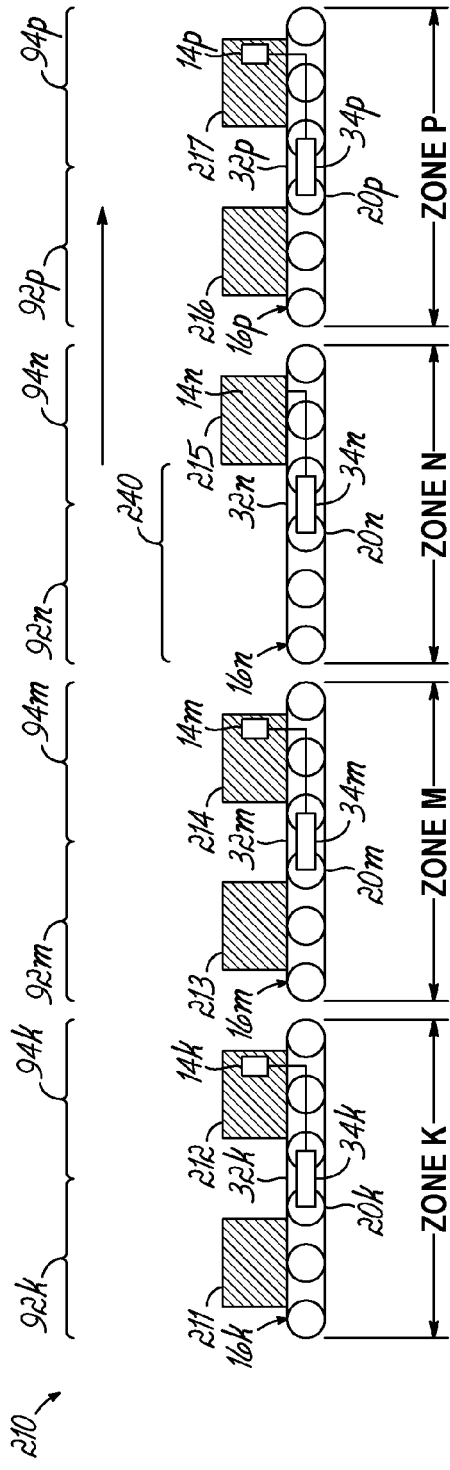
Figure 12:
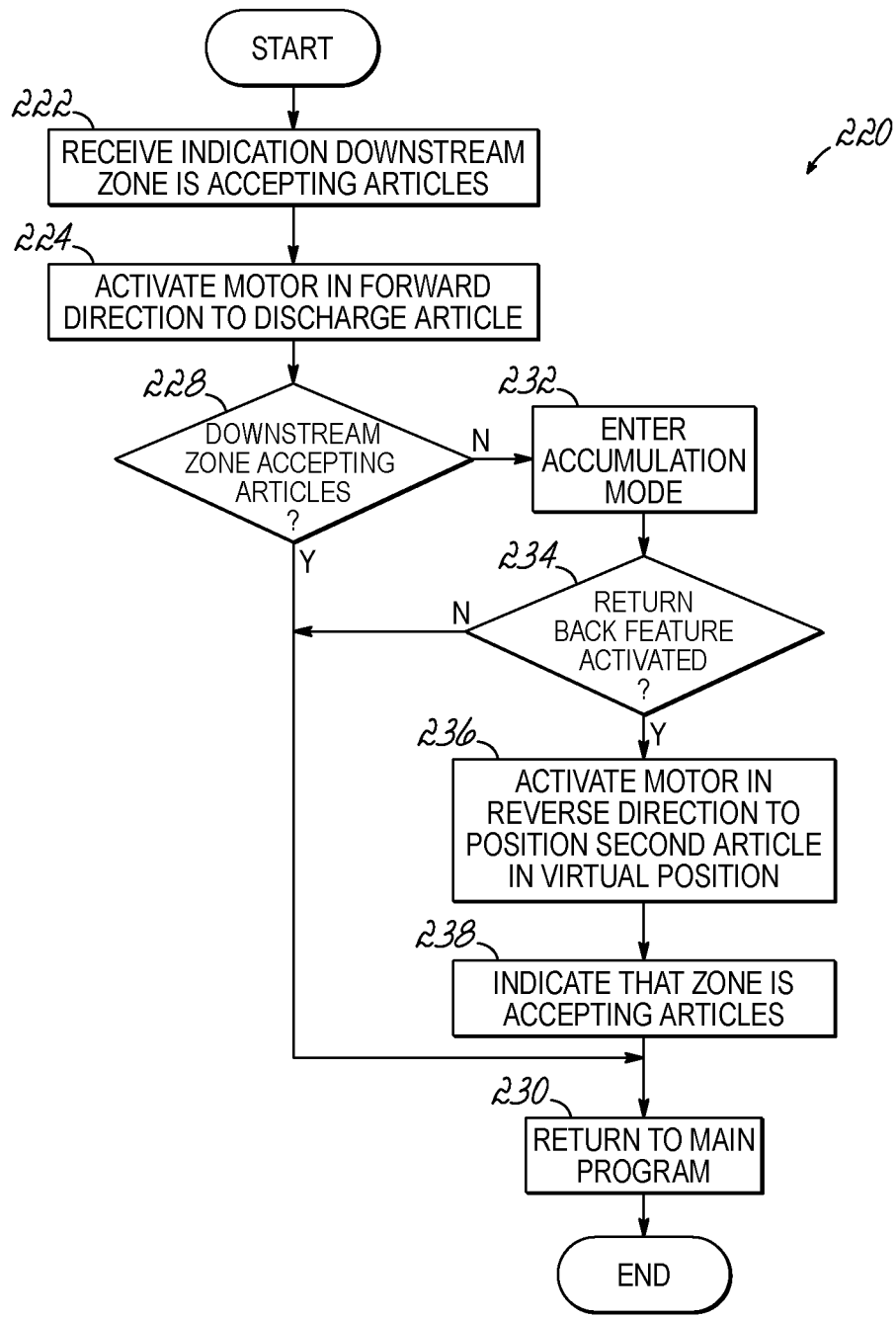
FIG. 12 is a flow chart illustrating a sequence of operations that may be performed by the controller application of FIG. 2 to implement the gap closing process illustrated in FIGS. 11A-11F.

At times, an article may be removed from a conveyor system zone that lies between the infeed zone and the discharge zone, opening a gap between articles on the conveyor system. This may occur, for example, when an operator manually removes an article to eliminate a jam. In order to close gaps that appear between articles in a conveyor system, embodiments of the invention may include a "return back" feature that can be activated to close these gaps. An embodiment of the invention that includes the "return back" feature is illustrated by FIGS. 11A-11D and 12. FIGS. 11A-11D present a section 210 of a conveyor system including zones K, M, N, and P that is initially filled with articles 211-218, while FIG. 12 presents a flow chart 220 that illustrates steps that may be executed by the controller application 48 in one or more controllers to close gaps that may appear between the articles 211-218 in FIGS. 11A-11D.

Referring now to the flow chart 220, in block 222 the zone P controller 34p receives an indication from the downstream controller that articles are being accepted. This indication may be in response to an accept article request, such as described above with respect to block 158 of flow chart 150. In any case, in response to receiving the indication, the zone P controller 34p may proceed to block 224. In block 224, the controller 34p activates the motor 62 of drive roller 20p and thereby discharges the article 218 in the downstream region 94p of zone P into a downstream zone (not shown) as shown in FIG. 11B. Because both of the articles 217, 218 in zone P move together, discharging the article 218 into the downstream zone may open up a gap 226 between the article 216 in the downstream region 94n of zone N and the article 217, which is in the downstream region 94p of zone P, as shown in FIG. 11B.

The zone P controller 34p may then proceed to block 228 and determine if the downstream zone is still accepting articles. If the downstream zone is accepting articles ("Yes" branch of decision block 228), the controller 34p may proceed to block 230 and return to the main program. By returning to the main program, the controller 34p may operate to accept articles from upstream zones and discharge articles into downstream zones as previously described. If the downstream zone is not accepting articles ("No" branch of decision block 228), the controller 34g may instead proceed to block 232.

In block 232, the zone P controller 34p enters the accumulation mode and proceeds to block 234. In block 234, the controller 34p determines if the "return back" feature is activated. This feature may be activated selectively in one or more controllers, or on a system-wide basis so that the conveyor system closes gaps that appear between articles. If the "return back" feature is not activated ("No" branch of decision block 234), the controller 34p may return to the main program by proceeding to block 230. If the "return back" feature is active ("Yes" branch of decision block 234), the controller 34p may proceed to block 236.

In block 236, the zone P controller 34p activates the motor 62 of drive roller 20p in reverse for a sufficient number of rotations or amount of time to move the article 217 from the downstream region 94p to the upstream region 92p of zone P, as shown by FIG. 11C. The controller 34p thereby closes the gap between the article 216 in the downstream region 94n of zone N and the article 217 in the upstream region 92p of zone P. Once the article 217 is in the upstream region 92p of zone P, the controller 34p may proceed to block 238.

In block 238, the zone P controller 34p may provide an indication to the upstream zone N controller 34n that zone P is accepting articles. That is, the zone N controller 34n may receive an indication from the downstream controller 34p that articles are being accepted by the downstream zone P. This indication may be received, for example, in response to the zone N controller 34n sending an accept article request to the zone P controller 34p, similarly as described above with regard to block 222 of flowchart 220. In response to the zone P controller 34p indicating that articles are being accepted, the zone N controller 34n may discharge the article 216 in the downstream region 94n into zone P in a similar manner as described above with respect to block 224 of flow chart 220. This may open up a gap 240 between the article 214 in downstream region 94m of zone M and the article 215 in the downstream region 94n of zone N, as shown in FIG. 11D. The zone N controller 34n may work cooperatively with the zone M controller 34m to close this gap 240 using the "return back" feature, as shown in FIGS. 11E and 11F. The remaining upstream controllers 34k, 34m may follow suit by implementing the "return back" feature until no gaps are present in the conveyor system section 211.

Figure 13B:
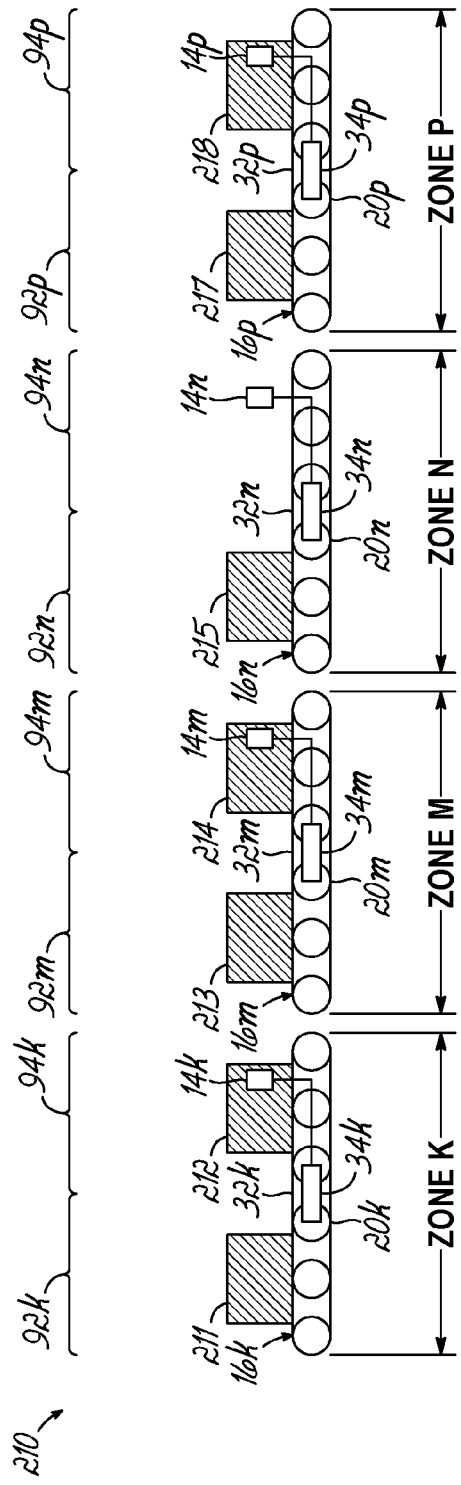
Figure 13C:
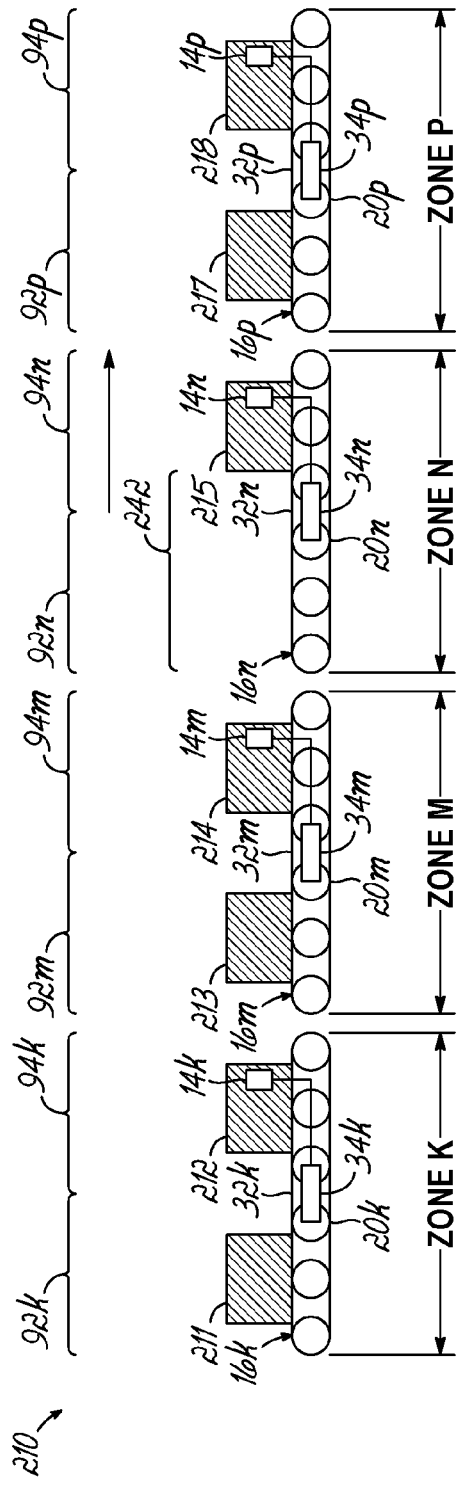
Figure 13D:
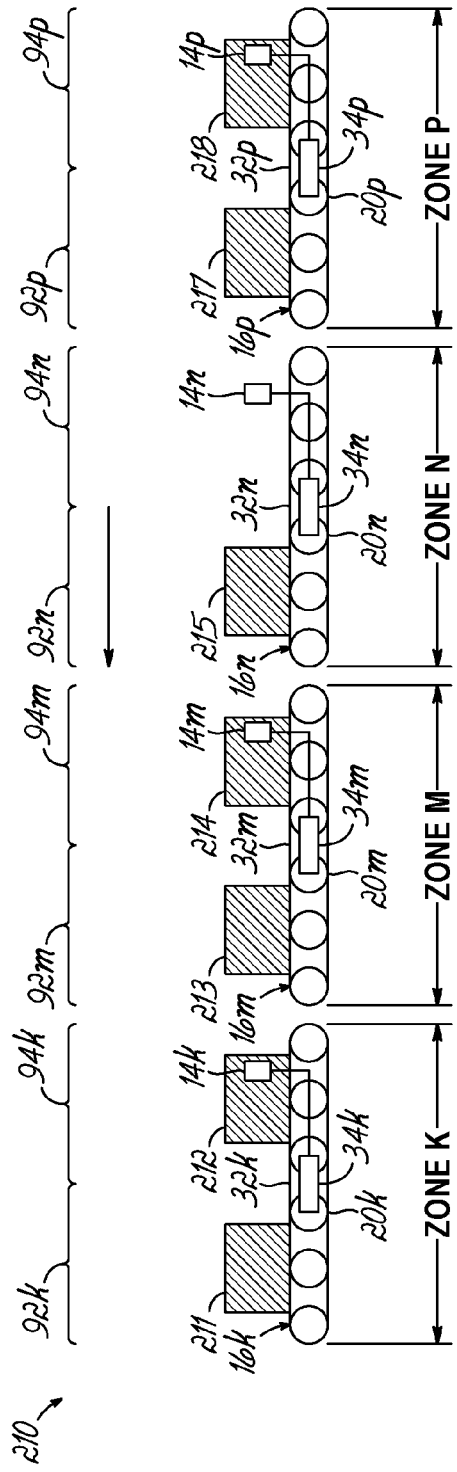
Figure 13E:
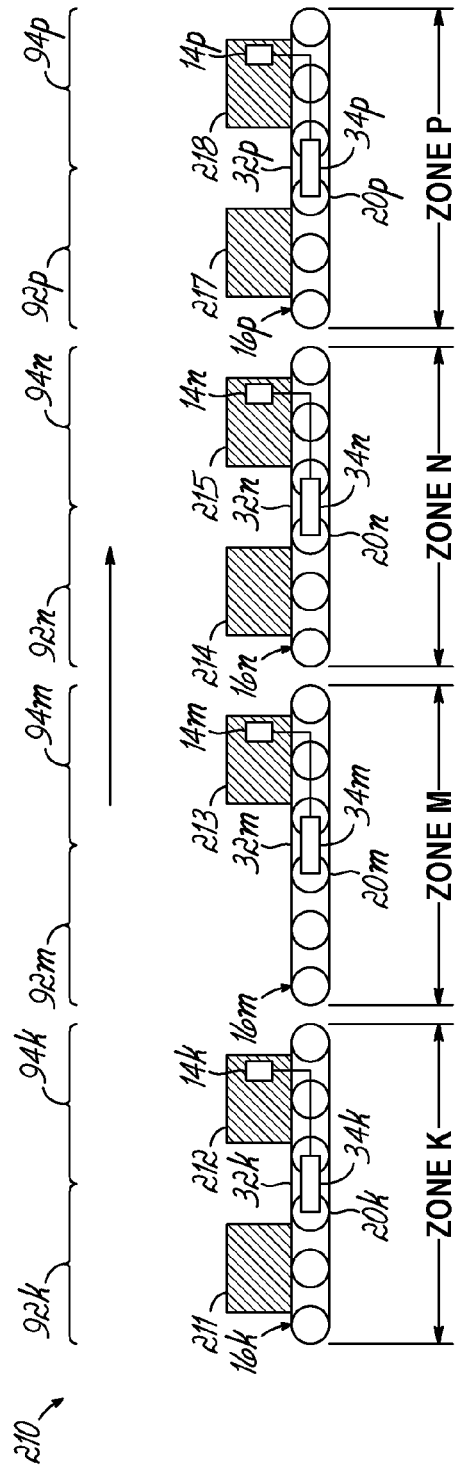

Referring now to FIGS. 13A-13E, the "return back" feature may also close gaps resulting from articles being removed by an operator, such as to clear a jam. In FIG. 13A, the article 216 in the downstream region 94n of zone N has become jammed. To clear the jam, the operator may remove the article 216 from the conveyor, as shown in FIG. 13B. In response to removal of the article 216, the article sensor 14n of zone N may provide a signal to the zone N controller 34n indicating the article 216 is no longer present. In response to this signal, the controller 34n may activate the motor 62 of drive roller 20n to advance the article 215 from the upstream region 92n to the downstream region 94n of zone N so that a gap 242 opens between the article 215 in the downstream zone 94n of zone N, and the article 214 in the upstream region 94m of zone M. Once opened, the gap 242 may be closed by the "return back" feature in a similar manner as described above with respect to FIGS. 11D-11F and as shown in FIGS. 13D and 13E.

Figure 14:
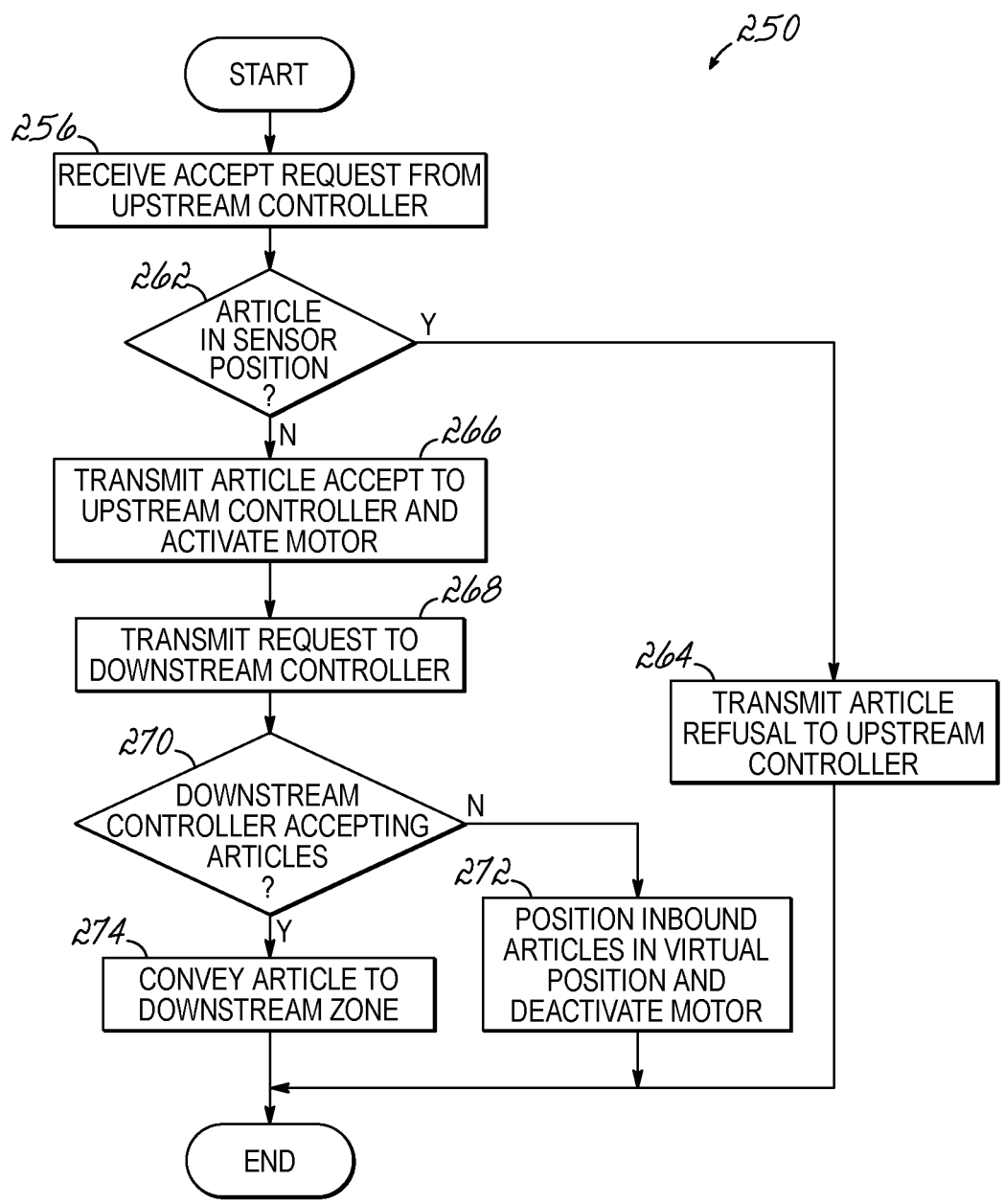
FIG. 14 is a flow chart illustrating a sequence of operations that may be performed by the controller application of FIG. 2.

Referring now to FIGS. 14 and 15A-15L, and in accordance with another embodiment of the invention, a flow chart 250 shown in FIG. 14 illustrates another process that may be executed by one or more controller applications 48 as part of a method for controlling one or more conveyor zones, such as exemplary conveyor zones Q-U of the conveyor system 252 shown in FIGS. 15A-15L. The illustrated embodiment includes an infeed zone Q, three transfer zones R-T, and a discharge zone U. Similarly to the conveyor zones K-P described above, each of the conveyor zones Q-U may include a sensor 14q-14u, a drive roller 20q-20u, a conveying surface 32q-32u, and a controller 34q-34u. In the illustrated embodiment, infeed zone Q and discharge zone U are configured to accept a single article and thus have only one region (i.e., the sensor position), while transfer zones R-T include upstream and downstream regions 92r-92t, 94r-94t (i.e., virtual and sensor positions) so that they can accommodate two articles.

In operation, an operator may place an article 254 on the conveying surface 32q of infeed zone Q, which may be configured to receive new articles into the conveyor system 252. The sensor 14q of zone Q may output a signal to the zone Q controller 34q indicating the presence of the article 254. In response, the controller 34q may send an article accept request to the controller 34r of zone R requesting permission to discharge the article 254 into zone R. In block 256 of flow chart 250, the zone R controller 34r receives this accept article request. In response to receiving the request, the controller 34r may proceed to block 262 of flow chart 250.

In block 262, the controller 34r determines if an article is in the sensor position (i.e., occupying the downstream region 94r of zone R). This determination may be made based on, for example: (1) a signal received through the sensor interface 52 of controller 34r indicating that an article is detected by sensor 14r, (2) position data stored in memory 40 of controller 34r that is based on signals received from the rotation sensor circuit 88 of drive roller 20r, and/or (3) a combination of (1) and (2). If the controller 34r determines that there is an article in the sensor position ("YES" branch of decision block 262), the controller 34r may proceed to block 264 and transmit an article refusal message to the upstream controller 34q. In this case, controller 34q may hold the article 254 in conveyor zone Q. If, on the other hand and as depicted in FIG. 15A, the controller 34r determines that an article is not in the sensor position ("NO" branch of decision block 262), then the controller 34r may proceed to block 266.

In block 266 of flow chart 250, the controller 34r transmits an article accept message to the upstream controller 34q and activates the drive roller 20r of conveyor zone R. In response to receiving the article accept message from the downstream controller 34r, the Q zone controller 34q may activate drive roller 20q so that the article 252 begins moving downstream toward conveyor zone R, as indicated by arrow 267. The controller 34r may then proceed to block 268 and transmit an article accept request to the downstream controller 34s of conveyor zone S. The controller 34r may then proceeds to block 270.

In block 270, the controller 34r determines if the downstream controller 34s is accepting articles. This determination may be based on a message received from the downstream controller 34s in response to the article accept request sent in block 268. If the downstream conveyor zone S is not receiving articles ("NO" branch of decision block 270), the controller 34r may proceed to block 272.

Figure 15C:
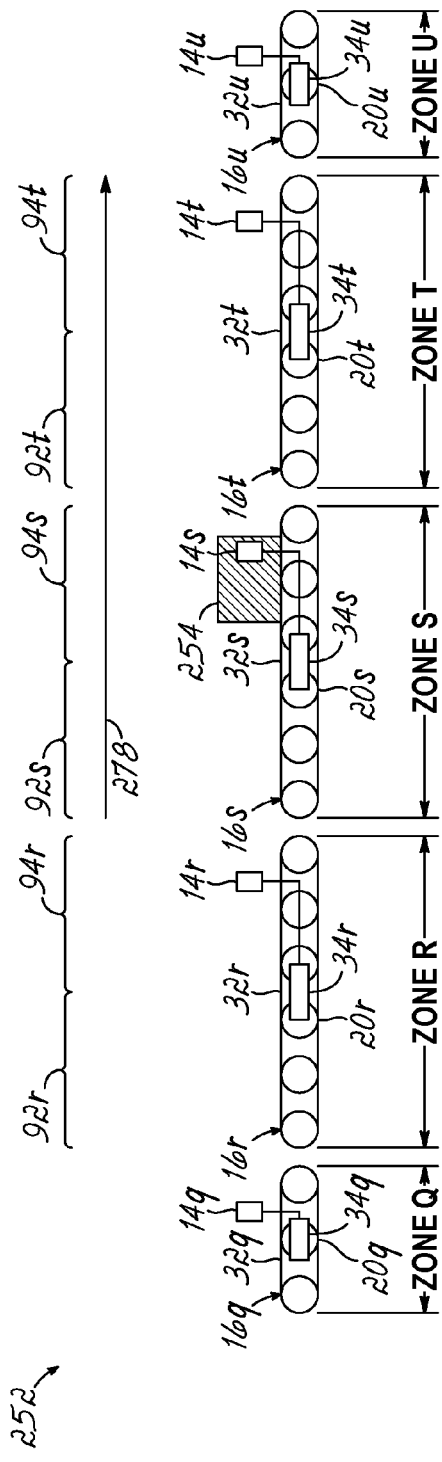
Figure 15D:
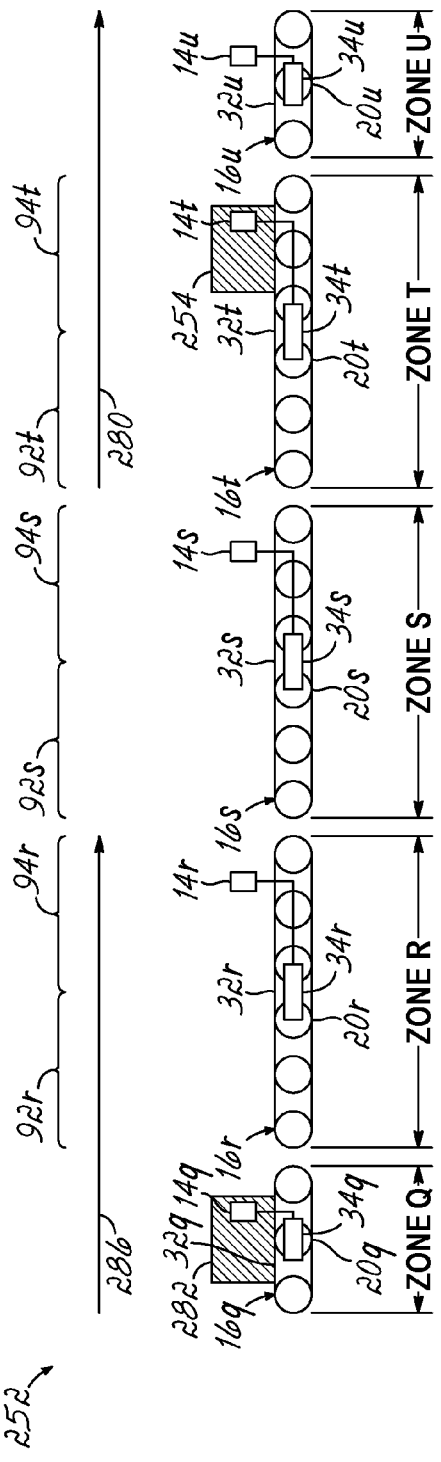
Figure 15E:
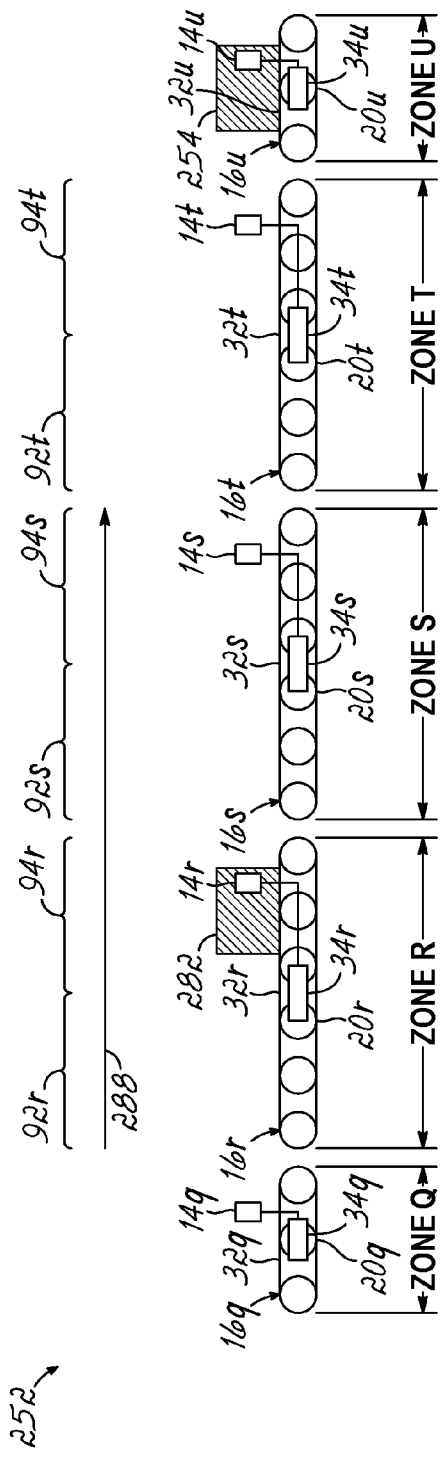

If, as depicted in FIGS. 15B and 15C, the downstream conveyor zone S is receiving articles ("YES" branch of decision block 270), the controller 34r may proceed to block 274. As indicated by arrow 276, in block 274 the controller 34r activates the motor 62 of drive roller 20r to convey the article 254 to zone S, which may have activated drive roller 20s in anticipation of receiving article 254 from upstream zone R. As shown in FIGS. 15A-15E, this process of communication between controllers 34q-34u and coordinated activation of drive rollers 20q-20u may continue so that article 252 is conveyed downstream until it reaches discharge zone U, as indicated by arrows 278 and 280. In addition, as depicted in FIGS. 15D and 15G, additional articles 282, 284 may be periodically added to the infeed zone Q while article 254 is being conveyed to discharge zone U. These additional articles 282, 284 may also be conveyed downstream generally in the same manner as described above with respect to article 254 as indicated by arrows 286, 288, 290, 292, 294, 296 in FIGS. 15D-15I.

Figure 15F:
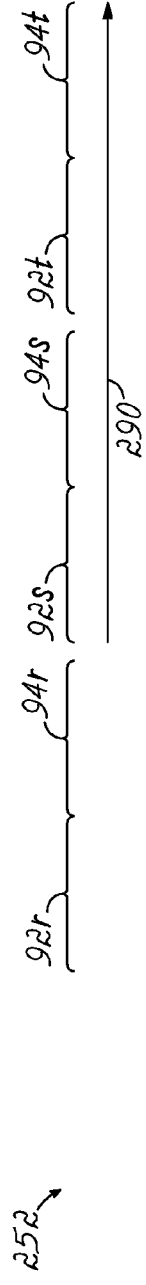

Referring now to FIGS. 15F and 15G, as article 282 approaches zone T, the controller 34t may receive an accept article request from controller 34s in block 256. The controller 34t may then proceed through blocks 262 and 266 to block 268 of flow chart 250 as described above. In block 268, controller 34t may transmit an article accept request to the downstream zone controller 34u. In response to receiving the article accept request from the upstream controller 34t, controller 34u may determine in block 262 of flow chart 250 (which may represent separate controller programs running concurrently in each of the controllers) that discharge zone U cannot accept an article because article 254 is in the sensor position. In response to determining that article 254 is in the sensor position of zone U ("YES" branch of decision block 262), controller 34u may proceed to block 264 and transmit an article refusal message to upstream controller 34t of zone T.

In response to determining that the downstream controller 34u is not receiving articles ("NO" branch of decision block 270), the controller 34t may proceed to block 272. In block 272, the controller 34t activates the motor 62 of drive roller 20t for a sufficient number of rotations to accept and position the article 282 in the virtual position of zone T, as shown in FIG. 15G. The controller 34t may then stop the drive roller 20t with the article 282 in the virtual position.

Referring now to FIGS. 15H and 15I, and with continued reference to FIG. 14, as article 284 approaches zone T, the controller 34s of zone S may again reach block 268 of flow chart 250 and transmit an accept article request to downstream controller 34t. In response to receiving the article accept request in block 256, controller 34t may proceed to block 262 and determine if an article is in the sensor position of zone T. In response to determining that an article is not in the sensor position, the controller 34t may proceed to block 266 of flow chart 250.

In block 266, the controller 34t transmits an article accept message to the upstream controller 34s and activates the drive roller 20t of conveyor zone T. In response to receiving the article accept message from the downstream controller 34t, controller 34s may convey article 284 from zone S to zone T as indicated by arrow 296. In block 268, controller 34t may transmit an article accept request to the downstream zone controller 34u. In response to receiving the article accept request from the upstream controller 34t, controller 34u may again transmit an article refusal message to upstream controller 34t of zone T as described above since article 254 is still in the sensor position. In response to determining that zone U is still not receiving articles ("NO" branch of decision block 270), the controller 34t may proceed to block 272 and activate the motor 62 of drive roller 20t for a sufficient number of rotations to accept and position article 284 in the virtual position of zone T. This may result in article 282 moving into the sensor position of zone T so that zone T now contains article 282 in the downstream region 94t and article 284 upstream region 92t as shown in FIG. 15J.

Referring now to FIGS. 15J-15L, in response to an additional article 298 being placed in the infeed zone Q, the above described process may be repeated until the article 298 is in the virtual position in conveyor zone S, as shown in FIG. 15L. Thus, as articles continue to be placed in the infeed zone Q, the conveyor system 252 will eventually be filled with articles, with every other article being held in an upstream region of a transport zone until a later added article arrives. In this way, respective downstream regions remain unoccupied unless both virtual and sensor positions are occupied while conveyor system 252 is accumulating articles.

Figure 16:
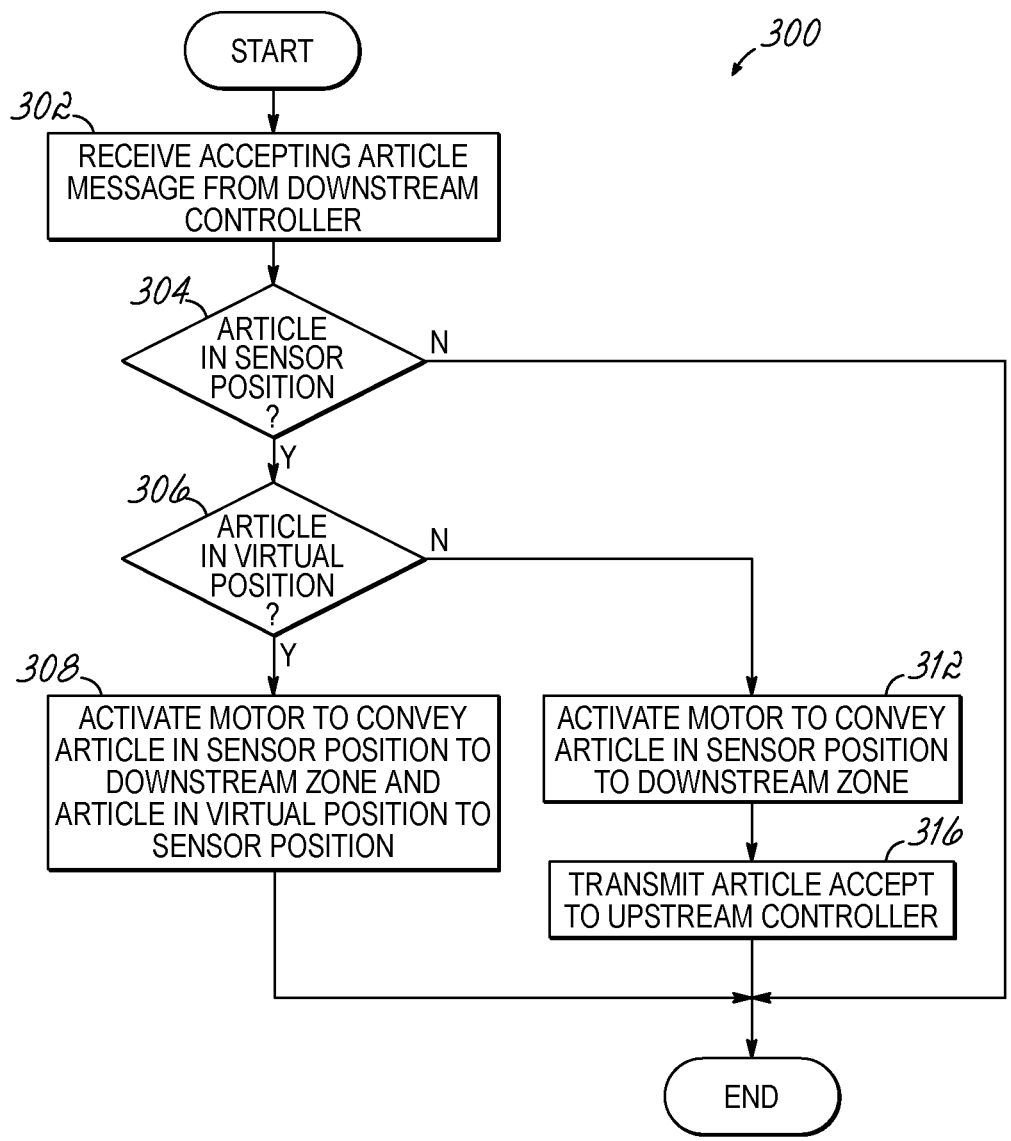
FIG. 16 is a flow chart illustrating a sequence of operations that may be performed by the controller application of FIG. 2.
Figure 17G:
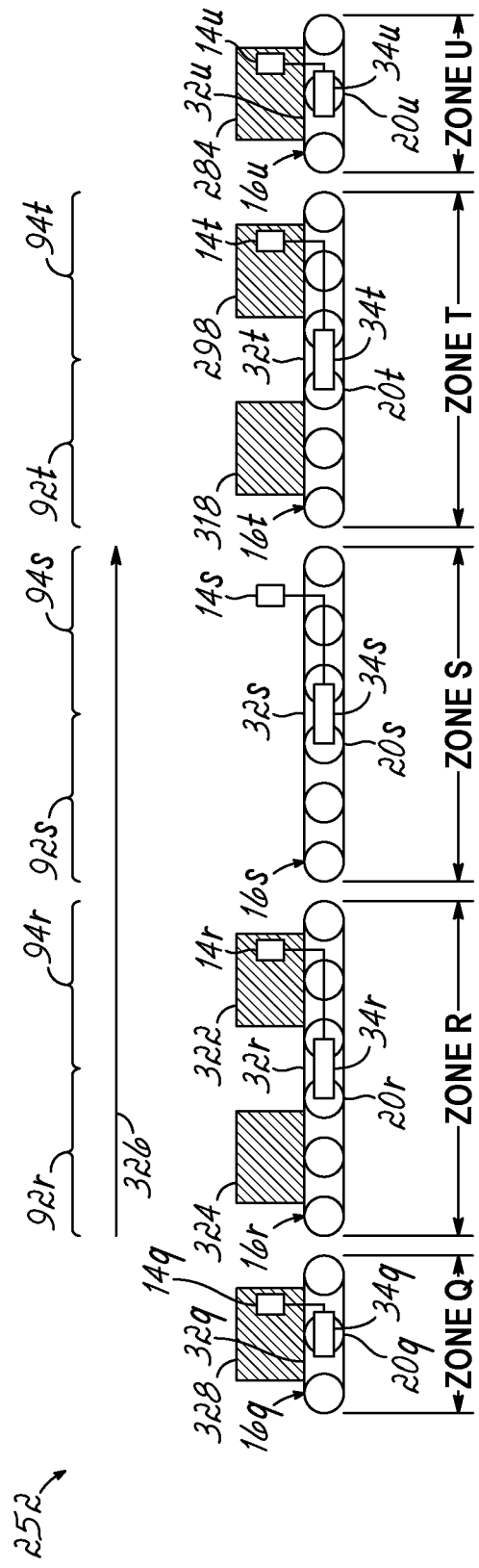

Referring now to FIGS. 16 and 17A-17G, flow chart 300 shown in FIG. 16 illustrates another process that may be executed by one or more controller applications 48 as part of a method for controlling conveyor zones Q-U of conveyor system 252. FIG. 17A illustrates the conveyor zone 252 filled to capacity with articles. In response to article 254 being removed from the discharge zone U, controller 34t may receive a message from downstream controller 34u that discharge zone U is now accepting articles. In response to receiving the message in block 302 of flowchart 300, the controller 34t may proceed to block 304 and determine if an article is in the sensor position of conveyor zone T. In response to determining that article 282 is in the sensor position ("YES" branch of decision block 304), the controller 34t may proceed to block 306 and determine if an article is in the virtual position of conveyor zone T.

In block 306, in response to determining that the article 284 is in the virtual position ("YES" branch of decision block 306), the controller 34t may proceed to block 308. In block 308, the controller 34t may activate the motor 62 of drive roller 20t for a sufficient number of rotations to convey article 282 to the downstream zone U and article 284 to the sensor position of conveyor zone T as indicated by arrow 310. As a result, the upstream region 92t of zone T is unoccupied, and article 284 occupies the downstream region 94t of zone T, as depicted in FIG. 17C. Thus, referring to blocks 262 and 264 of the flow chart 250 in FIG. 14, if controller 34t receives an accept article request from the zone S controller 34s while in the depicted state, the controller 34t may respond by transmitting an article refusal message to the zone S controller 34s due to article 284 being in the sensor position.

Referring now to FIG. 17D, in response to article 282 being removed from the discharge zone U, controller 34t of upstream zone T may receive a message from controller 34u that discharge zone U is accepting articles as described above with respect to block 302 of flowchart 300. In response to receiving the message in block 302 of flowchart 300, the controller 34t may proceed to block 304 and determine if an article is in the sensor position of conveyor zone T. In response to determining that article 284 is in the sensor position ("YES" branch of decision block 304), the controller 34t may proceed to block 306 and determine if an article is in the virtual position.

In block 306, the controller 34t determines there is not an article in the virtual position ("NO" branch of decision block 306), and proceeds to block 312. In block 312, the controller 34t may activate the motor 62 of drive roller 20t for a sufficient number of rotations to convey article 284 to the downstream zone U as indicated by arrow 314. Controller 34t may then proceed to block 316 and transmit a message to upstream controller 34s indicating that conveyor zone T is now accepting articles. Thus, in this exemplary embodiment, the controllers 34q-34u may be configured to operate in a mode in which zone controllers do not accept articles from upstream zones until the controlled zone is emptied. This optional mode may also be selectable based on operator preference.

Referring now to FIGS. 17E-17F, in response to receiving the article accept message in block 302 of flowchart 300, controller 34s may proceed to block 304 of flowchart 300 and determine if an article is in the sensor position of conveyor zone S. Similarly as described above with respect to zone T, in response to determining that article 298 is in the sensor position ("YES" branch of decision block 304), the controller 34s may proceed to block 306 and determine if an article is in the virtual position. In block 306, the controller 34s may determine that article 318 is in the virtual position ("YES" branch of decision block 306). In response to determining that article 318 is in the virtual position, the controller 34s may proceed to block 308. In block 308, the controller 34s activates the motor 62 of drive roller 20s for a sufficient number of rotations to convey article 298 to the downstream zone T and article 318 to the sensor position of conveyor zone S as indicated by arrow 320 and as shown in FIG. 17F. As a result, the upstream region 92s of zone S is unoccupied, article 318 occupies the downstream region 94s of zone S, and article 298 occupies the upstream region 92t of zone T, as depicted in FIG. 17F.

Referring now to FIGS. 17F and 17G, and with continued reference to flow chart 250 of FIG. 14, as article 318 approaches zone T, the controller 34t may receive an article request from controller 34s in block 256. In response to receiving the article accept request from the upstream controller 34s, controller 34t may determine in block 262 that discharge zone T can accept an article because an article is not in the sensor position. In response to determining that an article is not in the sensor position ("NO" branch of decision block 262), controller 34t may proceed to block 266 and transmit an article accept message to upstream controller 34s of zone S and proceed to block 268.

In block 268, controller 34t may transmit an article accept request to the downstream zone controller 34u. In response to receiving the article accept request from the upstream controller 34t, controller 34u may determine in block 262 of flow chart 250 that discharge zone U cannot accept an article because article 284 is in the sensor position. In response to determining that article 284 is in the sensor position ("YES" branch of decision block 262), controller 34u may proceed to block 264 and transmit an article refusal message to upstream controller 34t of zone T.

In response to determining that the downstream controller 34u is not receiving articles, ("NO" branch of decision block 270), the controller 34t may proceed to block 272. In block 272, the controller 34t activates the motor 62 of drive roller 20t for a sufficient number of rotations to accept and position the article 318 in the virtual position of zone T, and position article 298 in the sensor position of zone T, as indicated by arrow 320. In response to determining that there are no articles in the sensor position, the zone S controller 34s may transmit a message to upstream controller 34r indicating that conveyor zone S is now accepting articles. In a similar manner, articles 322 and 324 may be conveyed from zone R to zone S, as indicated by arrow 326. Article 328 may then in turn be conveyed from infeed zone Q to zone R as described above with respect to FIG. 14. Moreover, the above described sequences of events may be repeated by the appropriate controllers 34q-34u each time an article is removed from the discharge zone U until the conveyor system 252 is empty.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and methods, and illustrative examples shown and described. In particular, one having ordinary skill in the art will appreciate that any of the blocks in the above flowcharts may be reorganized, deleted, or made concurrent with any other block of the above flowcharts. Accordingly, departures may be made from such details without departing from the spirit or scope of applicants' general inventive concept. Thus, the invention lies in the claims hereinafter appended.

What is claimed is:

1. A method of controlling a conveyor including a plurality of zones, a first zone of the plurality of zones including a first region and a second region each configured to accommodate an article and to operate in concert in response to activation of the first zone, the method comprising:
   receiving, in a controller of the first zone, an accept article request from a second zone;
   in response to receiving the accept article request from the second zone, the controller determining if a first article is in the first region of the first zone;
   in response to determining the first article is not in the first region of the first zone, the controller activating the first zone to accept a second article from the second zone into the second region of the first zone; and
   in response to determining the first article is in the first region of the first zone, the controller refusing to accept the second article from the second zone.

2. The method of claim 1 further comprising:
   in response to accepting the second article from the second zone, the controller determining if a third zone is accepting articles; and
   in response to determining the third zone is not accepting articles, the controller positioning the second article in the second region of the first zone.

3. The method of claim 2 wherein the first zone is downstream of the second zone, and the third zone is downstream of the first zone.

4. The method of claim 2 wherein the first region is a downstream region of the first zone and the second region is an upstream region of the first zone.

5. The method of claim 2 further comprising:
   in response to determining that the third zone is accepting articles, the controller activating the first zone to convey the second article to the third zone.

6. The method of claim 5 wherein activating the first zone to convey the second article to the third zone includes:
   activating the first zone to convey the second article from the second region to the first region;
   in response to the second article reaching the first region, the controller determining if the third zone will accept the second article; and
   in response to determining that the third zone will accept the second article, the controller activating the first zone to convey the second article from the first region of the first zone to the third zone.

7. The method of claim 6 further comprising:
   in response to determining that the third zone will not accept the second article, the controller positioning the second article in the first region.

8. The method of claim 6 further comprising:
   in response to determining that the third zone will not accept the second article, the controller activating the first zone to convey the second article from the first region back to the second region.

9. The method of claim 6 further comprising:
   in response to determining that the third zone will not accept the second article, the controller starting a timer; and
   in response the timer expiring before the third zone will accept the second article, the controller activating the first zone to convey the second article from the first region back to the second region.

10. A method of controlling a conveyor system including a plurality of zones, the plurality of zones including a first zone having a plurality of regions each configured to accommodate an article and to operate in concert in response to activation of the first zone by a first controller, the method comprising:
   activating, by the first controller, the first zone to receive a first article in the first zone;
   determining a position of the first article in the first zone with the first controller;
   activating the first zone with the first controller to position the first article in a first region of the plurality of regions in response to the first zone being in a first mode; and
   activating the first zone with the first controller to position the first article in a second region of the plurality of regions different from the first region in response to the first zone being in a second mode.

11. The method of claim 10 wherein the first region is a downstream region and the second region is an upstream region.

12. The method of claim 10 further comprising:
   determining a dimension of the first article with the first controller;
   storing data relating to the dimension of the first article in a memory of the first controller; and
   transmitting the data relating to the dimension of the first article from the first controller to a second controller that controls a second zone of the plurality of zones.

13. The method of claim 10 further comprising:
   storing data relating to the position of the first article in a memory of the first controller; and
   transmitting the data relating to the position of the first article from the first controller to a second controller that controls a second zone of the plurality of zones.

14. The method of claim 10 further comprising:
   in response to the first controller receiving a request to receive a second article in the first zone, the first controller activating the first zone to accept the second article into the second region and move the first article into the first region so that the first article is in the first region and the second article is in the second region.

15. The method of claim 10 further comprising:
   determining with the first controller that a second zone downstream from the first zone is not accepting articles; and
   in response to determining the second zone is not accepting articles, causing the first zone to enter the second mode, the second mode being an accumulation mode.

16. The method of claim 15 further comprising:
   in response to entering the accumulation mode, activating the first zone in a reverse direction to move the first article from the first region to the second region.

17. The method of claim 10 wherein determining the position of the first article comprises:
   receiving a signal from a rotation sensor circuit associated with a motorized drive roller of the first zone; and
   updating data relating to the position of the first article stored in a memory of the first controller based on the signal received from the rotation sensor circuit.

18. The method of claim 17 wherein determining the position of the first article further comprises:
   detecting a presence or absence of the first article in one of the first or second regions of the first zone based on a signal received in the first controller from an article sensor.

19. A method of controlling a conveyor system including a downstream zone and an upstream zone, the method comprising:
   determining if a gap between a first article in the downstream zone and a second article in the upstream zone exceeds a predetermined length with a first controller that controls the downstream zone; and
   in response to determining the gap exceeds the predetermined length, the first controller positioning the first article in an upstream region of the downstream zone, the downstream zone including the upstream region and a downstream region.

20. The method of claim 19 wherein positioning the first article in the upstream region of the downstream zone includes selectively activating the downstream zone to move the first article from the downstream region to the upstream region.

21. The method of claim 19 further comprising:
   in response to the first article being positioned in the upstream region of the downstream zone, transmitting a signal from the first controller to a second controller that controls the upstream zone, the signal indicating that the downstream zone will accept the second article from the upstream zone.

22. A controller for a conveyor system, the conveyor system including a first zone and a second zone, the first zone including a first region and a second region each configured to accommodate an article and to operate in concert in response to activation of the first zone by the controller, the controller comprising:
   a processor; and
   a memory including program code that when executed by the processor causes the controller to:
   receive an accept article request from the second zone;
   in response to receiving the accept article request, determine if a first article is in the first region of the first zone;
   in response to determining the first article is not in the first region, activate the first zone to accept a second article from the second zone into the second region of the first zone; and
   in response to determining the first article is in the first region of the first zone, refuse to accept the second article from the second zone.

23. A controller for a conveyor system including a plurality of zones, the plurality of zones including a first zone having a plurality of regions each configured to accommodate an article and to operate in concert in response to activation of the first zone by the controller, the controller comprising:
   a processor; and
   a memory including program code that when executed by the processor causes the conveyor system to:
   activate the first zone to receive the article in the first zone;
   determine a position of the article in the first zone;
   activate the first zone to position the article in a first region of the plurality of regions in response to the first zone being in a first mode; and
   activate the first zone to position the article in a second region of the plurality of regions different from the first region in response to the first zone being in a second mode.

24. A controller for a conveyor system, the conveyor system including a downstream zone and an upstream zone, the downstream zone including a downstream region and an upstream region, the controller comprising:
   a processor; and
   a memory including program code that when executed by the processor causes the controller to:
   determine if a gap between a first article in the downstream zone and a second article in the upstream zone exceeds a predetermined length; and in response to determining the gap exceeds the predetermined length, position the first article in the upstream region of the downstream zone.

\* \* \* \* \*